US011317459B1

(12) United States Patent
Ross et al.

(10) Patent No.: US 11,317,459 B1
(45) Date of Patent: Apr. 26, 2022

(54) SYSTEMS AND METHODS FOR IMPROVING WIRELESS MESH NETWORK RESILIENCE

(71) Applicant: L3VEL, LLC, Wilmington, DE (US)

(72) Inventors: Kevin Ross, Lehi, UT (US); Muhammad Ahsan Naim, South Jordan, UT (US)

(73) Assignee: L3VEL, LLC, Wilmington, DE (US)

( * ) Notice: Subject to any disclaimer, the term of this patent is extended or adjusted under 35 U.S.C. 154(b) by 143 days.

(21) Appl. No.: 16/683,175

(22) Filed: Nov. 13, 2019

Related U.S. Application Data

(60) Provisional application No. 62/760,894, filed on Nov. 13, 2018, provisional application No. 62/760,896, filed on Nov. 13, 2018, provisional application No. 62/760,892, filed on Nov. 13, 2018.

(51) Int. Cl.
| H04W 76/16 | (2018.01) |
| H04W 84/10 | (2009.01) |
| H04W 84/18 | (2009.01) |
| H04W 24/04 | (2009.01) |
| H04B 7/06  | (2006.01) |
| H04W 76/14 | (2018.01) |
| H04W 76/18 | (2018.01) |
| H04W 88/04 | (2009.01) |

(Continued)

(52) U.S. Cl.
CPC .......... H04W 76/16 (2018.02); H04B 7/0608 (2013.01); H04W 16/14 (2013.01); H04W 24/04 (2013.01); H04W 72/0453 (2013.01); H04W 76/14 (2018.02); H04W 76/18 (2018.02); H04W 84/10 (2013.01); H04W 84/18 (2013.01); H04W 88/04 (2013.01)

(58) Field of Classification Search
CPC ..... H04W 76/16; H04W 76/18; H04W 76/14; H04W 16/14; H04W 24/04; H04W 72/0453; H04W 84/10; H04W 84/18; H04W 88/04; H04B 7/0608
See application file for complete search history.

(56) References Cited

U.S. PATENT DOCUMENTS

| 8,385,921 B1 | 2/2013 | Shousterman et al. |
| 8,406,126 B1 | 3/2013 | Leiba et al. |
| 9,425,985 B1 | 8/2016 | Shousterman et al. |

(Continued)

FOREIGN PATENT DOCUMENTS

WO    2018083548 A1    5/2018

Primary Examiner — Ricky Q Ngo
Assistant Examiner — Stephen N Steiner
(74) Attorney, Agent, or Firm — Lee Sullivan Shea & Smith LLP

(57) ABSTRACT

Disclosed herein is a wireless communication node that includes (1) at least one small cell sub-node that is configured to communicate with multiple CPE sub-nodes outside of the wireless communication node via multiple first wide-beam-width communication links and (2) at least one CPE sub-node that is configured to communicate with one small cell sub-node outside of the wireless communication node via a second wide-beam-width communication link, where the at least one small cell sub-node and the at least one CPE communication sub-node are housed within a single enclosure. In some implementations, the wireless communication node may also support multiple carriers operating at different frequencies.

20 Claims, 39 Drawing Sheets

(51) Int. Cl.
*H04W 16/14* (2009.01)
*H04W 72/04* (2009.01)

(56) References Cited

U.S. PATENT DOCUMENTS

| | | | |
|---|---|---|---|
| 9,538,331 | B2 | 1/2017 | Ross et al. |
| 9,621,465 | B2 | 4/2017 | Ross |
| 9,860,179 | B2 | 1/2018 | Ross |
| 9,942,776 | B2 | 4/2018 | Ross et al. |
| 9,973,939 | B2 | 5/2018 | Ross |
| 10,027,508 | B2 | 7/2018 | Leiba et al. |
| D856,962 | S | 8/2019 | Hart et al. |
| 10,530,851 | B1 | 1/2020 | Hart |
| 10,530,882 | B2 | 1/2020 | Ross |
| 2002/0181427 | A1* | 12/2002 | Sparr .................... H04W 84/18 370/338 |
| 2010/0238862 | A1* | 9/2010 | Davidson ............. H04W 4/029 370/328 |
| 2014/0057570 | A1 | 2/2014 | Leiba |
| 2015/0358082 | A1 | 12/2015 | Ross |
| 2016/0100415 | A1* | 4/2016 | Mishra ..................... H04L 5/14 370/277 |
| 2018/0132159 | A1* | 5/2018 | Strong .................. H04W 48/20 |
| 2018/0331935 | A1 | 11/2018 | Ross et al. |
| 2018/0343685 | A1 | 11/2018 | Hart et al. |

\* cited by examiner

SYSTEMS AND METHODS FOR IMPROVING WIRELESS MESH NETWORK RESILIENCE

CROSS-REFERENCE TO RELATED APPLICATIONS

This application claims priority to (i) U.S. Provisional App. No. 62/760,892, filed Nov. 13, 2018, and entitled "A METHOD FOR IMPROVING WIRELESS MESH NETWORK RESILIENCE USING MULTIPLE FREQUENCY CARRIERS," (ii) U.S. Provisional App. No. 62/760,894, filed Nov. 13, 2018, and entitled "METHOD FOR IMPROVING WIRELESS MESH NETWORK RESILIENCE USING SINGLE FREQUENCY CARRIER," and (iii) U.S. Provisional App. No. 62/760,896, filed Nov. 13, 2018, and entitled "METHOD FOR IMPROVING WIRELESS MESH NETWORK RESILIENCE USING SINGLE FREQUENCY CARRIER WITH REMOTE ANTENNAS," each of which is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communication with a user through a communication connection or a system management action.

Current wireless mesh networking systems exhibit many shortcomings. As one example, current wireless mesh networking systems fail to account for extra protection for point-to-point narrow beam wireless paths. Such paths are highly directional and work only under perfect line-of-sight or near line-of-sight conditions. Once the wireless mesh network is built, certain events, such as vegetation growth or loss of an intermediary node, can impact the line-of-sight paths between communication links. This can result in one or more link failures in the network.

As another example, current wireless mesh networking systems that use line-of-sight-based point-to-point and/or point-to-multipoint links tend to constrain wireless mesh networks to an area within a certain maximum distance from a fiber Point of Presence ("PoP") and fail to account for ways to limit the maximum number of hops required to connect a user to a fiber PoP in order to ensure that packet latency does not exceed a certain threshold, which may be required for certain real-time applications.

Thus, there exists multiple needs in the art for improved systems and methods relating to wireless communication mesh network design and operation.

Overview

The present disclosure, for example, relates to wireless networks and communications including, but not limited to, broadband internet services to end user, security and/or automation systems, and more particularly to narrow beam mesh networking and related operations and techniques.

In accordance with the present disclosure, disclosed herein are systems and methods that relate to narrow beam mesh networks, associated systems, and operations relating to network communication, including, in some embodiments, adjustments and modifications. The present systems and methods may facilitate designing, operating and/or adjusting/modifying wireless networking communications. In some embodiments, the present systems and methods relate to and account for wireless communication nodes with capability of establishing point-to-point or point-to-multipoint narrow beam communication link, point-to-point/point-to-multipoint steerable narrow beam communication link, combination of point-to-point and point-to-multipoint communication links, among other things.

In some instances, one or multiple links in a wireless communication network can fail due to certain events, including but not limited to growth in vegetation, loss of a node due to various reasons that can change the line-of-sight (LOS) conditions required for communication between two points in the wireless mesh network. In the present disclosure, some or all the nodes in the mesh network can host a 4G (LTE, LTE Advanced, LTE Pro, WiMAX, WiFi, etc.) technology-based small cell (eNB) and an UE (user equipment)/CPE (customer premises equipment) in a single enclosure to provide a redundant communication path between two points in a mesh network in an event a direct or in-direct LOS path between two mesh nodes fail.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

Accordingly, in one aspect, disclosed herein is a wireless communication node that includes (1) at least one small cell sub-node that is configured to communicate with multiple CPE sub-nodes outside of the wireless communication node via multiple first wide-beam-width communication links and (2) at least one CPE sub-node that is configured to communicate with one small cell sub-node outside of the wireless communication node via a second wide-beam-width communication link, where the at least one small cell sub-node and the at least one CPE communication sub-node are housed within a single enclosure.

In another aspect, disclosed herein is a communication system that includes (1) a first wireless communication node at a first site, where the first wireless communication node comprises a first small cell sub-node and a first CPE sub-node and (2) a second wireless communication node at a second site, where the second wireless communication node comprises a second small cell sub-node and a second CPE sub-node, where the first small cell sub-node of the first wireless communication node may be configured to communicate with the second CPE sub-node of the second wireless communication node via a first wide-beam-width communication link and the first CPE sub-node of the first wireless communication node may be configured to communicate with the second small cell sub-node of the second wireless communication node via a second wide-beam-width communication link.

In example embodiments, the disclosed communication system may also include (3) a third wireless communication node at the first site, where the third wireless communication node comprises either a point-to-point node or a point-to-multipoint node and (4) a fourth wireless communication node at the second site, where the fourth wireless communication node comprises either a point-to-point node or a point-to-multipoint node.

In yet another aspect, disclosed herein is a method carried out by a first wireless communication node of a set of wireless communication nodes at a first location in a communication network, where the first wireless communication node includes a first small cell sub-node and a first CPE sub-node that are housed in a single enclosure, where the method may involve (1) operating in a first mode in which (a) the first small cell sub-node is configured to use a first carrier frequency to communicate with multiple CPE sub-nodes outside of the first wireless communication node via multiple first wide-beam-width communication links, and (b) the first CPE sub-node is configured to use the first carrier frequency to communicate with a small cell sub-node outside of the first wireless communication node via a second wide-beam-width communication link, (2) detecting a link failure that causes the set of wireless communication nodes at the first location to disconnect from the remainder of the communication network, and (3) after detecting the link failure, transitioning from operating in the first mode to operating in a second mode in which (a) the first small cell sub-node is configured to use a second carrier frequency that differs from the first carrier frequency to communicate with the multiple CPE sub-nodes outside of the first wireless communication node via the multiple first wide-beam-width communication links, (b) the first CPE sub-node remains configured to use the first carrier frequency to communicate with the small cell sub-node outside of the first wireless communication node via the second wide-beam-width communication link, (c) the first CPE sub-node is configured to act as a gateway for traffic for one or more other wireless communication nodes in the set of wireless communication nodes at the first location, and (d) the first CPE sub-node is configured to use a higher-priority bearer with the small cell sub-node outside of the first wireless communication node to communicate the traffic for the one or more other wireless communication nodes in the set of wireless communication nodes at the first location.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

Current wireless mesh networking systems exhibit many shortcomings, including failing to account for extra protection for a high reliability wireless path for carrying backhaul data that carries control signaling data along with user data for users in the network segment. Current wireless mesh networking systems use the same or similar beam transmission techniques for an access path that carries data for a single user and backhaul path that may affect network performance as backhaul paths tend to be more sensitive to interference and other signal inhibitors and can degrade the performance of entire network segment. Thus, there exists multiple needs in the art for improved systems and methods relating to wireless communication network design and operation.

Figure 1:
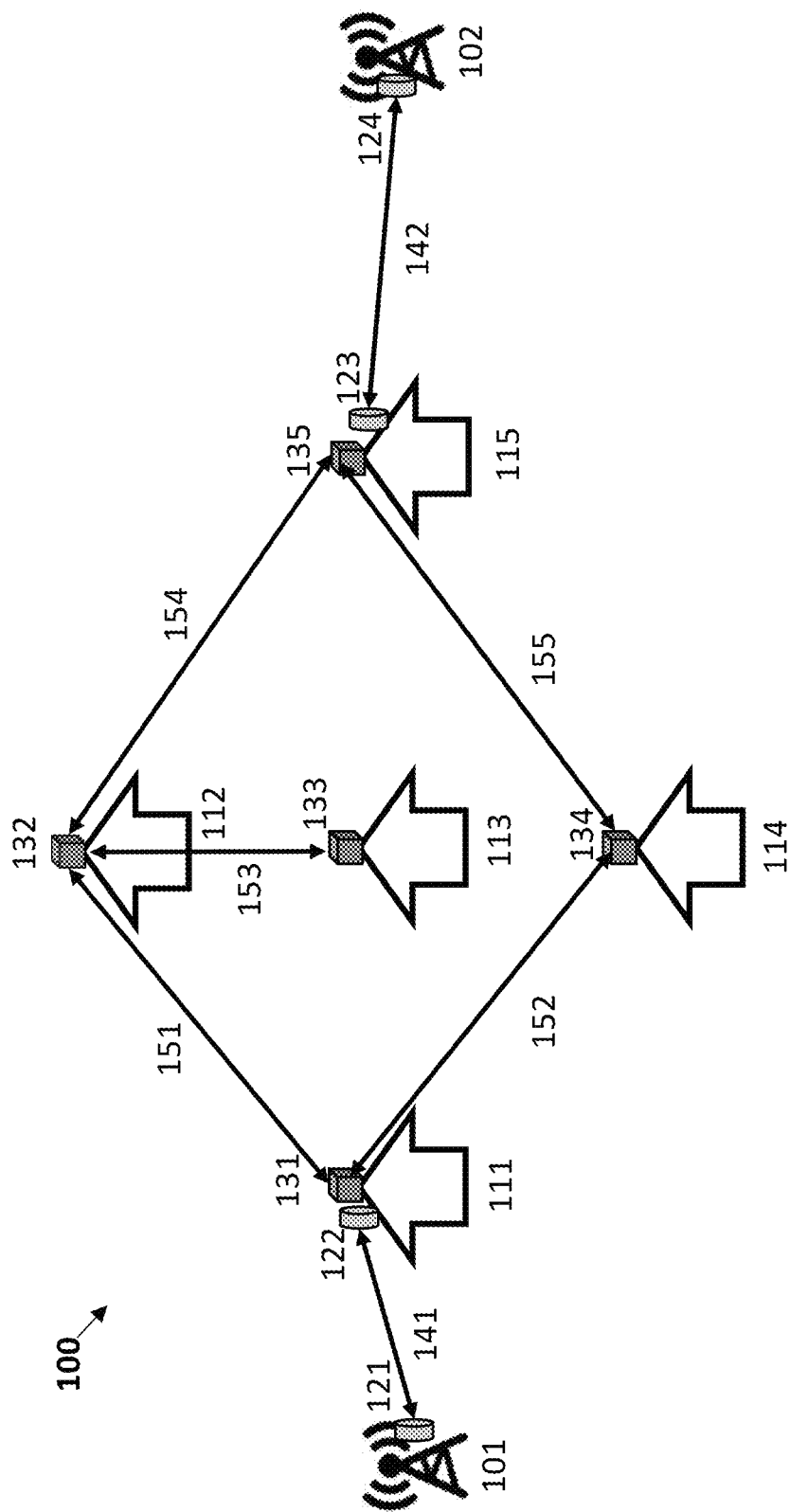
FIG. 1 depicts an example diagram relating to a wireless networking and communication system, in accordance with various aspects of this disclosure.

Referring to FIG. 1, a data communication network capable of providing multigigabit internet speeds through wireless point-to-point and point-to-multipoint links is illustrated. Communication network 100 in FIG. 1 includes Tower/fiber access points 101 and 102. Tower/fiber access points 101 and 102 can be co-located or can be located at different physical locations. Tower/fiber access points 101 and 102 have access to a high bandwidth dark fiber capable of providing up to several hundred gigabits/second of data throughput. Tower/fiber access points 101 and 102 provide backhaul connectivity between a core network/data center (not shown in the FIG. 1 for the sake of simplicity) and a seed home of the communication network described below. Tower/Fiber access points 101 and 102 also host wireless point-to-point communication nodes 121 and 124.

As shown, wireless communication nodes 121 and 124 are capable of reception and transmission of high bandwidth (multiple gigahertz) signals operating at very high frequency (6 Ghz-100 Ghz such as 28 Ghz, V band, E band, etc.). Wireless communication nodes 121 and 124 each comprise a baseband/digital unit equipped with components including but not limited to a processor, memory, etc. Wireless communication nodes 121 and 124 also each comprise an RF unit and antenna unit. The antenna subsystem of wireless communication nodes 121 and 124 is capable of reception and transmission of directional signals where significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, communication network 100 includes seed homes 111 and 115. Examples of seed homes include detached single-family homes, multi-dwelling units (MDUs), small/medium business (SMB), etc., where communication equipment nodes can be deployed on rooftops. Seed homes 111 and 115 host wireless point-to-point communication nodes 122 and 123. Wireless communication nodes 122 and 123 are capable of reception and transmission of high bandwidth (multiple gigahertz) signals operating at very high frequency (6 Ghz~100 Ghz such as 28 Ghz, V band, E band, etc.).

Wireless communication nodes 122 and 123 comprise a baseband/digital unit equipped with components including but not limited to a processor, memory, etc. Wireless communication nodes 122 and 123 also comprise an RF unit and antenna unit. The antenna subsystem of wireless communication nodes 122 and 123 is capable of reception and transmission of directional signals where a significant portion of the signal energy is concentrated within few degrees around the antenna boresight (e.g., within a range of 0.5 degrees to 5 degrees), both in vertical and horizontal directions, in contrast to omni directional antennas where signal energy is close to evenly spread across 360° degrees.

Wireless communication node 121 residing in Tower/fiber access point location 101 and wireless communication node 122 residing in seed home 111 work together to form a bi-directional high bandwidth communication point-to-point data link 141 that provides connectivity between Tower/fiber access point 101 and seed home 111 segment of communication network 100. Similarly, wireless communication node 124 residing in Tower/fiber access point location 102 and wireless communication node 123 residing in seed home 115 work together to form a bi-directional high bandwidth communication point-to-point data link 142 that provides connectivity between Tower/fiber access point 102 and seed home 115 segment of the communication network 100.

Seed home 111, in addition to wireless communication node 122, hosts a second wireless communication node 131. Second wireless communication node 131 comprises multiple independent transmission/reception modules. Each module of the wireless communication node 131 is capable of reception and transmission of high bandwidth (multiple gigahertz) signals operating at very high frequency (6 Ghz~100 Ghz such as 28 Ghz, V band, E band, etc.). Each module of wireless communication node 131 comprises an independent baseband/digital unit equipped with components including but not limited to a processor, memory, etc. Each module in wireless communication node 131 also comprises an independent RF unit and independent antenna unit. The antenna subsystem of each wireless communication node 131's module is capable of reception and transmission of directional signals where significant portion of the signal energy is concentrated within few degrees around the antenna boresight (e.g., within a range of 0.5 degrees to 5 degrees), both in vertical and horizontal directions, in contrast to omni directional antennas where signal energy is close to evenly spread across 360° degrees.

Communication network 100 also includes multiple anchor homes 112, 113 and 114. Each of these anchor homes host a wireless communication node similar to wireless communication node 131 described above. However, unlike seed homes, a wireless communication node on an anchor home only provides wireless connectivity to one or more anchor homes and/or seed homes but does not provide connectivity to the Tower/Fiber access point. For example, anchor home 112 hosts wireless communication node 132. A first module of wireless communication node 132 residing in anchor home 112 and another module of wireless communication node 131 residing in seed home 111 work together to form a bi-directional high bandwidth communication point-to-point data link 151 that provides connectivity between seed home 111 and anchor home 112 segment of the communication network 100. Similarly, as another example, a second module of wireless communication node 132 residing in anchor home 112 and a module of wireless communication node 133 residing in anchor home 113 work together to form a bi-directional high bandwidth communication point-to-point data link 153 that provides connectivity between anchor home 112 and anchor home 113. As yet another example, a third module of wireless communication node 132 residing in anchor home 112 and a module of wireless communication node 135 residing in seed home 115 work together to form a bi-directional high bandwidth communication point-to-point data link 154 that provides connectivity between anchor home 112 and seed home 115. As a further example, another module of wireless communication node 131 residing in seed home 111 and a module of wireless communication node 134 residing in anchor home 114 work together to form a bi-directional high bandwidth communication point-to-point data link 152 that provides connectivity between anchor home 114 and seed home 111. As another example, another module of wireless communication node 134 residing in anchor home 114 and a module of wireless communication node 135 residing in seed home 115 work together to form a bi-directional high bandwidth communication point-to-point data link 156 that provides connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1G, 2G, 3G, 4G, 5G and 6G, etc. Bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional point to point data links 141, 142, 151, 152, 153, 154 & 155 are shown to illustrate an example of a communication network. However, in general, it should be understood that communication network 100 can include a different number of Tower/fiber nodes, seed homes, anchor homes and/or communication links, which may depend on the specific layout of a particular instantiation of the communication network deployed in the field. Similarly, although, FIG. 1 shows four communication nodes 121, 122, 123 & 124 that provide connectivity between a Tower/fiber access point (e.g., Tower/fiber access points 101, 102) and a seed home, five communication nodes 131, 132, 133, 134 & 135 that provide connectivity between two anchor homes or between an anchor and a seed home, the number of these communication nodes can vary from one communication network to another communication network, which may depend on the specific size and layout of a particular instantiation of the communication network. It should also be understood that communication network 100 may also contain other nodes (e.g., network switches/routers, etc.) that are omitted here for the sake of simplicity.

Figure 2:
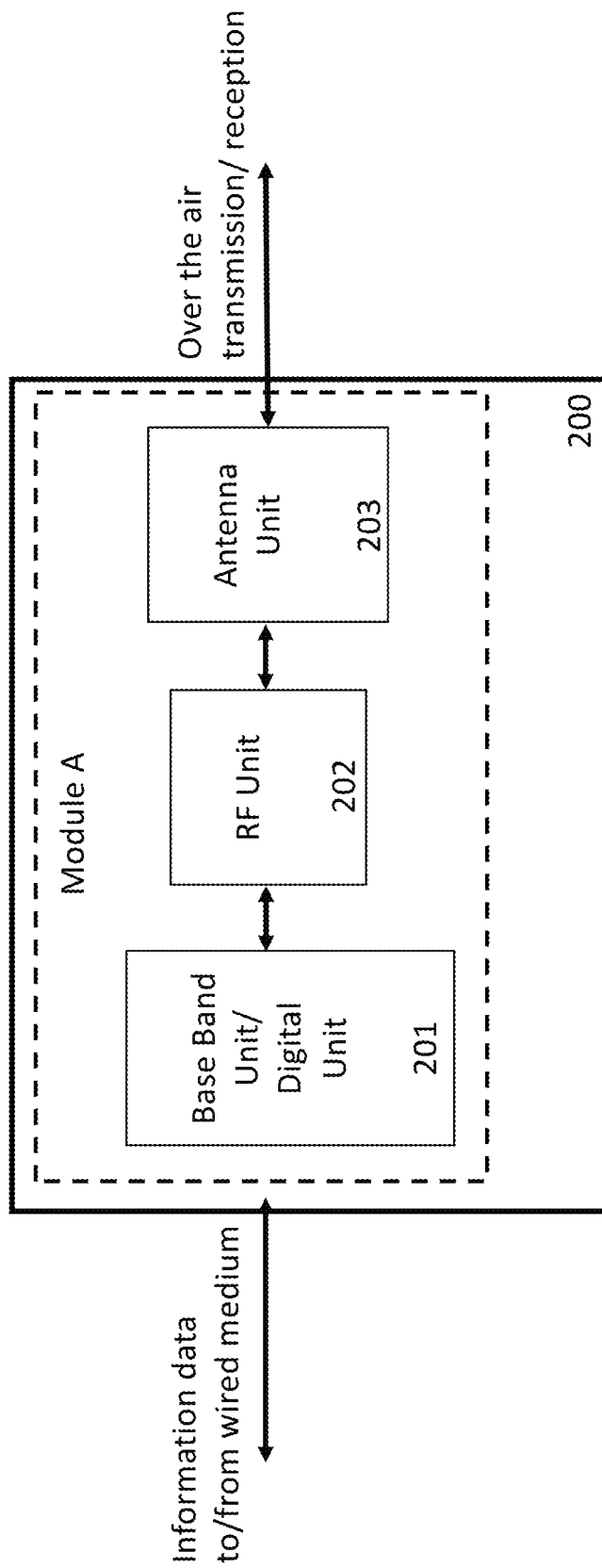
FIG. 2 depicts an example wireless communication node comprising a module, in accordance with various aspects of this disclosure.

Referring to FIG. 2, one possible embodiment of wireless communication node 131 of FIG. 1 is shown as wireless communication node 200. Wireless communication node 200 in FIG. 2 comprises a module labelled as "Module A." As shown, Module A comprises a base band unit or digital unit 201 which runs the physical layer level protocol including digital modulation/demodulation (modem) and other higher layer protocols such as MAC layer etc. Base band unit 201 interacts with other nodes of communication network that are external to the wireless communication node 200 via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing point-to-point links with a different module residing in a different wireless communication node.

Figure 3:
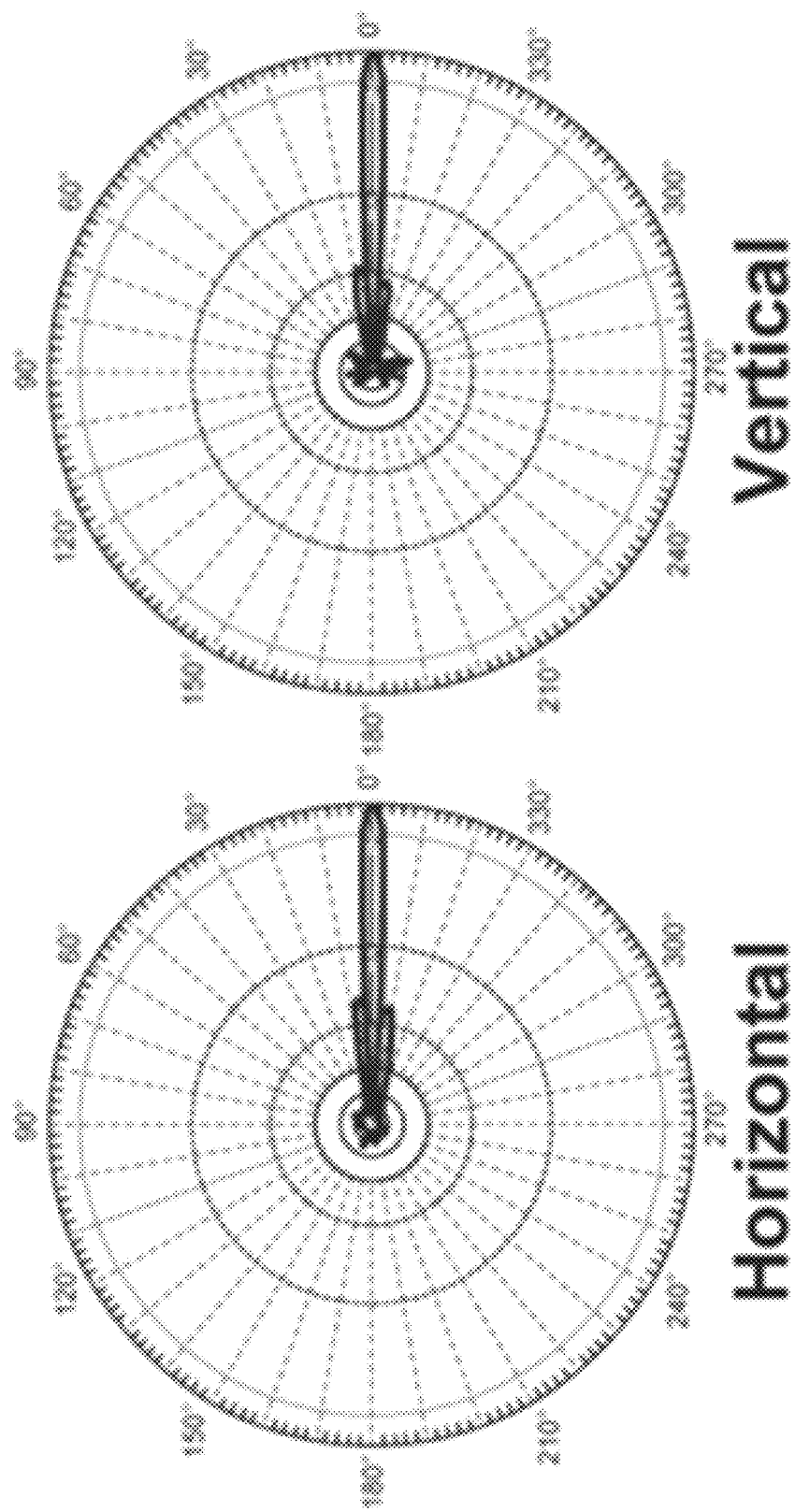
FIG. 3 depicts an example antenna pattern of a module, in accordance with various aspects of this disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
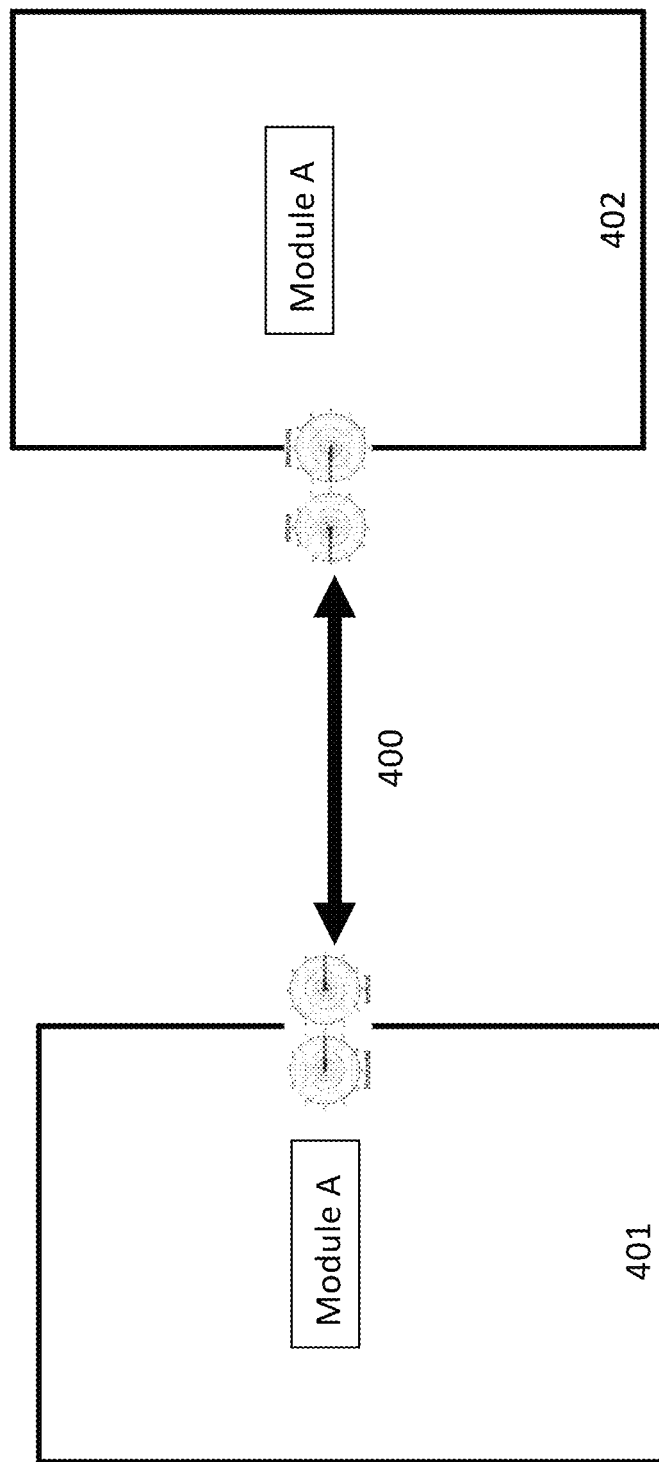
FIG. 4 depicts an example communication link between two wireless communication nodes, in accordance with various aspects of this disclosure.

Referring to FIG. 4, a point-to-point wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of Module A in wireless communication node 401 and 402, the bi-directional point-to-point link 400 may have an extremely narrow beam. This transmission and reception capability of radio signals over an extremely narrow beam via point-to-point link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
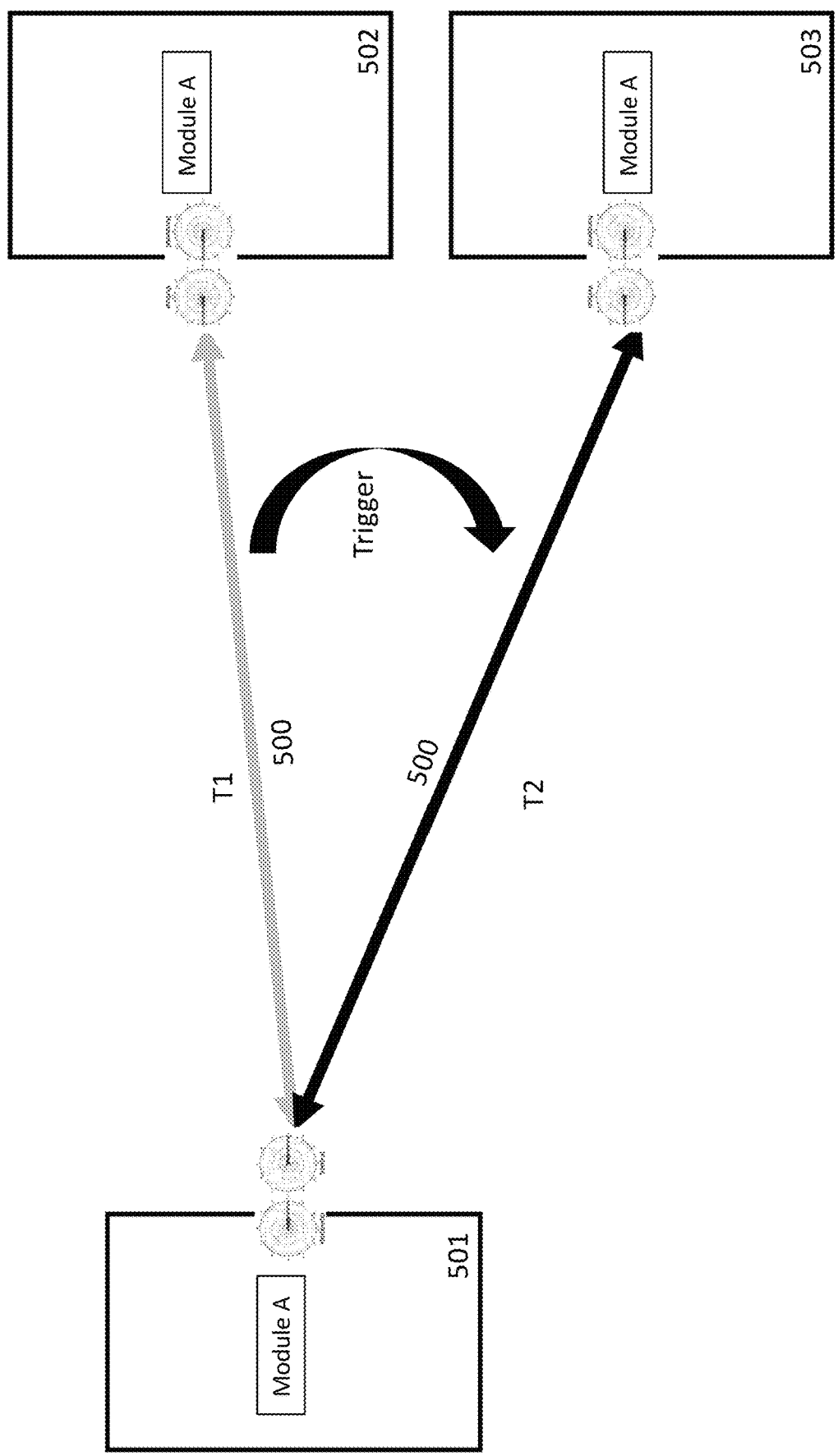
FIG. 5 depicts example wireless communication nodes, in accordance with various aspects of this disclosure.

For example, referring to FIG. 5, a wireless communication node 501 comprising Module A, a second wireless communication node 502 comprising Module A and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502 which may involve various factors, including but not limited to a change from a LOS path to a non-LOS path due to a change in environment, increased interference, a change in position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple wireless communication nodes by establishing multiple extremely narrow beam bi-directional links with the help of multiple modules (e.g., multiple Module As) belonging to different wireless communication nodes working together.

Figure 6:
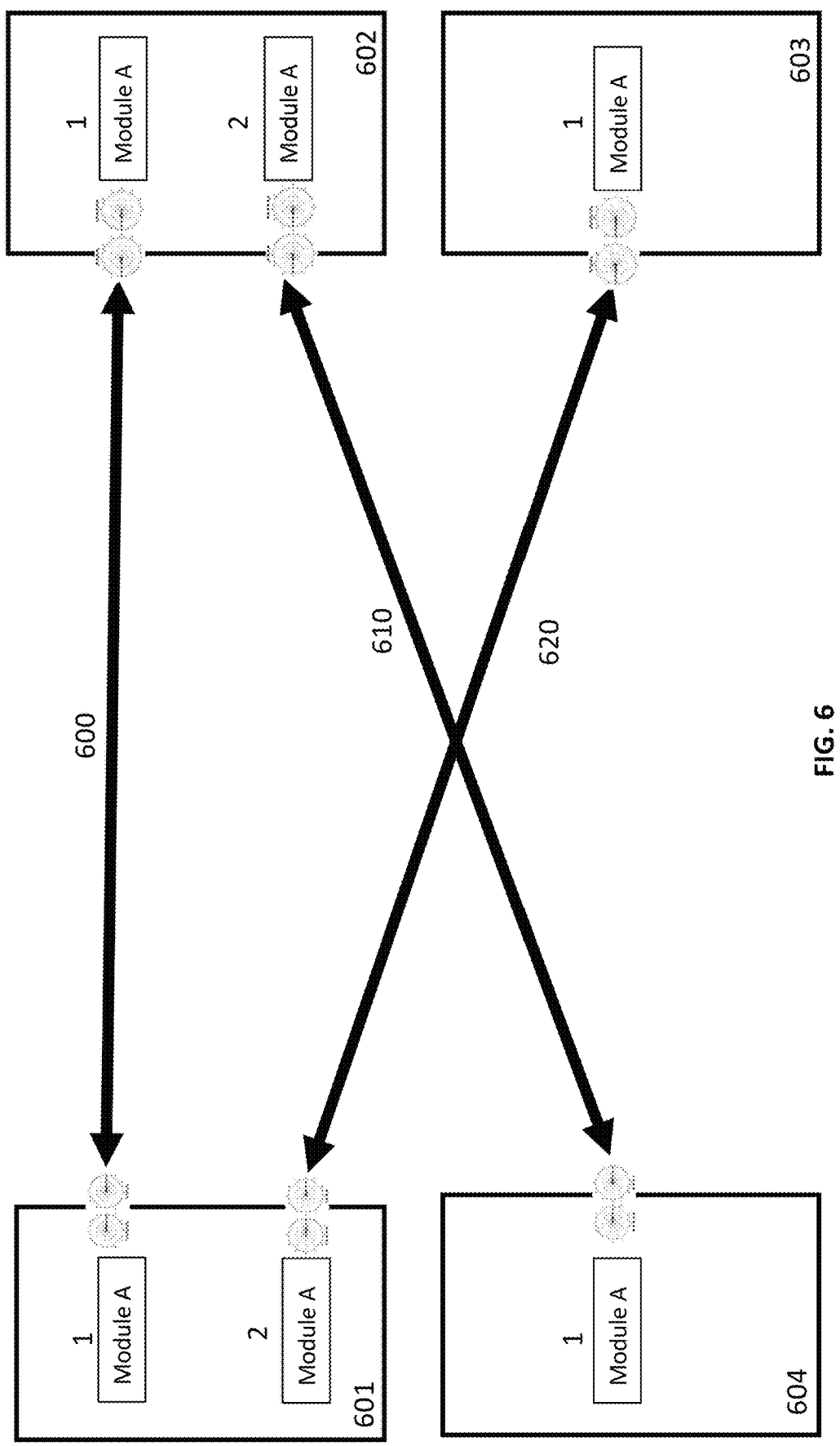
FIG. 6 depicts example wireless communication nodes that are communicatively coupled, in accordance with various aspects of this disclosure.

As one example to illustrate, referring to FIG. 6, wireless communication nodes 601 and 602 each host two Module As labeled "1" and "2," while wireless communication nodes 603 and 604 each host a single Module A. As shown, a $1^{st}$ Module A of wireless communication node 601 and a $1^{st}$ Module A of wireless communication node 602 work together to establish extremely narrow bi-directional beam-based link 600 to provide wireless connection between wireless communication node 601 and 602. Similarly, a $2^{nd}$ Module A of wireless communication node 601 and 602 and a $1^{st}$ (and only) Module A of wireless communication node 603 and 604 respectively work together to establish extremely narrow bi-directional beam-based links 610 and 620 to provide wireless connection between wireless communication nodes 601-603 and 602-604 respectively.

In one embodiment, the $1^{st}$ and $2^{nd}$ Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
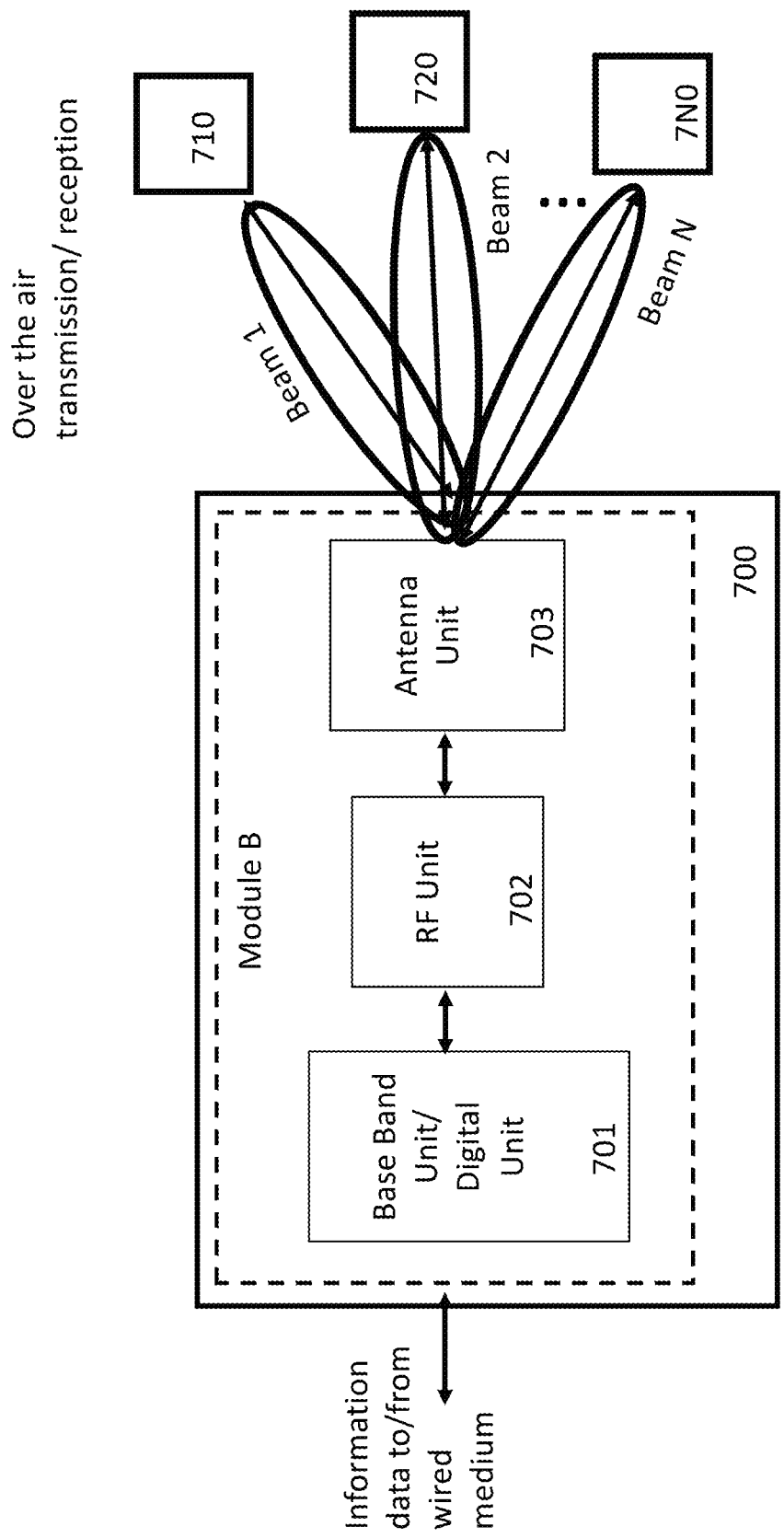
FIG. 7 depicts another example wireless communication node comprising a module, in accordance with various aspects of this disclosure.

Referring to FIG. 7, another embodiment of wireless communication node 131 of FIG. 1 is shown as wireless communication node 700. Wireless communication node 700 in FIG. 7 comprises a single module labeled as "Module B." Module B comprises base band unit or digital unit 701 which runs the physical layer level protocol including digital modulation/demodulation (modem) and other higher layer protocols such as MAC layer, etc. Base band unit 701 interacts with other nodes of the communication network that are external to the wireless communication node 700 via wired medium.

Module B also includes RF unit 702, which among other things processes intermediate frequency (IF) signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish point-to-multipoint wireless communication links with multiple wireless communication nodes. Hence Module B with the help of antenna unit 703 is capable of establishing point-to-multipoint links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of point-to-multipoint beams of antenna unit 703 of Module B are not extremely narrow (e.g. 3 dB beam width of 7-10 degree) and side lobes power levels do not start to drop at a rapid rate which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) with respect to the limitation that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N−1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such point-to-multipoint network is inferior to an interference profile of point-to-multipoint network where a wireless communication node hosts multiple Module As and creates multiple point-to-point links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple point-to-point narrow beams of wireless communication node that host multiple Module As.

Figure 8:
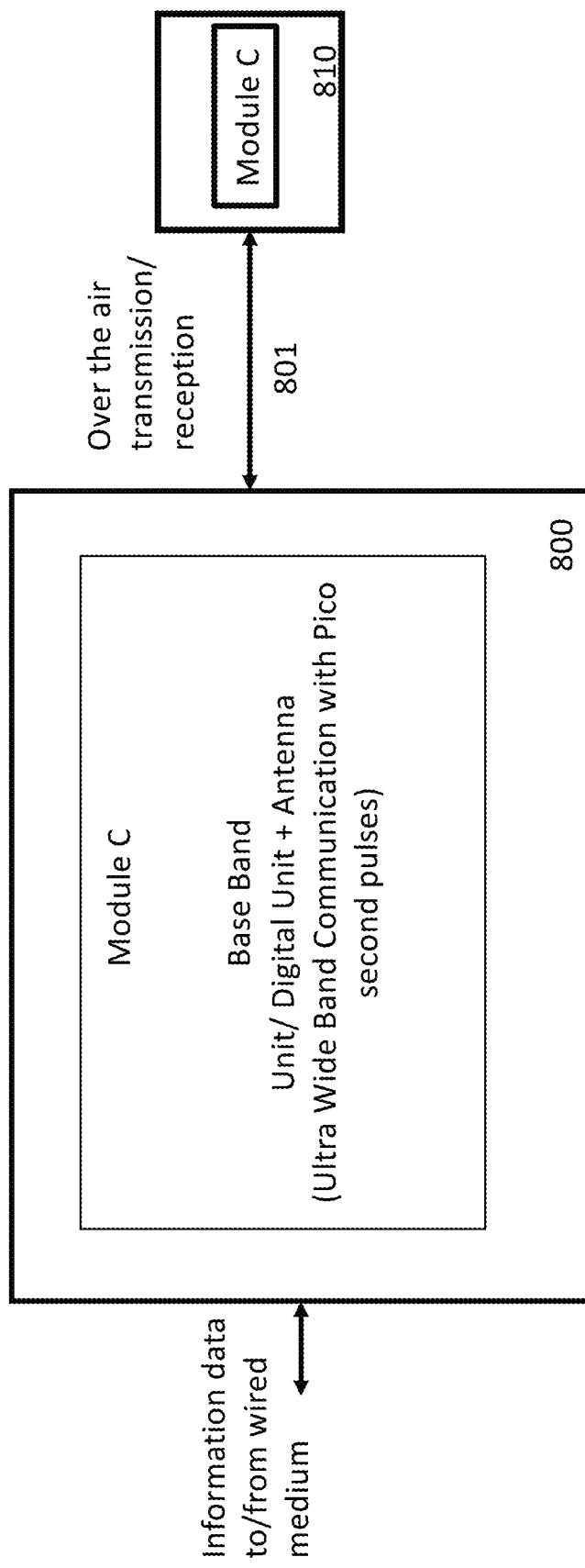
FIG. 8. depicts yet another example wireless communication node comprising a module, in accordance with various aspects of this disclosure.

Referring to FIG. 8, another possible embodiment of wireless communication node 131 of FIG. 1 is shown as wireless communication node 800 and wireless communication node 810. Wireless communication node 800 in FIG. 8 comprises a module labeled as "Module C." Module C comprises a base band unit or digital unit which runs the physical layer level protocol including digital modulation/demodulation (modem) and other higher layer protocols such as MAC layer etc. Module C's baseband unit interacts with other nodes of a communication network that are external to the wireless communication node 800 via wired medium.

Module C also includes an ultra-wide band antenna embedded with the baseband unit. Module C is capable of generation, transmission, and reception of extremely short duration pulses (few pico seconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1, 2, or 3 dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, performance of network is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another preferred embodiment, in line with the discussion above, wireless communication node 131 in FIG. 1 can host two types of modules. This allows a wireless communication node to communicate simultaneously with multiple wireless communication nodes and with two different interference profiles.

Figure 9:
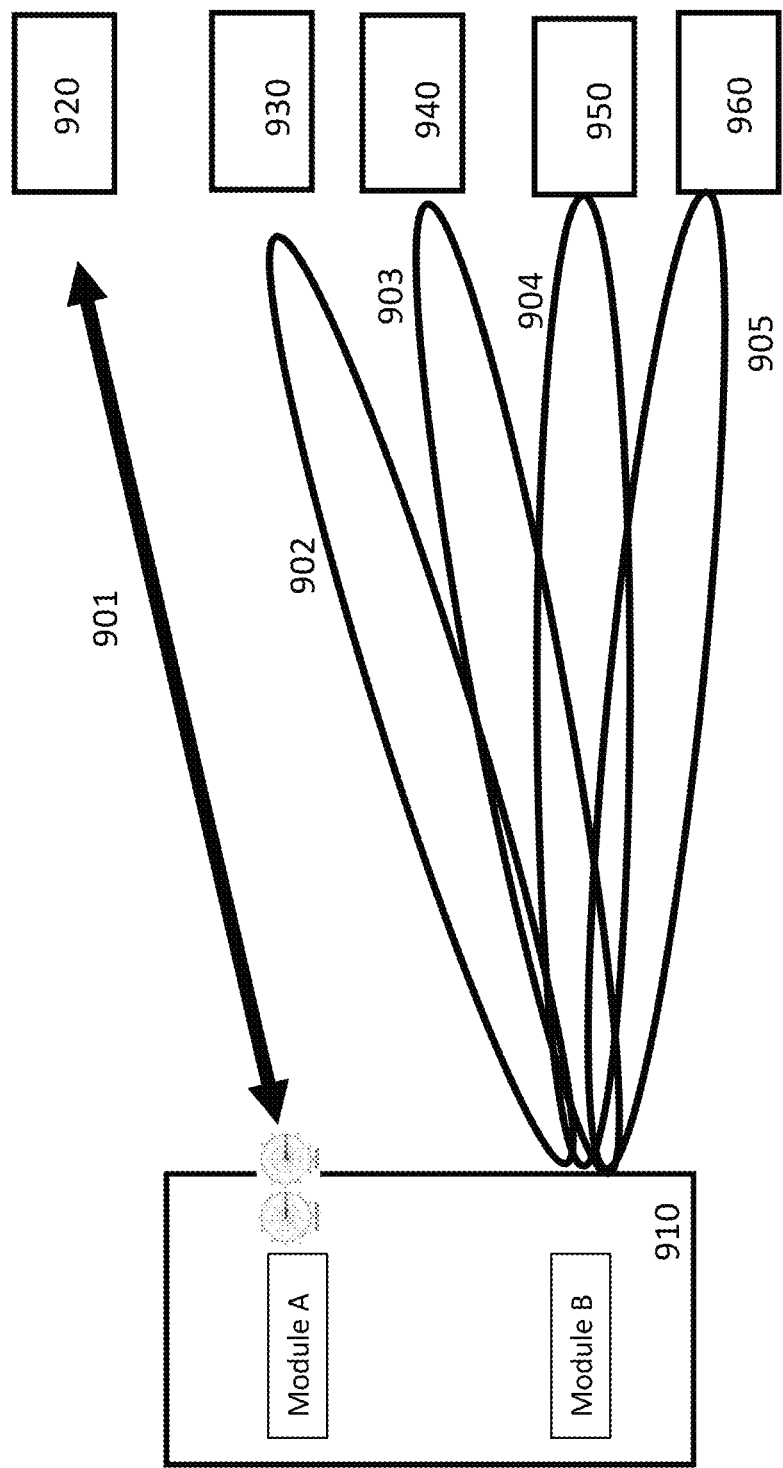
FIG. 9 depicts an example wireless communication node comprising two modules, in accordance with various aspects of this disclosure.

As one example to illustrate, referring to FIG. 9, wireless communication node 910 hosts one Module A and one Module B. Module A of wireless communication node 910 and a communication module of wireless communication node 920 work together to establish extremely narrow bi-directional beam-based link 901 to provide wireless connection between wireless communication nodes 910 and 920. Simultaneously, Module B of wireless communication node 910 which is based on AAS and generates multiple beams simultaneously creates a point-to-multipoint link that connects wireless communication node 910 with wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a maximum of two modules (i.e., a single Module A and a single Module B) are shown to be contained in a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, wireless communication nodes 131 in FIG. 1 can host more than one type of module. This allows a wireless communication node to communicate simultaneously with multiple wireless communication nodes and with different interference profiles.

Figure 10:
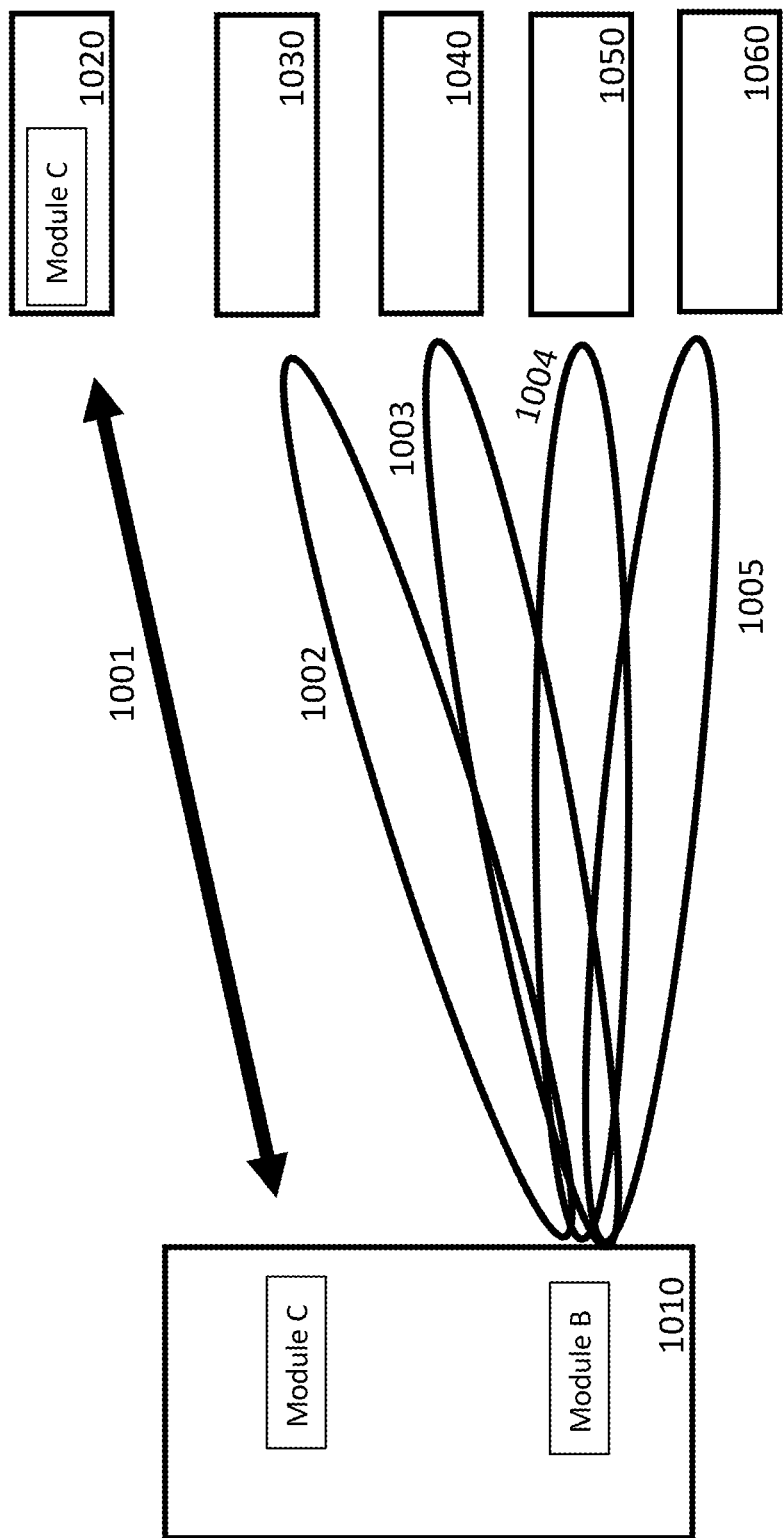
FIG. 10 depicts another example wireless communication node comprising two modules, in accordance with various aspects of this disclosure.

As another example to illustrate, referring to FIG. 10, wireless communication node 1010 hosts one Module C and one Module B. Module C of wireless communication node 1010 and Module C of wireless communication node 1020 work together to establish extremely high data rate ultra-wide frequency and low power spectral density beam-based link 1001 to provide wireless connection between wireless communication nodes 1010 and 1020. Module B of wireless communication node 1010, which is based on AAS and generates multiple beams simultaneously, creates a point-to-multipoint link that connects wireless communication node 1010 with wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a maximum of two modules (i.e., a single Module C and a single Module B) are shown to be contained in a wireless communication node 1010 that enables the wireless communication node to establish two independent and different types of bi-directional links with different wireless communication nodes simultaneously. However, it should be understood that wireless communication node 1010 can host more than two types of module (e.g., a combination of Module A, Module B and/or Module C) and the maximum number of total modules that a wireless communication node can host may depend on the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another preferred embodiment, wireless communication nodes 131 in FIG. 1 can host more than one type of module and dynamically change the type of link between wireless communication nodes. This allows a wireless communication node to communicate simultaneously with multiple wireless communication nodes and with different interference profiles and to adapt with changes in network environment.

Figure 11A:
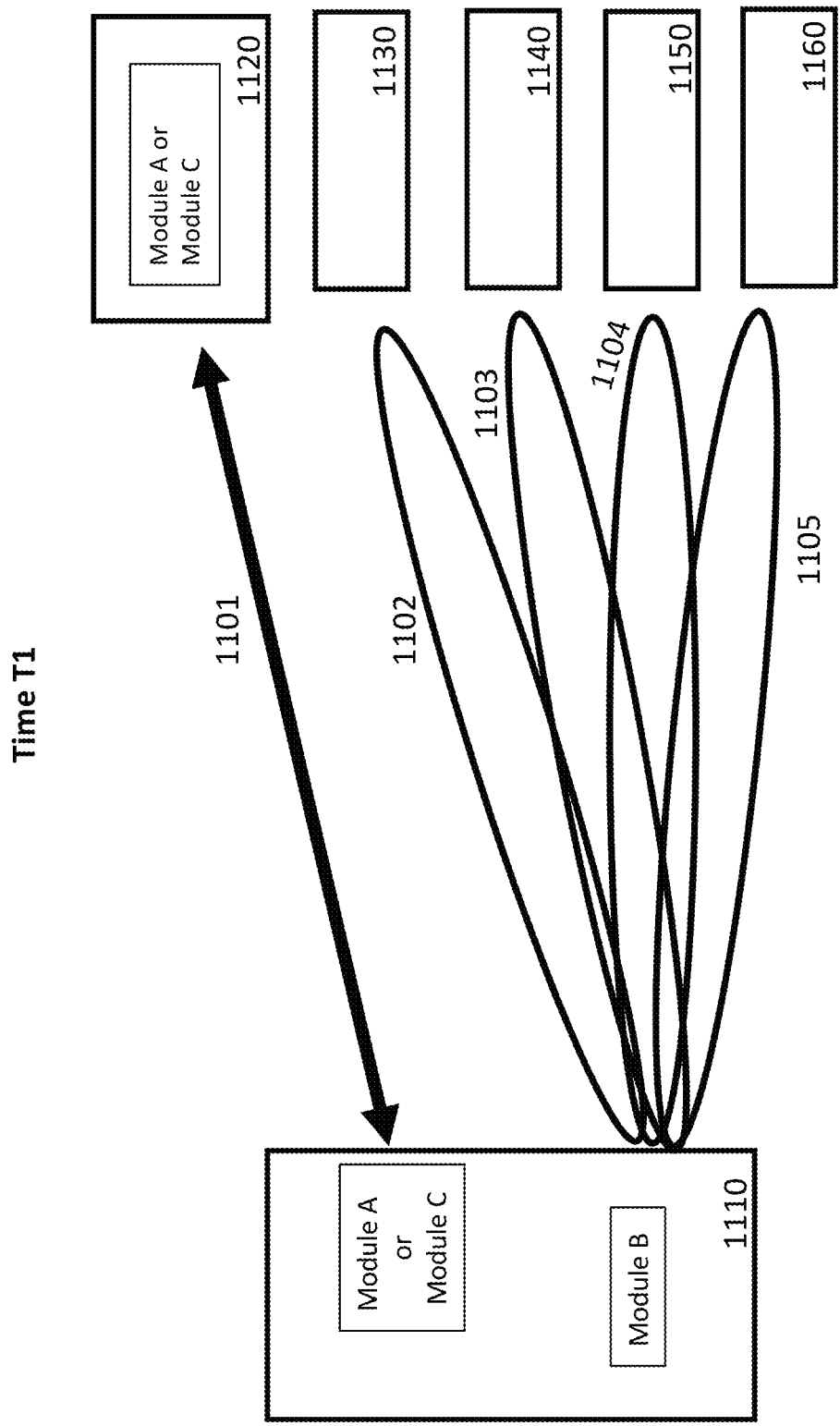
FIG. 11A depicts an example wireless communication node at a given time that can dynamically change type of links between wireless communication nodes, in accordance with various aspects of this disclosure.

As one example to illustrate, referring to FIG. 11A, wireless communication node 1110 hosts a Module C or Module A along with a Module B. During time T1, Module A/Module C of wireless communication node 1110 and communication module of wireless communication node 1010 work together to establish either an extremely high date rate ultra-wide frequency low power spectral density beam or extremely narrow beam-based link 1101 to provide wireless connection between wireless communication nodes 1110 and 1120. At substantially the same time duration T1, Module B of wireless communication node 1110 which is based on AAS and generates multiple beams simultaneously creates a point-to-multipoint link that connects wireless communication node 1110 with wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3) a module of wireless communication node 1150 to establish bi-directional beam 1104, and (4) a module of wireless communication node 1160 to establish bi-directional beam 1105.

Figure 11B:
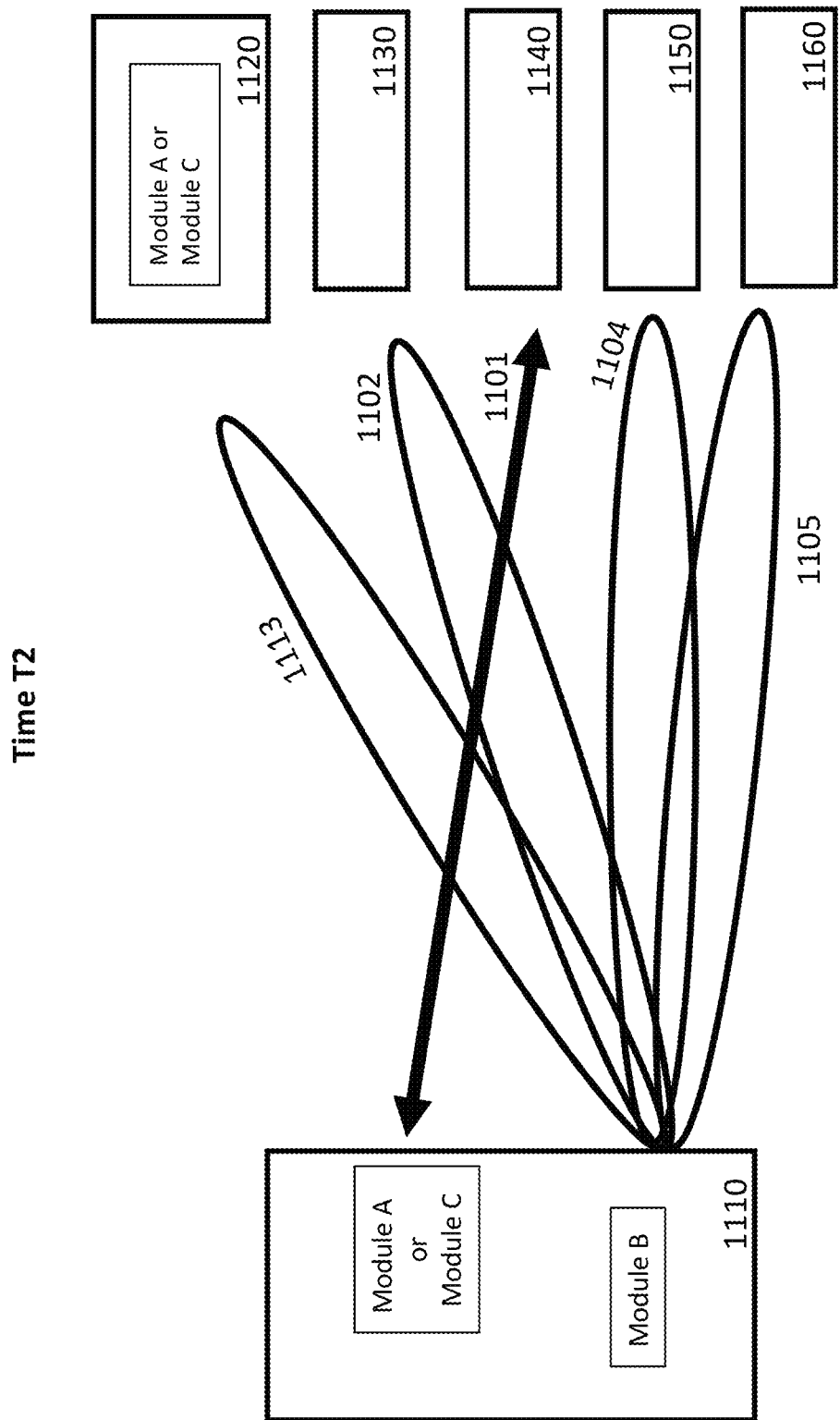
FIG. 11B depicts an example wireless communication node at another given time that can dynamically change type of links between wireless communication nodes, in accordance with various aspects of this disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes may leave the communication network. In such case, links between nodes may be dropped and the communication network may dynamically re-align itself by adjusting/switching link types between the remaining number of wireless communication nodes in the communication network to best suit the needs to the wireless communication nodes and the communication network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a point-to-point link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and 1160 can simultaneously create point-to-multipoint wireless communication links with other modules of wireless communication nodes in the mesh network that are not shown here. Similarly, when wireless communication node 1110 makes a point-to-multipoint link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create point-to-multipoint wireless communication links with other modules of wireless communication nodes in the mesh network that are not shown here.

As another example, one or more of wireless communication nodes 1120, 1130, 1140, 1150 and 1160 can host two Module As or Module Cs. Hence, when wireless communication node 1110 makes a point-to-point link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create point-to-point wireless communication links with other modules of wireless communication nodes in the mesh network that are not shown here. Similarly, when wireless communication node 1110 makes a point-to-multipoint links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create point-to-point wireless communication links with other modules of wireless communication nodes in the mesh network that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a point-to-point link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create point-to-point wireless communication links with a third communication module (e.g., Module B) of wireless communication nodes 1120, 1130, 1140, 1150 and 1160 can simultaneously create point-to-multipoint wireless communication links with other modules of wireless communication nodes in the mesh network that are not shown here. Similarly, when wireless communication node 1110 makes a point-to-multipoint link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create point-to-point wireless communication links with other modules of wireless communication nodes in the mesh network that are not shown here and a third communication module (e.g., Module B) of wireless communication nodes 1120, 1130, 1140, 1150 and 1160 can simultaneously create point-to-multipoint wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a wireless communication mesh network. Hence links established by Module A or Module C can act as a wireless backhaul for a mesh network while links established with Module B can provide access to individual users of a communication network.

In one embodiment, an entire wireless mesh can be composed of point-to-point links where both links providing backhaul and access have interference immunity. Although such links are more expensive due to the requirement of separate modules to establish individual links, such links are suitable when certain high service quality or reliability is required to be ensured for all customers of the network.

Figure 12:
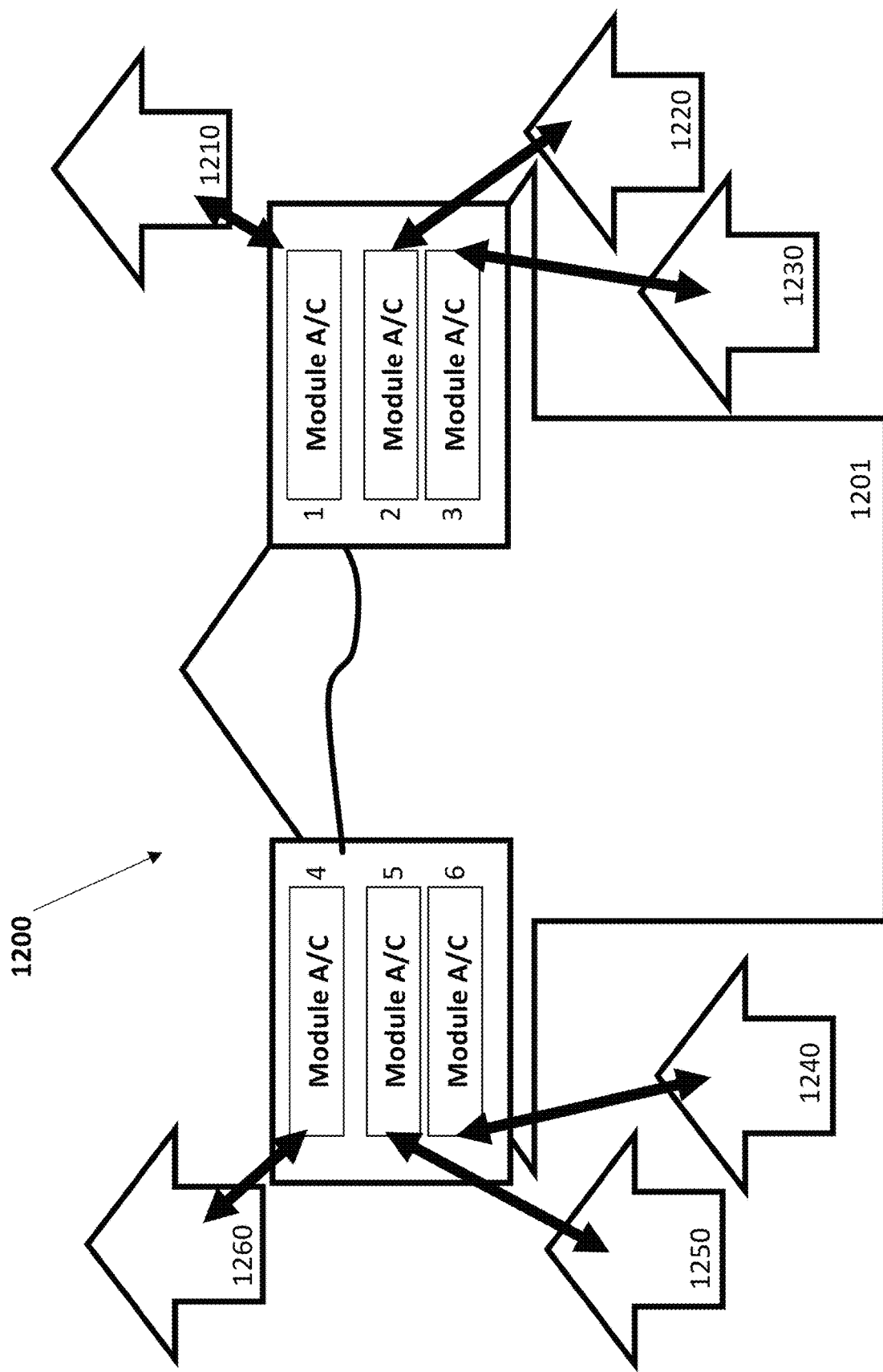
FIG. 12 depicts an example location of a communication network that can be a seed or an anchor home, in accordance with various aspects of this disclosure.

For example, FIG. 12 shows a location 1200 of a communication network that can be a seed or an anchor home. Location 1200 hosts a wireless communication node 1201 that contains a total of 6 communication modules that belong to either Module A or Module C. Hence wireless communication node 1201 is capable of establishing six point-to-point links. As shown, wireless communication node 1201 uses a $1^{st}$ and $4^{th}$ Module A/Module C to establish connections with location 1210 and location 1260 that serve as backhaul links, while wireless communication node 1201 uses a $2^{nd}$, $3^{rd}$, $5^{th}$ and $6^{th}$ Module A/Module C to establish point-to-point links with location 1220, 1230, 1250 and 1240 to provide access links. In this respect, links between locations 1200 and 1220, locations 1200 and 1230, locations 1200 and 1240, and locations 1200 and 1250 only carry data for individual users, whereas links between locations 1200 and 1260 and locations 1200 and 1210 carry signaling and data for all the locations including 1200, 1210, 1220, 1230, 1240, 1250 and 1260.

In another embodiment, an entire wireless mesh can be composed of combination of point-to-point links and point-to-multipoint links where point-to-point links act as backhaul links and point-to-multipoint links act as access links to individual users. Although such wireless mesh networks due to presence of point-to-multipoint links provide interference immunity to all the users of the communication network, such wireless mesh networks are less expensive due to the non-requirement of separate modules to establish individual links.

Figure 13:
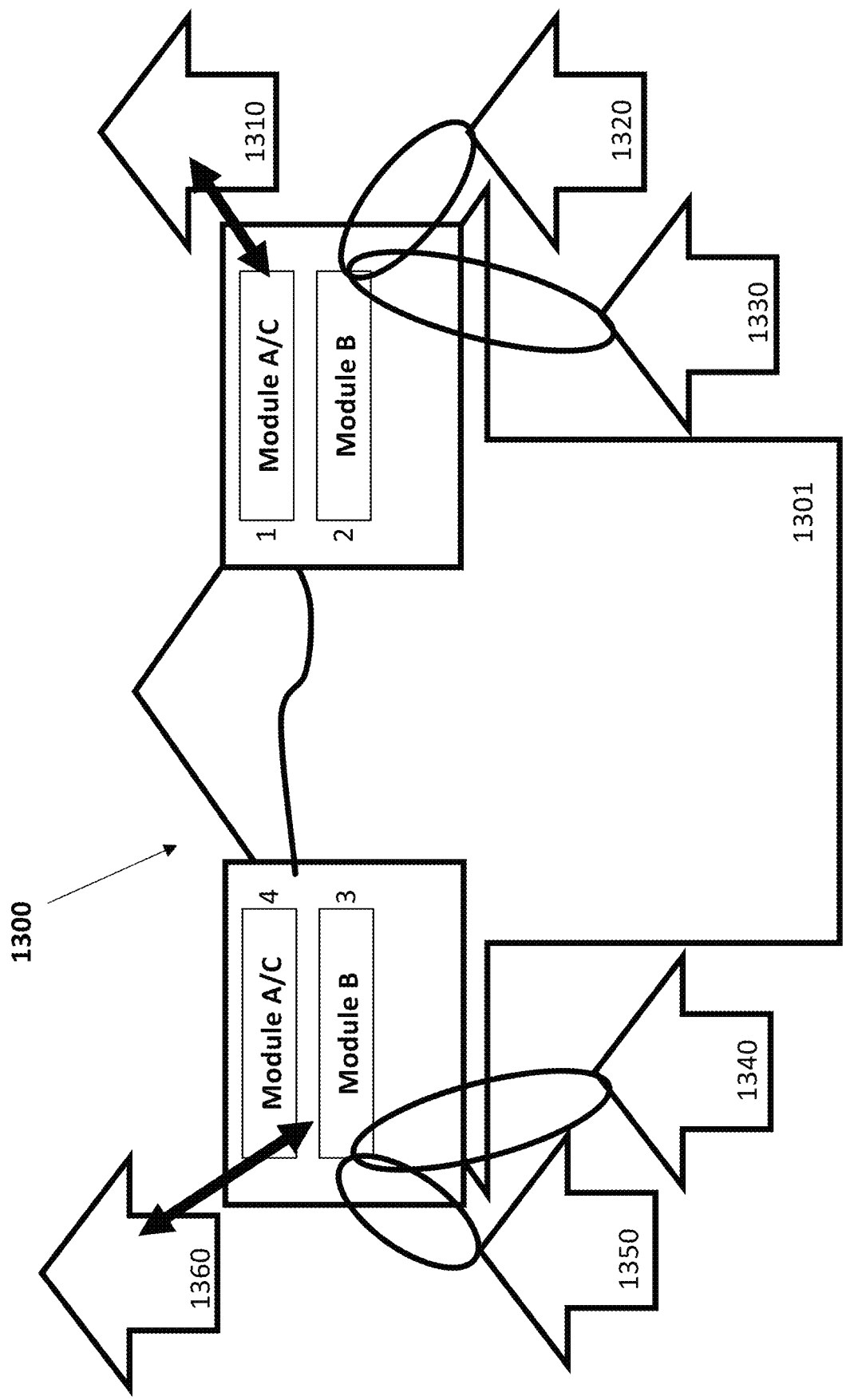
FIG. 13 depicts another example location of a communication network that can be a seed or an anchor home, in accordance with various aspects of this disclosure.

For example, FIG. 13 shows a location 1300 of a communication network that can be a seed or an anchor home. Location 1300 hosts a wireless communication node 1301 that contains a total of 4 communication modules that belong to either Module A/Module C or Module B. Hence this wireless communication node is capable of establishing two point-to-point links and two point-to-multipoint links. As shown, wireless communication node 1301 uses a $1^{st}$ and $4^{th}$ Module A/Module C to establish connections with location 1310 and location 1360 that serve as backhaul links, while wireless communication node 1301 uses a $2^{nd}$ Module B to establish point-to-multipoint links with locations 1320, 1330 and uses a $3^{rd}$ Module B to establish point-to-multipoint links with locations 1350 and 1340 to provide access links. In other words, links between locations 1300 and 1320, locations 1300 and 1330, locations 1300 and 1340 and locations 1300 and 1350 only carry data for individual users, whereas links between locations 1300 and 1360 and locations 1300 and 1310 carry signaling and data for all the locations including 1300, 1310, 1320, 1330, 1340, 1350 and 1360.

Figure 14:
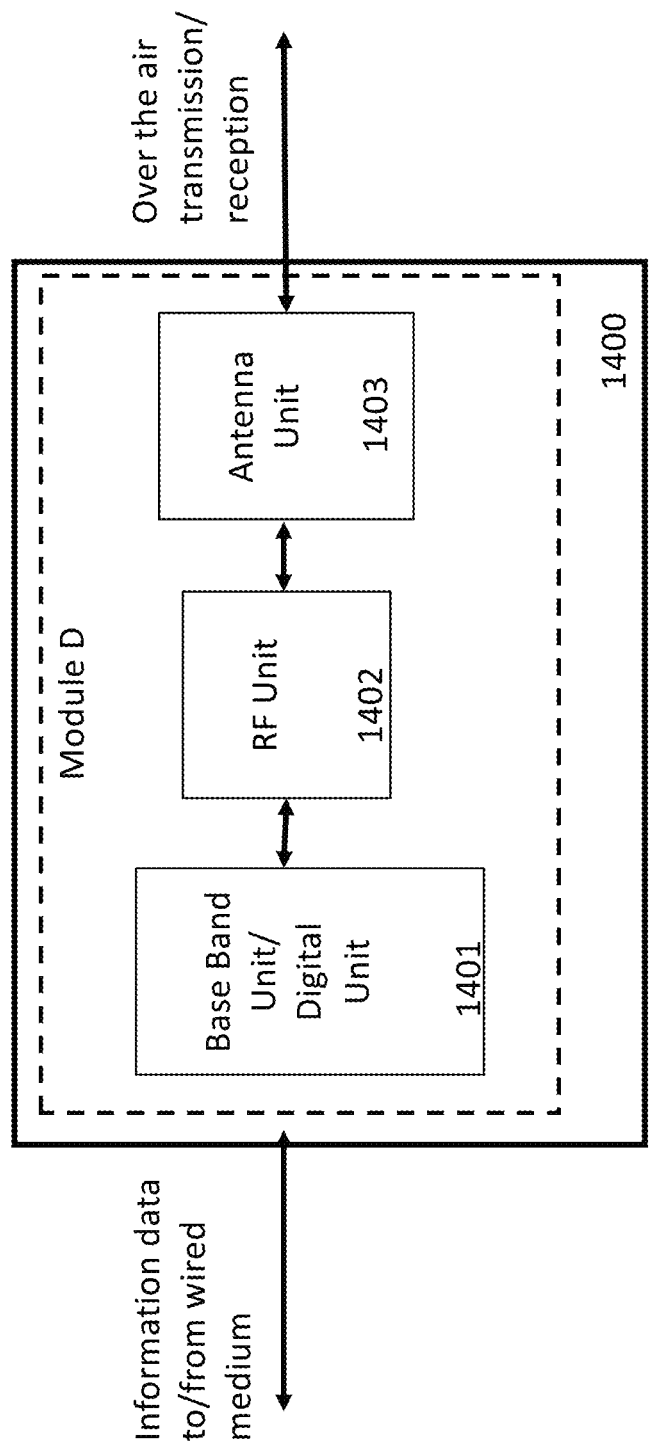
FIG. 14 depicts another example wireless communication node comprising a module, in accordance with various aspects of this disclosure.

Referring to FIG. 14, another possible embodiment of wireless communication node 131 of FIG. 1 is shown as wireless communication node 1400. Wireless communication node 1400 comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication network that are external to the wireless communication node 1400 via wired medium.

Module D also includes RF unit 1402, which among other things processes intermediate frequency (IF) signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing point-to-multipoint links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
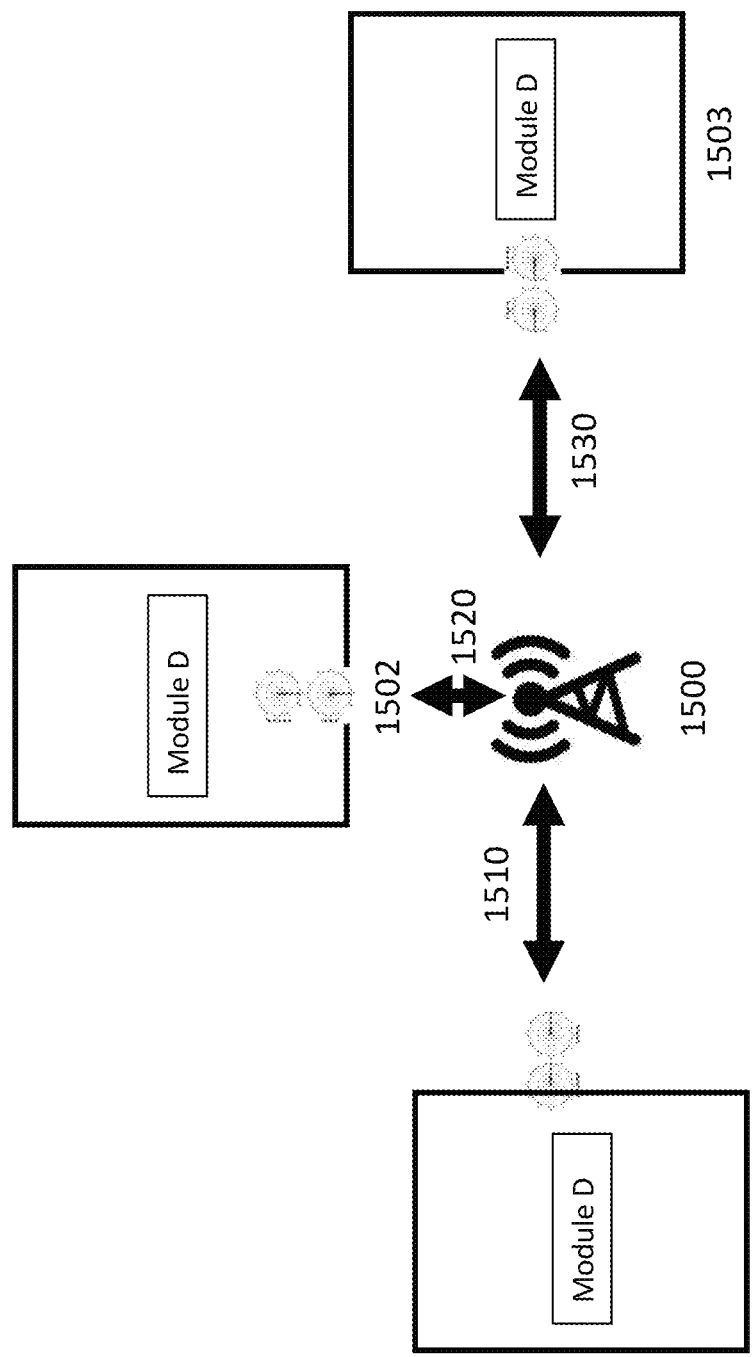
FIG. 15 depicts an example of multiple modules connected to a tower, in accordance with various aspects of this disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the network, a given network can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, system 1600 of FIG. 16 includes a tower 1610 which is similar to tower 1500 described in the context of FIG. 15. In contrast to communication system 100 in FIG. 1, wireless communication nodes 131, 132, 133, 134 and 135 host an additional Module D besides Module A/Module B or Module C that enables these wireless communication nodes to optionally establish bi-directional links with features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons including but not limited to change on the line-of-sight profile of millimeter wave link between two wireless communication nodes.

Figure 16:
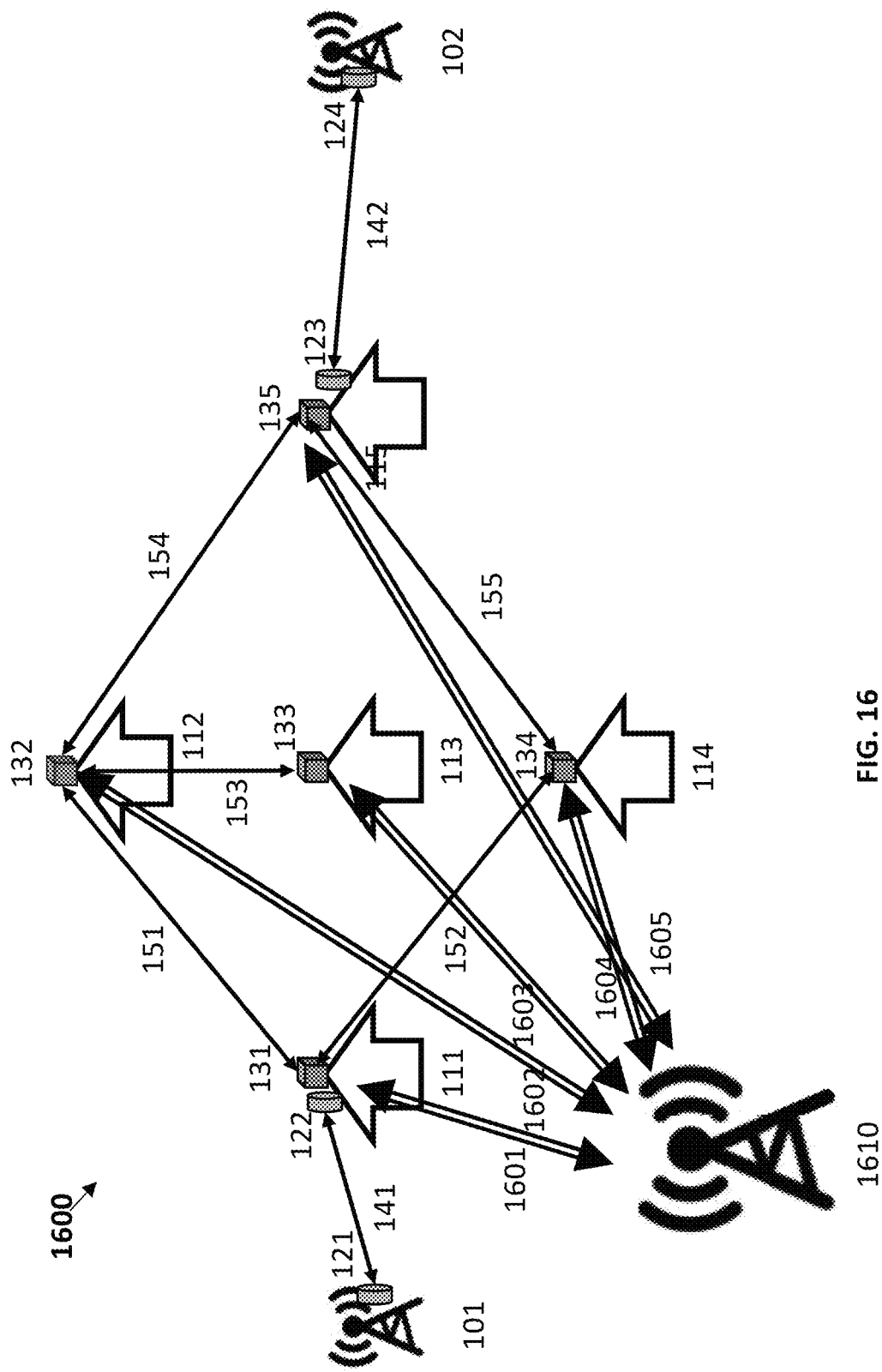
FIG. 16 depicts another example diagram relating to a wireless networking and communication system, in accordance with various aspects of this disclosure.

In FIG. 16, only one tower (i.e., tower 1610) capable of massive MIMO point-to-multipoint communication is shown to be connected to five wireless communication nodes 131-135. However, it should be understood that a communication system can also have more than one tower, each connected to multiple different wireless communication nodes hosting various other modules.

In areas within tower 1500's (and other towers of same type) coverage area, a given communication network can initially start in a point-to-multipoint manner, where tower 1500 (and other towers of same type) provides access to individual customers using sub 6 Ghz massive MIMO point-multipoint beams. Later, nodes in the given communication network can opportunistically connect with other nodes using regular modules (e.g. Module A/Module B/Module C) in the presence of line-of-sight. This way, the given communication network may evolve into a mesh network with point-to-point and point-to-multipoint connection between nodes in addition to each communication node having a path directly (non-line-of-sight) to tower 1500 (and other towers of same type) that fall within the coverage area.

One of ordinary skill in the art will appreciate that a route a given packet takes from a source to a destination in this network may be optimized by considering various factors including latency, congestion, reliability etc. One of ordinary skill in the art will also appreciate that a given communication network can later add seed homes (e.g., seed homes 111 and 115 in FIG. 1) along with tower/fiber access points 101 and 102 to provide alternate backhaul as per need basis.

In another embodiment, instead of providing massive MIMO point-to-multipoint networking capability using a terrestrial tower, point-to-multipoint massive MIMO capability to networks wireless communication nodes can also be provided by a satellite for example a low earth orbit (LEO) satellite. For example, referring to FIG. 17, communication system 1700 is shown that is similar to communication system 100 and has all the components described in the context of FIG. 1. Additionally, system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1710 using massive MIMO beamforming capabilities. Such links labelled as 1701, 1702, 1703, 1704 and 1705 can provide alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons including but not limited to change on the line-of-sight profile of millimeter wave link between two wireless communication nodes.

Figure 17:
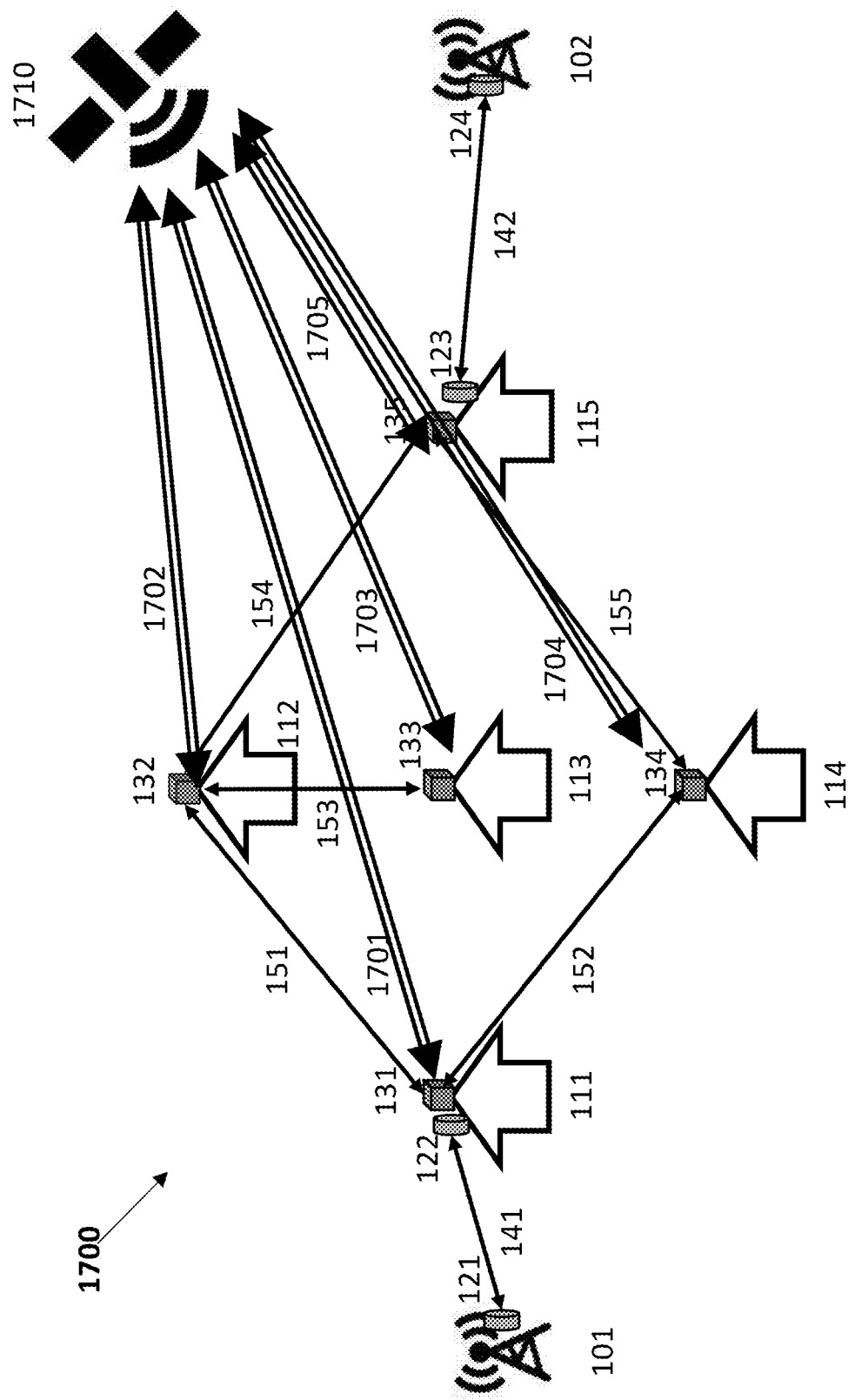
FIG. 17 depicts yet another example diagram relating to a wireless networking and communication system, in accordance with various aspects of this disclosure.

In FIG. 17, only one satellite 1710 capable of massive MIMO point-to-multipoint communication is shown to be connected to five wireless communication nodes 131-135. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to provide transport backhaul data between an end user and a network using multiple different types of communication links. For example, referring to FIG. 18, communication system 1800 is shown that is similar to communication system 100 and has all the components described in the context of FIG. 1. Additionally, system 1800 of FIG. 18 includes a satellite 1810 which is capable of massive MIMO transmission and reception on frequencies including but not limited to 5-6 Ghz, similar to tower 1500 described in the context of FIG. 15. System 1800 also includes a massive MIMO cable tower 1820 which is also similar to tower 1500 described in the context of FIG. 15.

Figure 18:
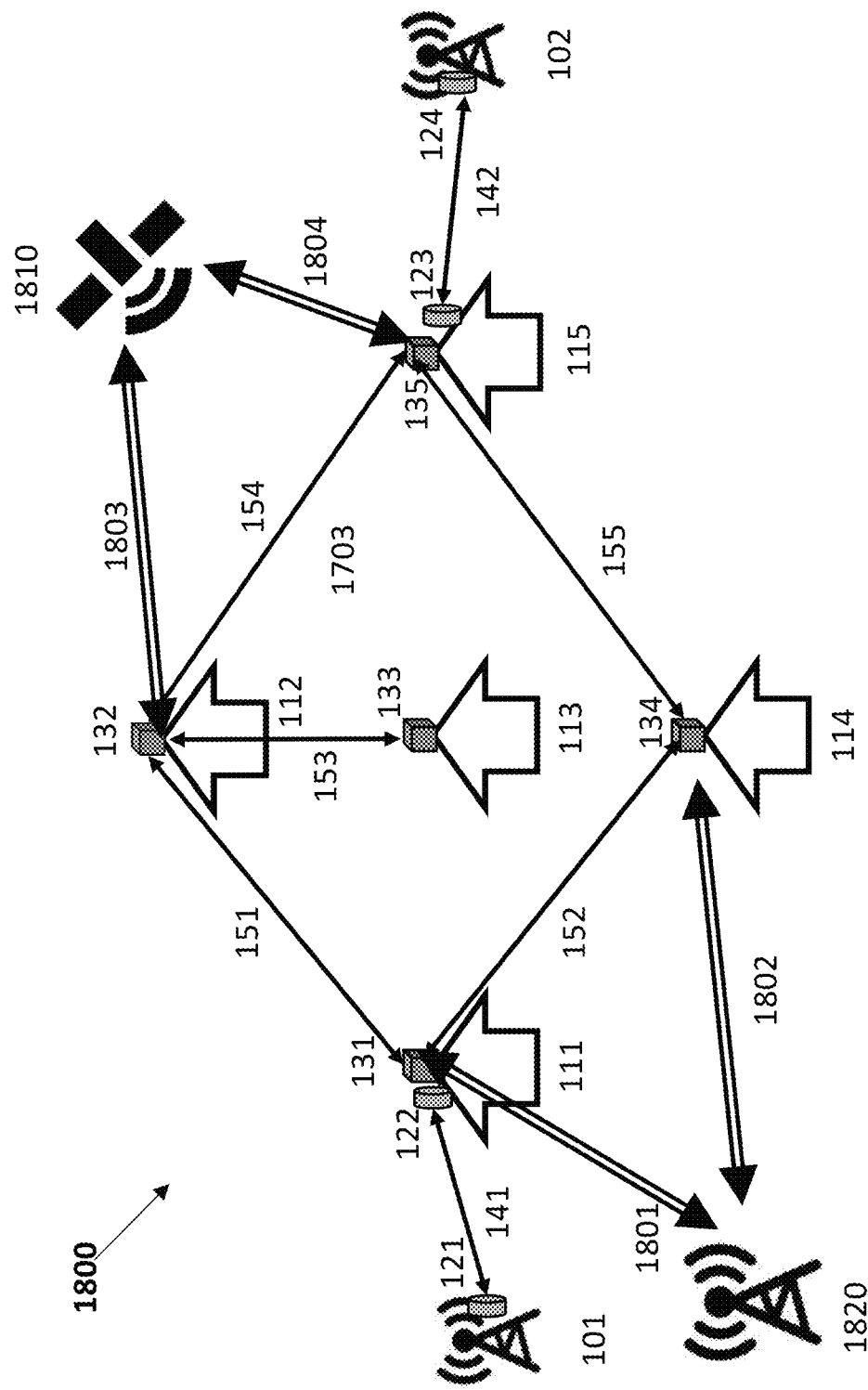
FIG. 18 depicts still another example diagram relating to a wireless networking and communication system, in accordance with various aspects of this disclosure.

In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1810 and tower 1820 using massive MIMO beamforming capabilities. Such links labeled as 1801, 1802, 1803 and 1804 can provide an alternate communication path to wireless communication nodes 131, 132, 133, 134 and 135 in an event where point-to-point or point-to-multipoint links that connect one wireless communication node to a peer wireless communication node to form a mesh network fails or experience performance degradation due to various reasons, including but not limited to change in the line-of-sight profile of a millimeter wave link between two wireless communication nodes. Specifically, satellite 1810 in FIG. 18 is connected to seed home 115 using wireless communication node 135 via link 1804 and to anchor home 112 using wireless communication node 132 via link 1803. Seed home 115 thus has multiple options to route backhaul traffic to the network.

In one embodiment, seed home 115 using wireless communication node 135 at a given time can pick a satellite link 1804 to transport backhaul data, and based on some trigger at a different time, instruct wireless communication module 135 to switch links for backhaul data transmission from 1804 to a point-to-point or point-to-multipoint millimeter wave (e.g. E-band) based link coupled to tower/fiber access point 102. Such trigger may include latency, bandwidth, packet loss requirements, etc. of a particular application.

FIG. 18 also shows an end user home 113 where wireless communication node 133 transports the data using anchor home 112's wireless communication node 132. Wireless communication node 132 is shown to have multiple options to transport end user data of home 113, including direct satellite link connection using 1803, in-direct satellite link connection using 1804 via anchor node 135, or though point to point/point-multi-point connections using millimeter wave through towers 101 or 102 via seed homes 111 and 115 respectively, among other options.

In one embodiment, wireless communication node 132 can dynamically switch its connection link to route data to and from end user home 113. For example, due to some trigger similar to the triggers described above, wireless communication node 132 can dynamically switch from satellite link 1803 to satellite link 1804 via wireless communication node 135 to transport data to and from end user home 113.

It should be understood that links 1803 and 1804 can be part of same massive MIMO beam or links 1803 and 1804 can be part of different massive MIMO beams. It should also be understood that satellite links 1802 and 1804 can use the same frequency range of communications or can operate in different frequency ranges. Further, while FIG. 18 shows only one satellite (i.e., satellite 1810) capable of massive MIMO point-to-multipoint communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to seed home 111 using wireless communication node 135 via link 1804 and to anchor home 112 using wireless communication node 131 via link 1801 and to anchor home 114 using wireless communication node 134 via link 1802. This provides anchor home 114 with options to route packets to the network in multiple ways including (a) through point-to-point or point-to-multipoint millimeter wave-based links 152 or 155, and (b) via direct massive MIMO based link to tower 1820 via link 1802.

Similarly, seed home 111 has multiple options to route backhaul traffic to the network. In one embodiment, seed home 111 using wireless communication node 131 at a given time can pick a satellite link 1801 to transport backhaul data and based on some trigger at a different time, instruct wireless communication module 131 to switch links for backhaul data transmission from 1801 to a point-to-point or point-to-multipoint millimeter wave (e.g. E-band) based link coupled to tower/fiber access point 101. Such trigger may include latency, bandwidth, packet loss requirements, etc. of a particular application.

In FIG. 18, only one tower (i.e., tower 1820) capable of massive MIMO point-to-multipoint communication is shown to be connected to two wireless communication nodes 131 and 134. However, it should be understood that a communication system can also have a different number of massive MIMO towers, each connected to multiple different wireless communication nodes hosting various other modules.

In another embodiment, one or more wireless communication nodes described above and discussed with respect to FIGS. 1-18 may additionally be an edge computing node by hosting a processor (separate or shared), memory, digital contents, software, and storage, among other components for computing, and other required operations for edge computing, in addition to the high speed low latency networking capability that has already been described above. This enables a given communication system to provide cloud services in a distributed manner closer to an end user as wireless communication nodes are distributed across the network and provide an interface between the network and an end-user. This memory unit can store a copy of local digital contents and can additionally store portions of digital content that that are not local. The non-local digital contents among other things can include digital content belonging to other nodes. This provides content redundancy in a communication system. Hence, when an end user of a communication system requests for digital content, then this edge computing mechanism allows a request to be fulfilled in a variety of different ways, including a request processed by a local node and/or remote node based on various criteria including but not limited to latency, network congestion, etc. of the application making the request.

In accordance with the present disclosure, in some embodiments, the disclosed systems and methods relate to and account for designing and constructing a wireless mesh network with long hop links and/or short hop links.

Figure 19:
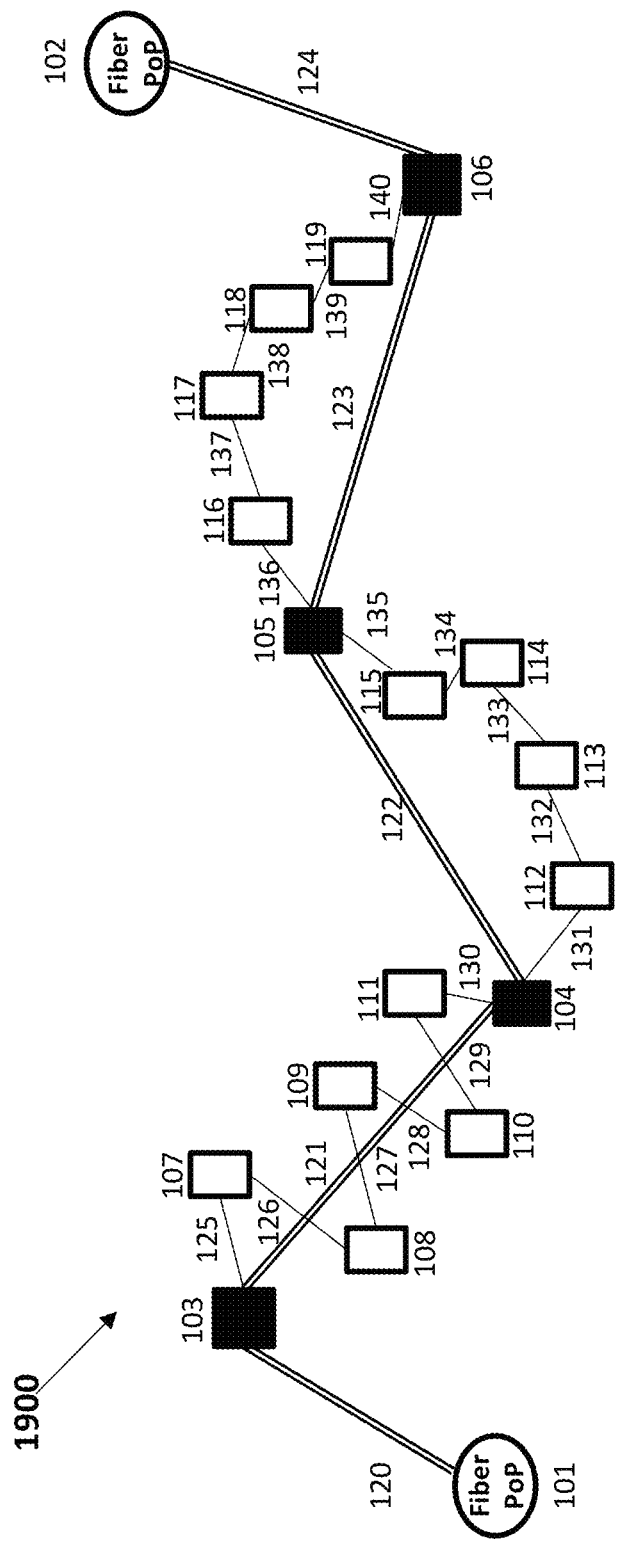
FIG. 19 shows an example diagram relating to wireless networking and communication systems, in accordance with various aspects of this disclosure.

As one example to illustrate, FIG. 19 shows an example data communication network capable of providing multi-gigabit internet speeds through wireless point-to-point and point-to-multipoint links. Communication network 1900 in FIG. 19 includes Tower/fiber access points (fiber PoPs) 101 and 102.

Tower/fiber access points 101 and 102 can be co-located or can be located at different physical locations. Tower/fiber access points 101 and 102 have access to high bandwidth dark fiber capable of providing up to several hundred gigabits/second of data throughput. Tower/fiber access points provide backhaul connectivity between the core network/data center (not shown in FIG. 19 for the sake of simplicity) and a seed home of the communication network described below. Tower/Fiber access points 101 and 102 host hardware equipment that establish wireless point-to-point connectivity with communication nodes 103 and 106 respectively.

Specifically, fiber PoP 101 is connected to wireless communication node 103 via the long hop link 120 that is capable of operating on high bandwidth (multiple gigahertz) signals operating at very high frequency (e.g., 6 Ghz~100 Ghz such as 28 Ghz, V band, E band, etc.). Similarly, fiber PoP 102 is connected to wireless communication node 106 via the long hop link 124 that is capable of operating on high bandwidth (multiple gigahertz) signals operating at very high frequency (e.g., 6 Ghz~100 Ghz such as 28 Ghz, V band, E band, etc.).

In addition, wireless communication node 103 is connected to wireless communication node 104 via long hop link 121, wireless communication node 104 is connected to wireless communication node 105 via long hop link 122, and finally wireless communication node 105 is connected to wireless communication node 106 via long hop link 123 as shown in FIG. 1.

The long hops link 120, 121, 122, 123 and 124 may have longer length compared to short hop links. For example, in one embodiment, longer hop links can have 500~600 meters length. In a different embodiment, long hops links can be shorter or longer than 500~600 meters.

Communication network 1900 also comprises a number of short hop links as shown in FIG. 19. Specifically, wireless communication node 103 is connected with wireless communication node 107 via the short hop link 125, wireless communication node 107 is connected with wireless communication node 108 via short hop link 126, wireless communication node 108 is connected with wireless communication node 109 via short hop link 127, wireless communication node 109 is connected with wireless communication node 110 via short hop link 128, wireless communication node 110 is connected with wireless communication node 111 via short hop link 129, and wireless communication node 111 is connected with wireless communication node 104 via short hop link 130 to close the zig-zag path of short hop links that originates from wireless communication node 103 and ends at wireless communication node 104.

Similarly, FIG. 19 shows that wireless communication node 104 is connected with wireless communication node 112 via short hop link 131, wireless communication node 112 is connected with wireless communication node 113 via short hop link 132, wireless communication node 113 is connected with wireless communication node 114 via short hop link 133, wireless communication node 114 is connected with wireless communication node 115 via short hop link 134, and wireless communication node 115 is connected with wireless communication node 105 via short hop link 135 to close the path of short hop links that originate from wireless communication node 104 and end at wireless communication node 105.

Likewise, FIG. 19 shows that wireless communication node 105 is connected with wireless communication node 116 via short hop link 136, wireless communication node 116 is connected with wireless communication node 117 via short hop link 137, wireless communication node 117 is connected with wireless communication node 118 via short hop link 138, wireless communication node 118 is connected with wireless communication node 119 via short hop link 139, and wireless communication node 119 is connected with wireless communication node 106 via short hop link 140 to close the path of short hop links that originate from wireless communication node 104 and end at wireless communication node 105.

In this respect, the path of short hop links that connect wireless communication node 103 to wireless communication node 104 is shown to consist of 5 intermediary wireless communication nodes 107-111 and 6 short hop links 125-130. Similarly, path of short hop links that connect wireless communication node 104 to 105 and 105 to 106 each consists of 4 intermediary wireless communications nodes and 5 short hop links. However, it should be understood that wireless communication system 1900 can have any number of intermediary nodes in the path of short hop links that connect two wireless communication nodes that are already connected directly to each other via long hop link.

In accordance with the present disclosure, the use of long hop links in combination with short hop links greatly reduces the maximum number of hops that data packets need to pass in order to transport packets between an end user and a fiber PoP. For example, consider an end user associated with wireless communication node 113. In the absence of long hop links 121, 122 and 123, a data packet originated from an end-user connected with wireless communication node 113 would pass through a large number of intermediary wireless communication nodes. For instance, in the event where a packet needs to be transmitted between fiber PoP 101 and wireless communication node 113, the packet would go through 8 intermediary nodes including 112, 104, 111, 110, 109, 108, 107, and 103 under such a scenario where no long hop links are available in the mesh network. However, as shown in the FIG. 19, in the presence of long hop links, the packet would only go through 3 nodes including 112, 104 and 103 as wireless communication nodes 103 and 104 are directly connected via long hop link 121. This greatly reduces the latency or packet delay as packet delay as latency increases linearly with the increasing number of intermediary nodes.

The example above shows how an end-user associated with wireless communication node 113 can benefit from the presence of long hop links for improving the latency or packet delay. However, it should be understood that end-users associated with a large number of wireless communication nodes (especially the ones that are indirectly connected to wireless communication nodes with long hop links) can benefit from the presence of long hop links to improve network latency or packet delay. In addition, the presence of long hop links improve the reliability of the network by increasing the number of available wireless mesh network paths between the source and the destination. For example, an end user associated with wireless communication node 113 can take A) a path consisting of intermediary nodes 112↔104↔103↔101, B) a path consisting of intermediary nodes 112↔104↔111↔110↔109↔108↔107↔103 ↔101, C) a path consisting of intermediary nodes 114↔115↔105↔106↔102, D) a path consisting of intermediary nodes 114↔115↔105↔116 ↔117↔118↔119↔106↔102 to connect to the core network. These alternative paths increase reliability of the overall network. For example, in the event that short hop link 125 fails, option B described above for the end user of wireless communication node 113 may not be available. However, other options including A, C and D may still be available to transfer packets or traffic between wireless communication node 113 and the core network.

Bi-directional communication links 120 to 140 shown in FIG. 19 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), non-orthogonal multiple access (NOMA) as described in various generations of communication technologies including 1G, 2G, 3G, 4G, 5G and 6G etc. Bi-directional communication links 120 to 140 formed by the pairs of communication nodes from the set including 101 to 119 are capable of data information transfer via a variety of digital transmission schemes including but not limited to amplitude modulation (AM), phase modulation (PM), pulse amplitude modulation/quadrature amplitude modulation (PAM/QAM), ultra-wide band (UWB) pulse modulation (pico-second pulses), etc.

In FIG. 19, two Tower/fiber access points (PoP) 101 & 102, 5 long hop bi-directional links 120-124 and 16 bi-directional point to point short hop links 125-140 are shown to illustrate an example of a communication network. However, it should be understood that communication network 100 can include a different number of Tower/fiber PoP nodes, long hop links, and/or short hop links depending on the specific layout of a particular instantiation of the communication network deployed in the field. Communication network may also contain other nodes (e.g., network switches/routers etc.) that are omitted here for the sake of simplicity.

Figure 20:
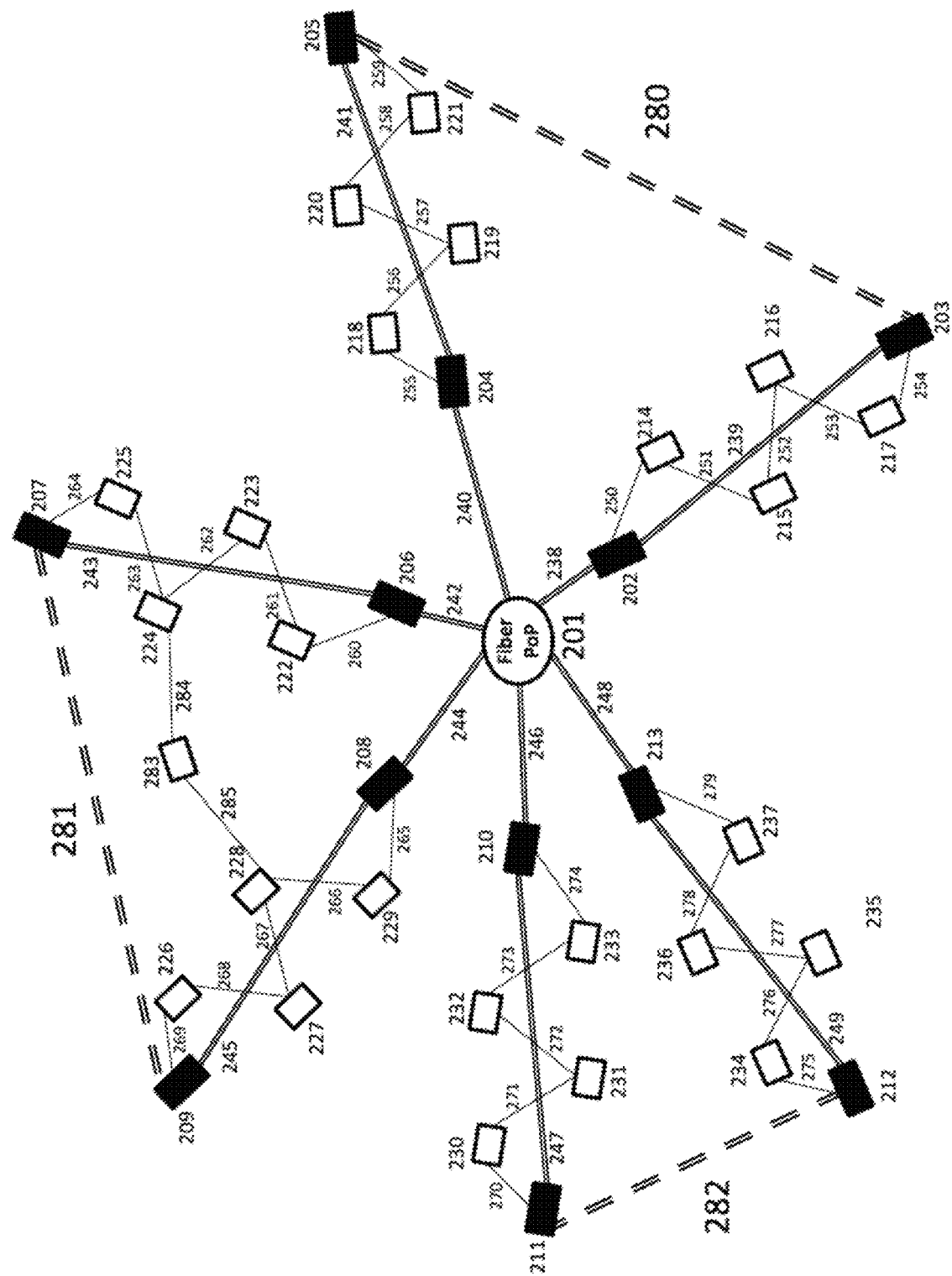
FIG. 20 shows designs illustrating exemplary methods relating to wireless networking and communication systems, in accordance with various aspects of this disclosure.

Referring to FIG. 20, another example layout of a wireless communication network comprising long hop links and short hop links is shown. Specifically, FIG. 20 shows a fiber PoP node 201, a number of segments of long hop links originating from fiber PoP 201 in the shape of wheel spokes, and wireless communication nodes interconnected via short hop links.

For example, long hop links 242 and 243 that connect the nodes 201 to 206 and 206 to 207, respectively, form a segment of long hop links (1st spoke). Similarly, long hop links 244 and 245 that connect node 201 to 208 and 208 to 209, respectively, form another segment of long hop links ($2^{nd}$ spoke). Likewise, long hop links 246 and 247 that connect node 201 to 210 and 210 to 211, respectively, form another segment of long hop links (3rd spoke). In the same manner, long hop links 248 and 249 that connect node 201 to 213 and 213 to 212, respectively, form another segment of long hop links (4th spoke). Similarly, long hop links 238 and 239 that connect node 201 to 202 and 202 to 203, respectively, form another segment of long hop links ($5^{th}$ spoke). Similarly, long hop links 240 and 241 that connect node 201 to 204 and 204 to 205, respectively, form another segment of long hop links ($6^{th}$ spoke).

The different spokes that are formed from segments of long hop links are also interconnected via long hop links. For example, the $1^{st}$ spoke and $2^{nd}$ spoke are connected via long hop link 281. Similarly, the $3^{rd}$ and $4^{th}$ spokes are connected via long hop link 282 and the $5^{th}$ and $6^{th}$ spokes are interconnected via long hop link 280 as shown in FIG. 20.

FIG. 20 shows 6 segments of long hop links or spokes originating from fiber PoP 201. However, it should be understood that a wireless mesh network layout can have any number of spokes, which may depend on the specific terrain of the network, density of homes (potential node locations) and line-of-sight profile.

The example network layout in FIG. 20 also shows a number of wireless communication nodes connected to each other and to those wireless communication nodes that are already connected via long hop links through short hop links. Specifically, wireless communication node 201 is connected to wireless communication node 214 via short hop link 250, wireless communication node 214 is connected to wireless communication node 215 via short hop link 251, wireless communication node 215 is connected to wireless communication node 216 via short hop link 252, wireless communication node 216 is connected to wireless communication node 217 via short hop link 253, and wireless communication node 217 is connected to wireless communication node 203 via short hop link 254 to form a segment of short hop links that connects the wireless communication node 202 and 203, thereby providing an alternative path between nodes 202 and 203.

Similarly, wireless communication node 204 is connected to wireless communication node 218 via short hop link 255, wireless communication node 218 is connected to wireless communication node 219 via short hop link 256, wireless communication node 219 is connected to wireless communication node 220 via short hop link 257, wireless communication node 220 is connected to wireless communication node 221 via short hop link 258, and wireless communication node 221 is connected to wireless communication node 205 via short hop link 259 to form a segment of short hop links that connects the wireless communication node 204 and 205, thereby providing an alternative path between nodes 204 and 205.

Likewise, wireless communication node 206 is connected to wireless communication node 222 via short hop link 260, wireless communication node 222 is connected to wireless communication node 223 via short hop link 261, wireless communication node 223 is connected to wireless communication node 224 via short hop link 262, wireless communication node 224 is connected to wireless communication node 225 via short hop link 263, and wireless communication node 225 is connected to wireless communication node 207 via short hop link 264 to form a segment of short hop links that connects the wireless communication node 206 and 207, thereby providing an alternative path between nodes 206 and 207.

Similarly, other short hop links ranging from 265 to 279 connect a number of wireless communication nodes to each other. Nodes belonging to different spokes or segments of long hop links can also be interconnected via short hop links. For example, node 224 and node 228 are associated with two different spoke or segments of long hop links. However, both 224 and 228 are connected to another wireless communication node 283 via short hop links 284 and 285, respectively, thereby creating a path along wireless mesh network that can connect nodes associated with different spokes via short hop links in addition to long hop links 280, 281 and 282 described above.

In addition, it is also possible to connect any to adjacent spokes via direct long hop links. For example, although not shown in FIG. 20, it is also possible to connect wireless communication node 211 and wireless communication node 209 via a long hop link in the presence of line-of-sight path between 211 and 209. Similar to the example network layout of FIG. 19, the example layout of FIG. 20 comprising long hop links and short hop links greatly reduces the maximum number of links a data packet needs to pass through before reaching a destination. In addition, long hop links increase the reliability of a network by providing alternative paths in the event an original path of traffic flow breaks due to failure of a link (or multiple links).

Figure 21:
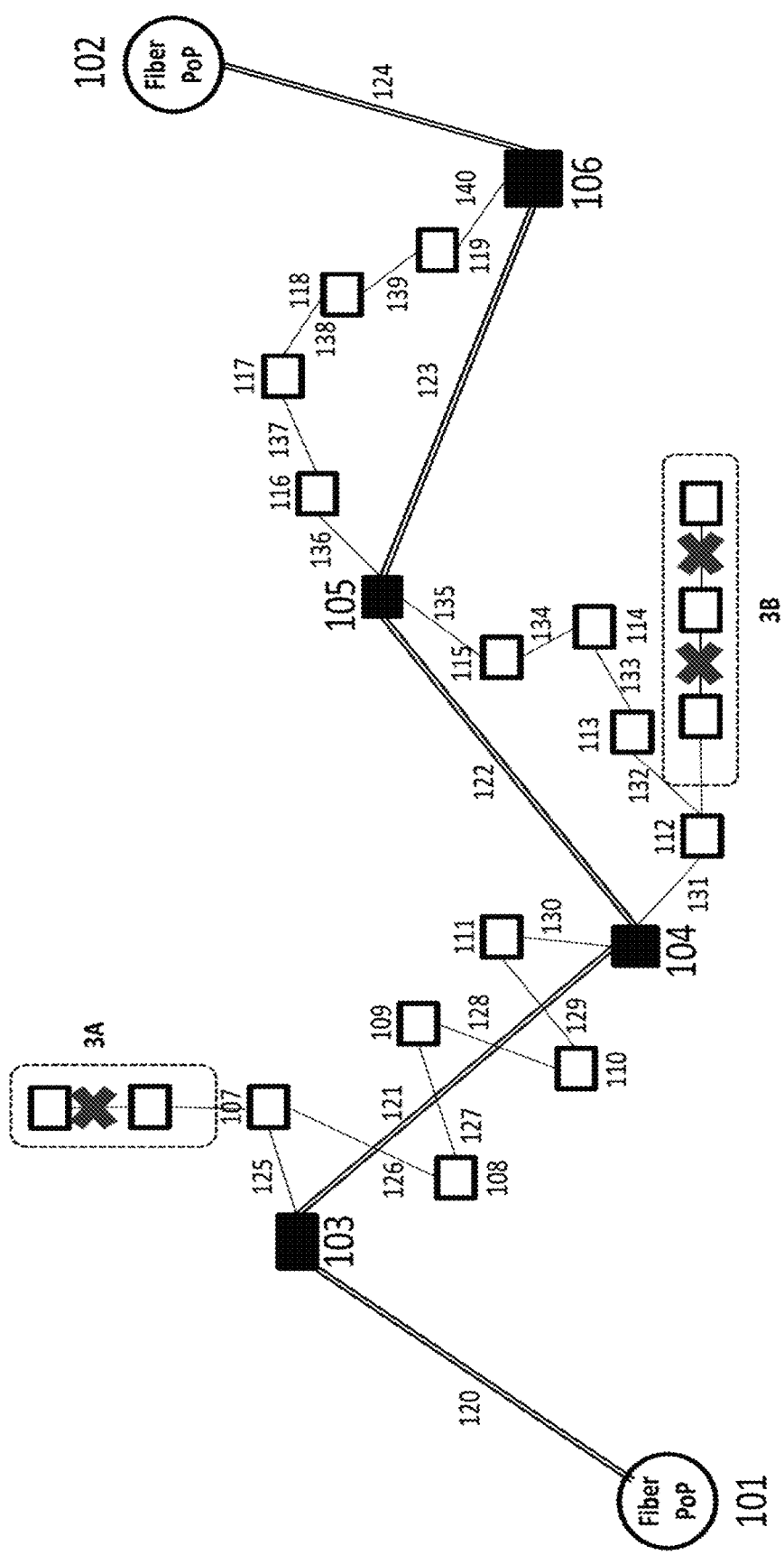
FIG. 21 shows designs illustrating exemplary methods relating to wireless networking and communication systems, in accordance with various aspects of this disclosure.

Referring to FIG. 21, another example mesh network design is depicted, where adjacent short hop links are constrained to not form a straight line in order to avoid mutual interference from adjacent wireless communication nodes. For example, consider segment 3A consisting of two nodes that are directly above wireless communication node 107. The short hop link that connects these two nodes above of node 107 cannot be allowed as it would cause interference to node 107 as their signal propagation path overlaps. Similarly, segment 3B consists of 3 nodes that are on the right side of node 112. The two short hop links in segment 3B cannot be allowed as they may cause interference for node 112 as their signal propagation path overlaps. In general, nodes that are connected via short hop links in such a manner (e.g., in a segment of short hop links that form a straight line) cannot be allowed as they may cause interference among adjacent nodes connected via short hop links.

Figure 22:
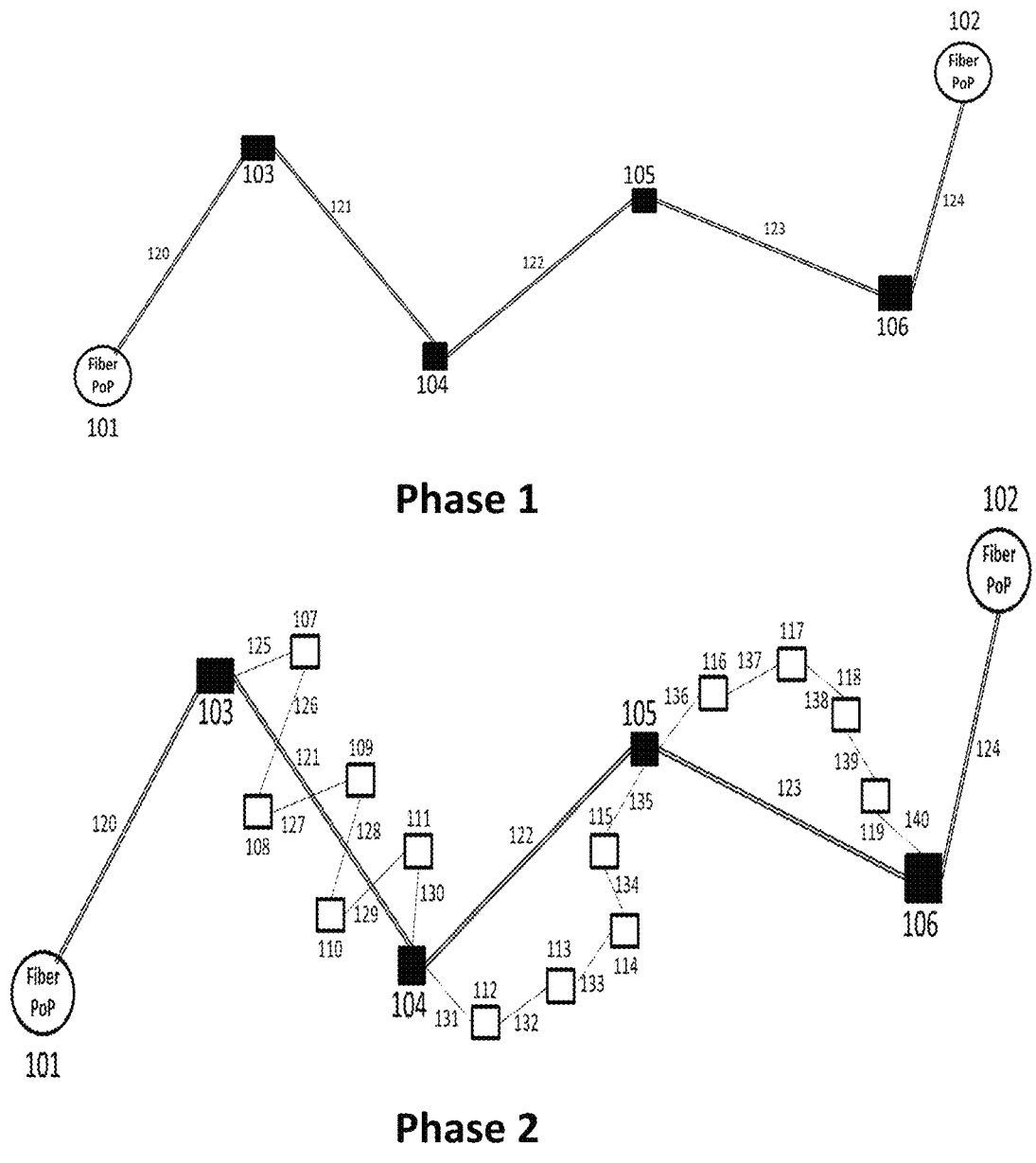
FIG. 22 shows designs illustrating exemplary methods relating to wireless networking and communication systems, in accordance with various aspects of this disclosure.

In accordance with the present disclosure, as noted above, the disclosed wireless mesh network can be built in phases. For example, as shown in FIG. 22, the first phase may involve building the network with only long hop links. This allows quick access and coverage to large areas with a small number of nodes. In the second phase, short hop links may be added to provide connectivity to a large number of end users that are spread over a large region with the help of long hop links that were created in the first phase. Availability of long hop links in the second phase allows easy design of short hop links as segments of short hop links can be terminated at any close by node that is connected to via a long hop link to another node or fiber PoP.

Figure 23:
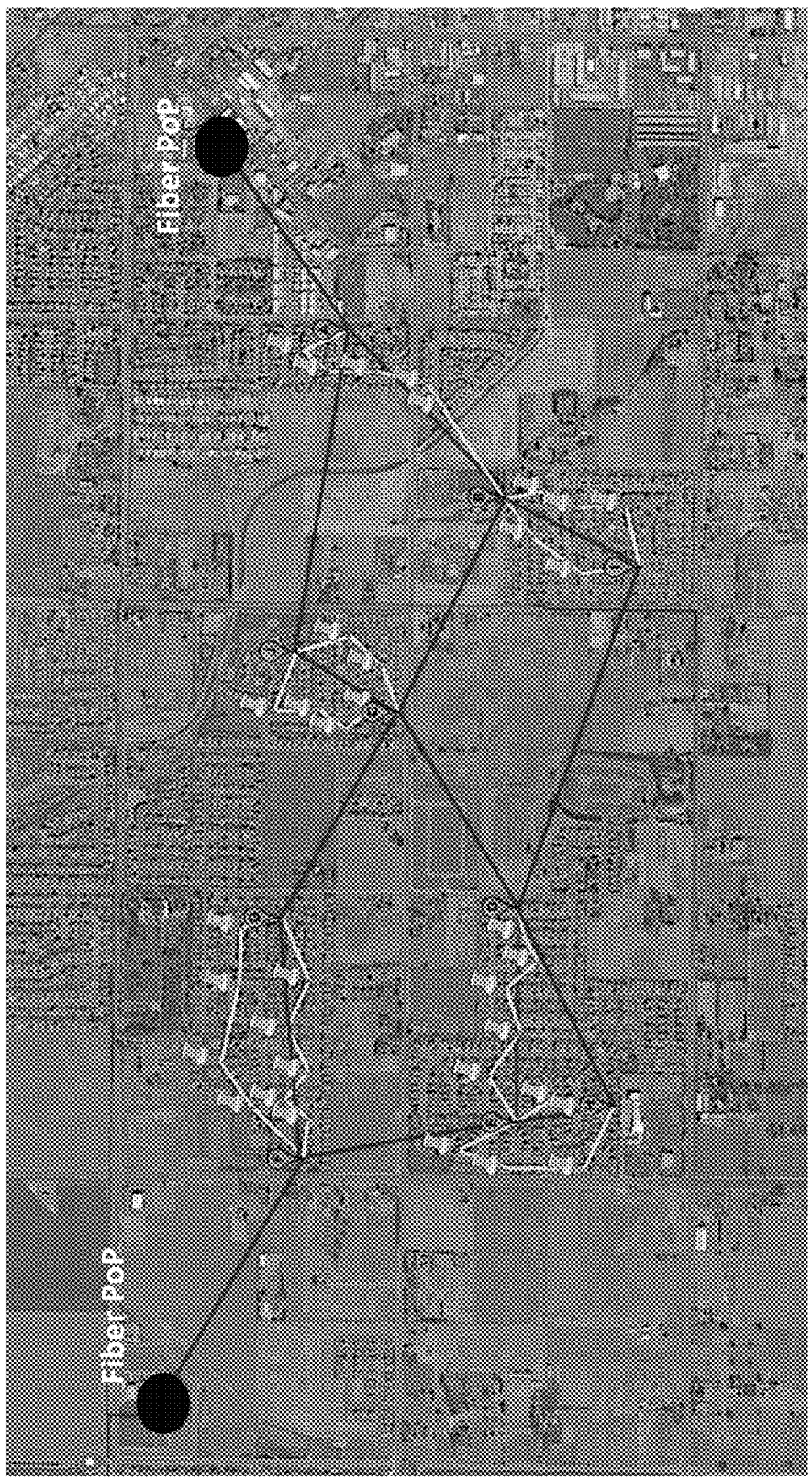
FIG. 23 shows designs illustrating exemplary methods relating to wireless networking and communication systems, in accordance with various aspects of this disclosure.

FIG. 23 shows an example real-world depiction of techniques and design principles disclosed herein. Black lines in FIG. 23 represent long hop links described in the context of the figures above and white lines represent short hop links that provide connectivity to end users. Long hop links help connect the wireless mesh network to the two fiber PoP shown with black circles in the FIG. 23. It can be readily seen that use of long hop links greatly reduces the maximum number of links a data packet is required to pass through in order to reach from source to destination there by improving the latency and packet delay of the network. As noted above, long hop links also improve the overall network reliability by providing alternate paths for traffic flow in case an original path fails.

As noted above, current wireless mesh networking systems may exhibit many shortcomings, including failing to provide alternative communication paths in the event of a change in LOS conditions of a link/path between two or more nodes due to various reasons, including but not limited to vegetation growth, loss of an intermediary network node, etc.

Figure 24:
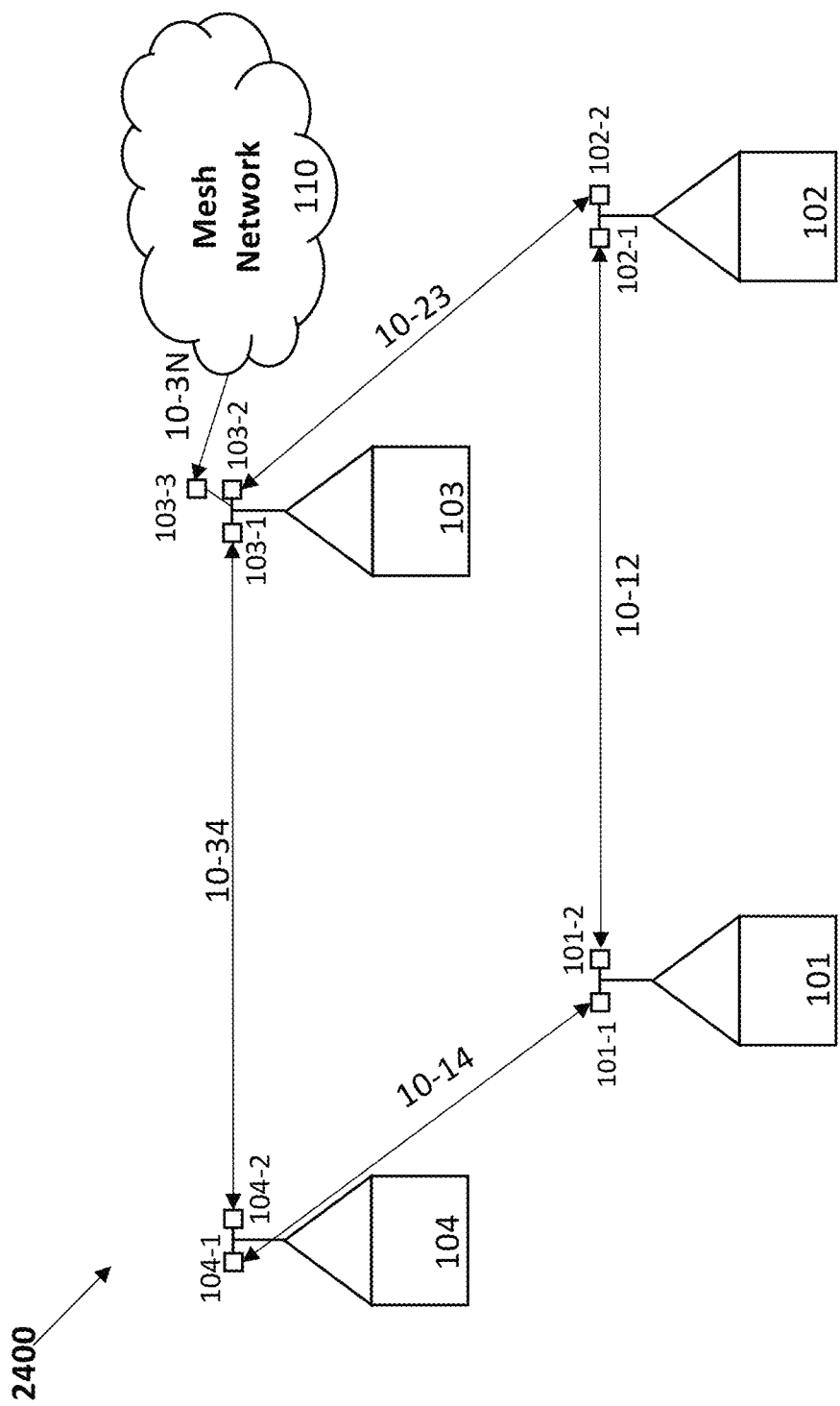
FIG. 24 depicts an example data communication network, in accordance with various aspects of this disclosure.

In accordance with the present disclosure, a data communication network capable of providing multigigabit internet speeds through wireless point-to-point and point-to-multipoint links is illustrated in FIG. 24 with respect to communication network 2400. As shown, a portion of wireless mesh network comprising 4 network nodes (i.e., nodes 101, 102, 103 and 104) are connected with the rest of mesh network 110. Mesh network 110 may comprise multiple nodes of various types (e.g., ptp/ptmp nodes, routers, switches, gateways, etc.) and may also include links that connect mesh network 110 to a CORE network (e.g., a data center, ISP, IMS, EMS, billings, AAA, etc.) that are not shown for the sake of simplicity.

Specifically, nodes 101, 102, 103 and 104 are connected to the rest of the mesh network 110. As shown, mesh network node 101 hosts two point-to-point/point-to-multipoint nodes 101-1 and 101-2. Likewise, mesh network node 102 hosts two point-to-point/point-to-multipoint nodes 102-1 and 102-2, mesh network node 103 hosts three point-to-point/point-to-multipoint nodes 103-1, 103-2 and 103-3, and mesh network node 104 hosts two point-to-point/point-to-multipoint nodes 104-1 and 104-2.

In FIG. 24, mesh network nodes are shown to host 2 or 3 nodes, but it should be generally understood that mesh network nodes can host one or more point-to-point/point-to-multipoint (ptp/ptmp) nodes.

As further shown in FIG. 24, ptp/ptmp node 101-2 of mesh node 101 and ptp/ptmp node 102-1 of mesh node 102 establish a bi-directional narrow beam link 10-12 to connect mesh nodes 101 and 102. Similarly, ptp/ptmp node 102-2 of mesh node 102 and ptp/ptmp node 103-2 of mesh node 103 establish a bi-directional narrow beam link 10-23 to connect mesh nodes 102 and 103, ptp/ptmp node 103-1 of mesh node 103 and ptp/ptmp node 104-2 of mesh node 104 establish a bi-directional narrow beam link 10-34 to connect mesh nodes 103 and 104, ptp/ptmp node 104-1 of mesh node 104 and ptp/ptmp node 101-1 of mesh node 101 establish a bi-directional narrow beam link 10-14 to connect mesh nodes 101 and 104, and ptp/ptmp node 103-3 of mesh node 103 and ptp/ptmp node of mesh network (not shown) establish a bi-directional narrow beam link 10-3N to connect mesh nodes 103 (and group of three other nodes 101, 102, 104 indirectly) and the rest of the mesh network 110 of communication network 2400.

Although FIG. 24 highlights just four nodes, it should be understood that any number of nodes can be connected to mesh network 110.

Figure 25:
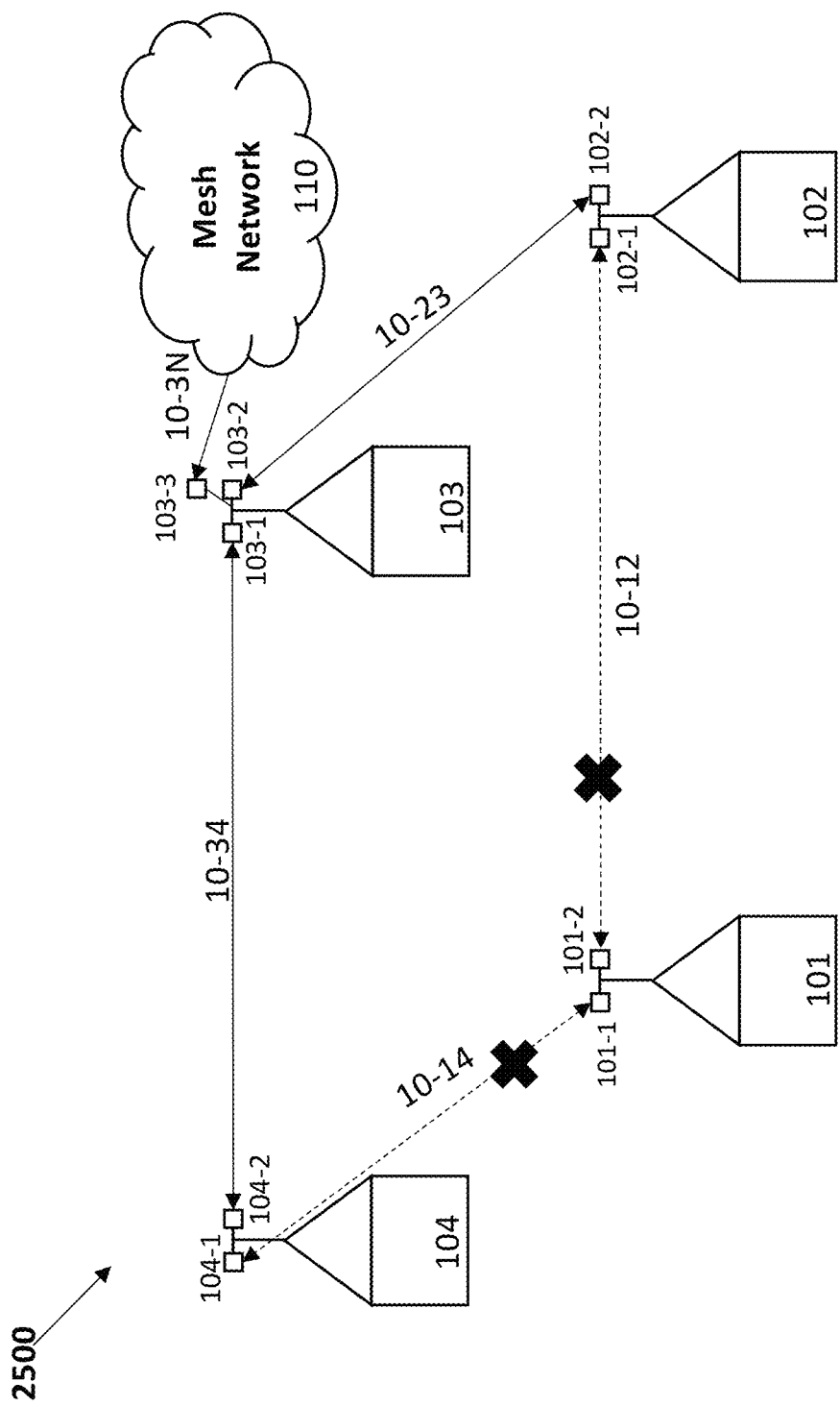
FIG. 25 depicts an example communication network after an event causing a connectivity drop, in accordance with various aspects of this disclosure.

Turning now to FIG. 25, a preferred embodiment of communication network 2500 is shown, where link 10-12 connecting mesh node 101 to mesh node 102 and link 10-14 connecting mesh node 101 and 104 have failed due to an event. As a result, connectivity of the mesh node 101 with mesh node 104 and mesh node 102 is dropped. The event causing the connectivity drop can occur due to various reasons.

As one possibility, link failures described above can occur due to loss of a mesh network node. For example, if a customer residing in node 101 leaves to a different location and cancels the subscription to the mesh network then node 101 no longer participates in the mesh network. As another example, new residents of a dwelling may remove ptp/ptmp nodes 101-1 and 101-2 from the roof (or other location where 101-1 and 101-2 were mounted) or disconnect the power supply to 101-1 and 101-2 or take an action that stops the mesh node 101 and its associated ptp/ptmp nodes 101-1 and 101-2 to communicate with other ptp/ptmp nodes of the wireless network.

As another possibility, growth of vegetation can impact the LOS connectivity between 101-2 and 102-1 for the link 10-12, and LOS connectivity between 101-1 and 104-1.

As yet another possibility, connectivity drop of the links 10-14 and 10-12 can occur due to one or more ptp/ptmp nodes malfunctioning at nodes 101, 102 and 104. The event causing the connectivity drop can occur due to various other reasons as well, including a combination of the reasons described above.

It should be understood that while two link failures are shown in FIG. 25, any number of link failures can occur at a mesh node or multiple mesh nodes and can impact multiple mesh nodes or customers. For instance, in addition to ptp/ptmp links 10-14 and 10-12 that connect mesh node 101 to mesh nodes 104 and 102, mesh node 101 can also be directly connected to other mesh nodes (not shown) via other ptp/ptmp nodes or to nodes that are not directly connected to the mesh network via ptp/ptmp as further described herein.

Figure 26:
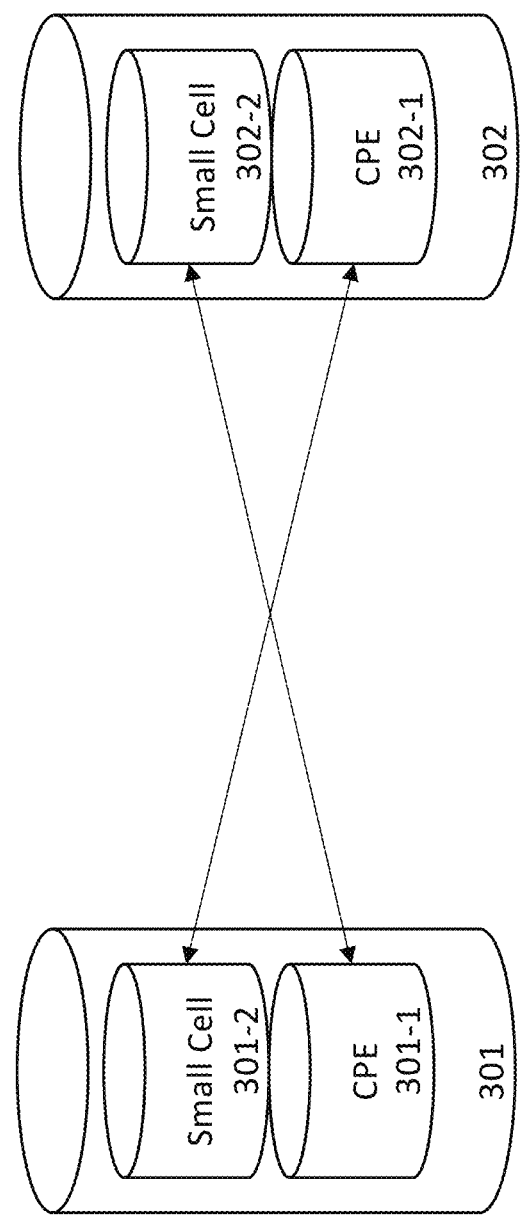
FIG. 26 depicts example communication nodes operating on wide-beam-width communication links, in accordance with various aspects of this disclosure.

Referring to FIG. 26, wireless communication nodes 301 and 302 are shown. Contrary to the narrow beam communication beams/links formed by the nodes 101-1, 101-2, 102-1, 102-2, 103-1, 103-2, 103-3, 104-1 and 104-2 described in FIGS. 24-25, the wireless communication nodes 301 and 302 operate on wide-beam-width communication links. For example, in one embodiment, a 3 dB beam width of these nodes can be 20 degrees. In another embodiments, a 3 dB beam width of communication nodes 301 and 302 can be greater than 20 degrees or less than 20 degrees. For example, the beam width of nodes 301 and 302 can be 15, 25, 30, 35, 40, 45, 50, 55, 60, 65, 70, 75, 80, 85, 90 degrees. The beam width of nodes 301 and 302 may take other values as well.

Further, nodes 301 and 302 differ from nodes 101-1, 101-2, 102-1, 102-2, 103-1, 103-2, 103-3, 104-1 and 104-2 of FIGS. 24-25 in that nodes 301 and 302 operate at much lower frequencies. For example, in some embodiments, nodes 101-1, 101-2, 102-1, 102-2, 103-1, 103-2, 103-3, 104-1 and 104-2 operate on millimeter wave frequency (e.g., 60 Ghz), while nodes 301 and 302 operate at a sub-6 Ghz frequency. This allows the links between different wide-beam-width communication nodes (e.g., nodes 301 and 302) to operate and work in a non-LOS environment, whereas links formed by 101-1, 101-2, 102-1, 102-2, 103-1, 103-2, 103-3, 104-1 and 104-2 typically require LOS or near LOS conditions.

Another way nodes 301 and 302 differ from nodes 101-1, 101-2, 102-1, 102-2, 103-1, 103-2, 103-3, 104-1 and 104-2 is that nodes 301 and 302 each contain two separate wide-beam-width wireless communication nodes in one single enclosure. For example, FIG. 26 shows that wide-beam-width communication node 301 contains small cell 301-2 and CPE 301-1. Small cell 301-2 can be a node capable of establishing and controlling communications with several CPEs and/or mobile units (not shown) simultaneously for sub-6 Ghz frequencies (or at a low frequency spectrum where strict LOS conditions is not required).

Small cell 301-2 may take various forms. As one possibility, small cell 301-2 can be a 4G LTE/LTE-A-based small cell. As another possibility, small cell 301-2 can be a 2G/3G/4G/5G/6G small cell that can operate at various frequencies and can be based on various RAN technologies (e.g., TDMA, FDMA, CDMA, OFDMA, CSMA, WiFi, 5G NR, TDD-LTE, FDD-LTE etc.) or a combination of these technologies. Small cell 301-2 may take various other forms as well.

CPE 301-1 may be capable of establishing communications with one small cell at a given time. For instance, CPE 301-1 may have multiple communications links with multiple small cells but only one small cell may act as the master/controller for those multiple connections.

CPE 301-1 may take various forms.

As one possibility, CPE 301-1 can be a 4G LTE/LTE-A-based UE. As another possibility, CPE 301-1 can be a 2G/3G/4G/5G/6G CPE that can operate at various frequencies and can be based on various RAN technologies (e.g., TDMA, FDMA, CDMA, OFDMA, CSMA, WiFi, 5G NR, TDD-LTE, FDD-LTE etc.) or a combination of these technologies. CPE 301-1 may take various other forms as well.

It should be understood that while wide-beam-width communication node 301 is shown to contain one small cell 301-2 and a single CPE 301-1, wide-beam-width communication node 301 can have multiple small cells and/or multiple CPEs.

As further shown in FIG. 26, wide-beam-width communication node 302 contains a small cell 302-2 and a CPE 302-1. Small cell 302-2 can be a node capable of establishing and controlling communications with several CPEs and/or mobile units (not shown) simultaneously for sub 6 Ghz frequencies (or at a low frequency spectrum where strict LOS conditions in not required).

Small cell 302-2 may take various forms. As one possibility, small cell 302-2 can be a 4G LTE/LTE-A-based small cell. As another possibility, small cell 302-2 can be a 2G/3G/4G/5G/6G small cell that can operate at various frequencies and can be based on various RAN technologies (e.g., TDMA, FDMA, CDMA, OFDMA, CSMA, WiFi, 5G NR, etc.) or a combination of these technologies. Small cell 302-2 may take various other forms as well.

CPE 302-1 can be node capable of establishing communications with one small cell at a given time. For instance, CPE 302-1 may have multiple communications links with multiple small cells but only one small cell can act as the master/controller for those multiple connections. CPE 302-1 may take various forms.

As one possibility, CPE 302-1 can be a 4G LTE/LTE-A-based UE. As another possibility, CPE 302-1 can be a 2G/3G/4G/5G/6G CPE that can operate at various frequencies and can be based on various RAN technologies (e.g., TDMA, FDMA, CDMA, OFDMA, CSMA, WiFi, 5G NR, TDD-LTE, FDD-LTE etc.) or a combination of these technologies. CPE 302-1 may take various other forms as well.

It should be understood that while wide-beam-width communication node 302 is shown to contain one small cell 302-2 and one CPE 302-1, wide-beam-width communication node 301 can have multiple small cells and/or multiple CPEs. Moreover, it should be understood that the entities 301-1, 301-2, 302-1 and 302-2 can also be logical entities in the sense that the same hardware can be used for both CPE and small cell functions and they may not need to be on separate hardware boards.

It should be further understood that a CPE belonging to a particular wide-beam-width communication node might not connect itself (over the air) to the small cell residing in the same enclosure but strictly connects itself to small cell(s) residing in a different wide-beam-width communication node. However, in some instances, CPEs can be connected via a wired connection to small cells residing in the same wide beam communication node.

For example, in FIG. 26, CPE 301-1 may be an LTE technology-based device. In such an example, in line with the foregoing discussion, CPE 301-1 residing in wide-beam-width communication node 301 may use an LTE technology-based protocol to connect itself to a small cell 302-2 (over the air) that belongs to a different wide-beam-width communication node 302 to establish a bi-directional link. However, it should be understood that CPE 301-1 may still have connection with small cell 301-2 over a wired interface.

As another example, CPE 302-1 may be an LTE technology-based device. In such an example, in line with the foregoing discussion, CPE 302-1 residing in wide-beam-width communication node 302 may use an LTE technology-based protocol to connect itself to a small cell 301-2 (over the air) that belongs to a different wide-beam-width communication node 301 to establish a bi-directional link. However, it should be understood that CPE 302-1 may still have connection with small cell 302-2 over a wired interface.

Figure 27:
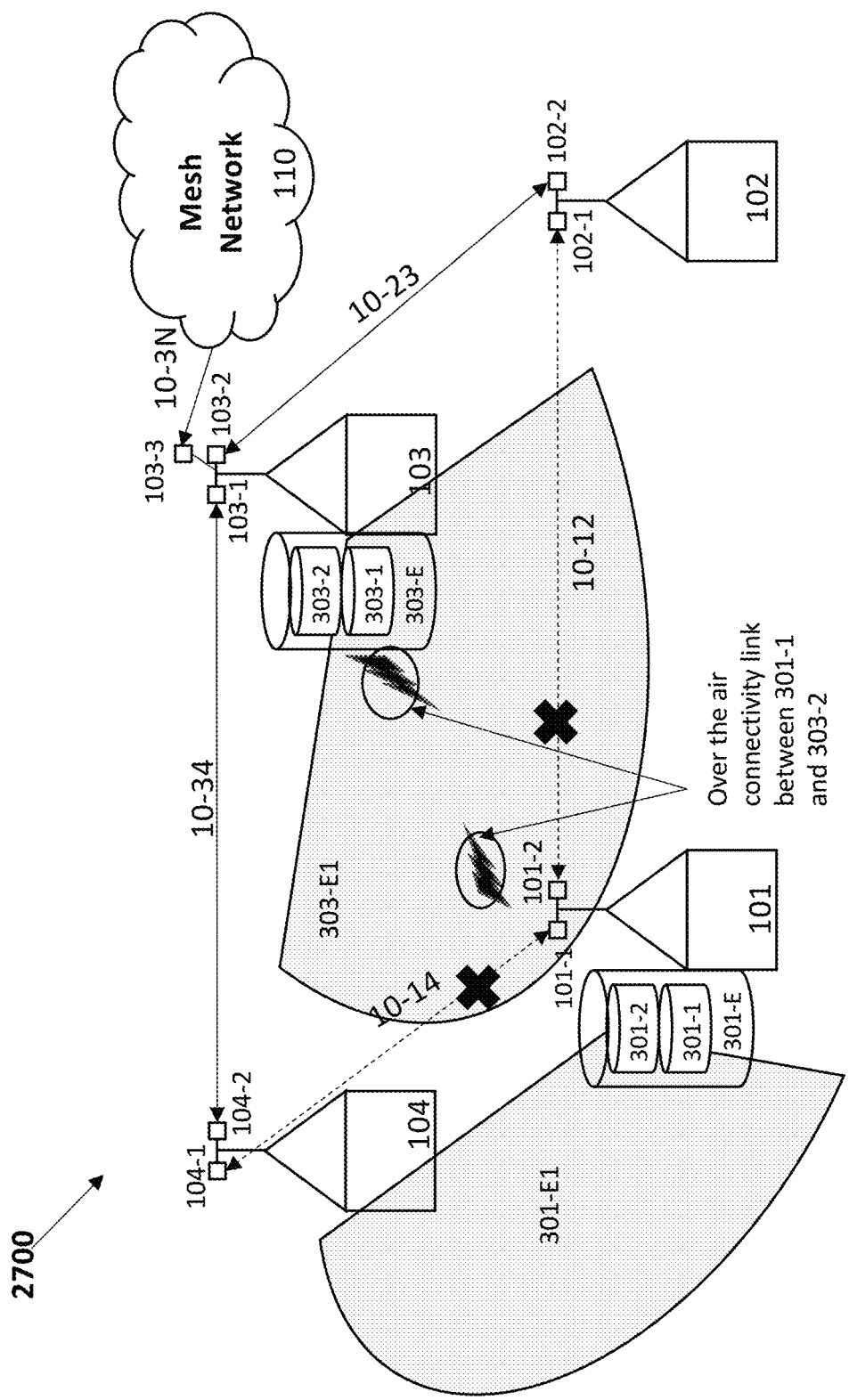
FIG. 27 depicts another example communication network, in accordance with various aspects of this disclosure.

Moving on to FIG. 27, communication network 2700 is shown. As explained in the context of FIG. 25, due to an event, links 10-12 and 10-14 may lose connectivity and mesh node 101 may lose connection from the rest of the mesh network, including its immediate neighbor nodes 102 and 104.

FIG. 27 shows that mesh node 101, in addition to ptp/ptmp nodes 101-1 and 101-2, also hosts wide-beam-width communication node 301-E. Node 301-E comprises CPE 301-1 and a small cell 301-2 (in general, node 301-E can have multiple CPEs and small cells). Small cells 301-2 of wide-beam-width communication node 301-E has a coverage area 301-E1, where other CPEs that use compatible RAN protocols can connect over the air and get data connection via 301-2. Also, wide-beam-width communication node 301-E is connected via a wired interface to ptp/ptmp links 101-1 and 101-2.

FIG. 27 also shows that mesh node 103, in addition to ptp/ptmp nodes 103-1, 103-2 and 103-3, also hosts wide-beam-width communication node 303-E. Node 303-E comprises CPE 303-1 and a small cell 303-2 (in general, node 303-E can have multiple CPEs and small cells). Small cells 303-2 of wide-beam-width communication node 303-E has a coverage area 303-E1 where other CPEs that use compatible RAN protocols can connect over the air and get data connection via 303-2. Also, wide-beam-width communication node 303-E is connected via a wired interface to ptp/ptmp links 103-1 and 103-2.

In one embodiment, CPE 301-1 residing at mesh node 101 can connect to small cell 303-2 residing at mesh node 103 over the air and can establish a link between mesh nodes 101 and 103. Hence, nodes 101-1, 101-2, and 301-2 can all coordinate and transmit their data via the link established by 301-1 between mesh node 101 and 103. In this respect, even in an event where direct ptp/ptmp links-based connectivity between mesh nodes is impacted, connectivity can be immediately restored by re-routing the traffic via a link between a CPE of the impacted node and a small cell of the wide-beam-width communication node that provides connectivity to the CPE of the impacted node.

It should be understood that while wide-beam-width communication nodes are shown only at mesh node 101 and 103, wide-beam-width communication node can reside on any or all mesh nodes of the network. Moreover, while FIG. 27 shows that connectivity is restored with CPE 301-1 of mesh node 101 and small cell 303-2 of mesh node 103, a different set of CPEs and small cells can also establish a link if failure occurs at a different mesh node. For example, if ptp/ptmp link failure occurs at node 103 that breaks links 10-34 and 10-23, then CPE 303-1 of mesh node 103 and small cell 301-2 of mesh node 101 can coordinate to reestablish the connectivity between mesh nodes.

Further, it should be understood that in one embodiment, all the different collocated nodes including wide-beam-width communication nodes and multiple ptp/ptmp nodes can be in one box or enclosure. In other embodiments, collocated wide-beam-width communication nodes and ptp/ptmp nodes can be in separate boxes or enclosures.

For a wide-beam-width communication node that carries a one or more small cells and a one or more CPEs, wireless communication operations can easily be performed if all CPE(s) and small cell(s) use different set of frequencies at one instant of time such that frequencies are far apart from each other so that no self-interference issues arise. For example, assume a wide-beam-width communication node has a single small cell and a single CPE. Since a small cell and a CPE are collocated in the same enclosure of the wide-beam-width communication node, they are required to operate at two different frequencies at one instant of time. Otherwise, transmission and reception of the small cell will be impacted by the transmission and reception of the CPE and vice versa. Moreover, these frequencies need to be separated in the spectrum band such that side lobes of one frequency become very weak at the other frequency. If the CPE(s) and small cell(s) of a wide-beam-width communication node can only operate on the same frequency, then only one entity (either CPEs or small cell(s)) can operate and other entity is required to shut down its operations during a given time.

Figure 28:
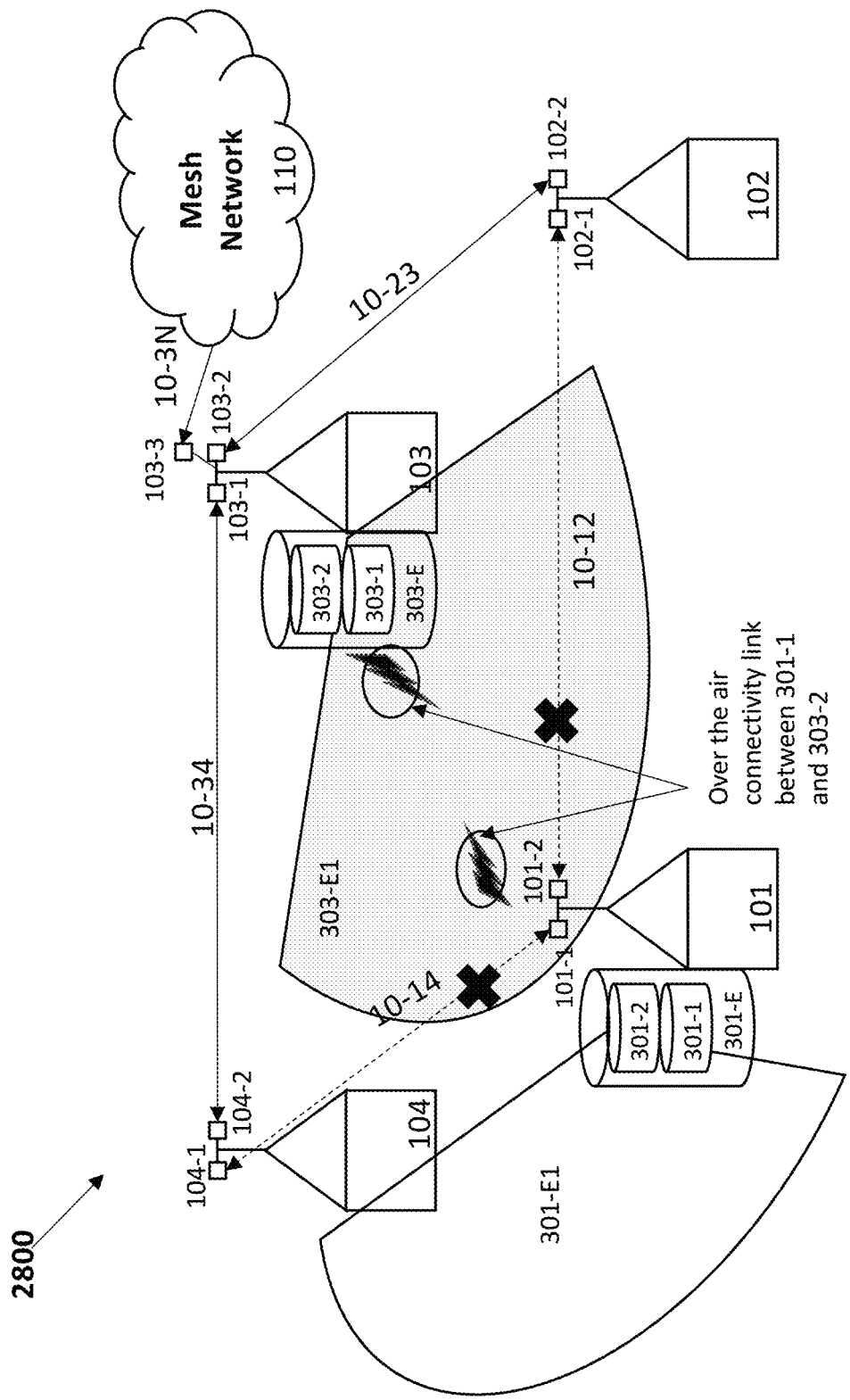
FIG. 28 depicts yet another example communication network, in accordance with various aspects of this disclosure.

As one example to illustrate, FIG. 28 depicts communication network 2800. During time instances when CPE 301-1 of wide-beam-width communication node 301-E communicates with small cell 303-2 of wide-beam-width communication node 303-E, small cell 301-2 of wide-beam-width communication node 301-E is required to shut down its operations in order to avoid causing interference with the transmission and reception of CPE 301-1. This will impact the connectivity of other CPEs (not shown in FIG. 28) that are connected only with small cell 301-2 of wide-beam-width communication node. Hence, if simultaneous operation of multiple entities (e.g., small cell(s) and CPE(s)) of a wide-beam-width communication node involving at least one small cell and one CPE is required then other techniques or solutions are required, which are discussed and explained in the following paragraphs.

Figure 29:
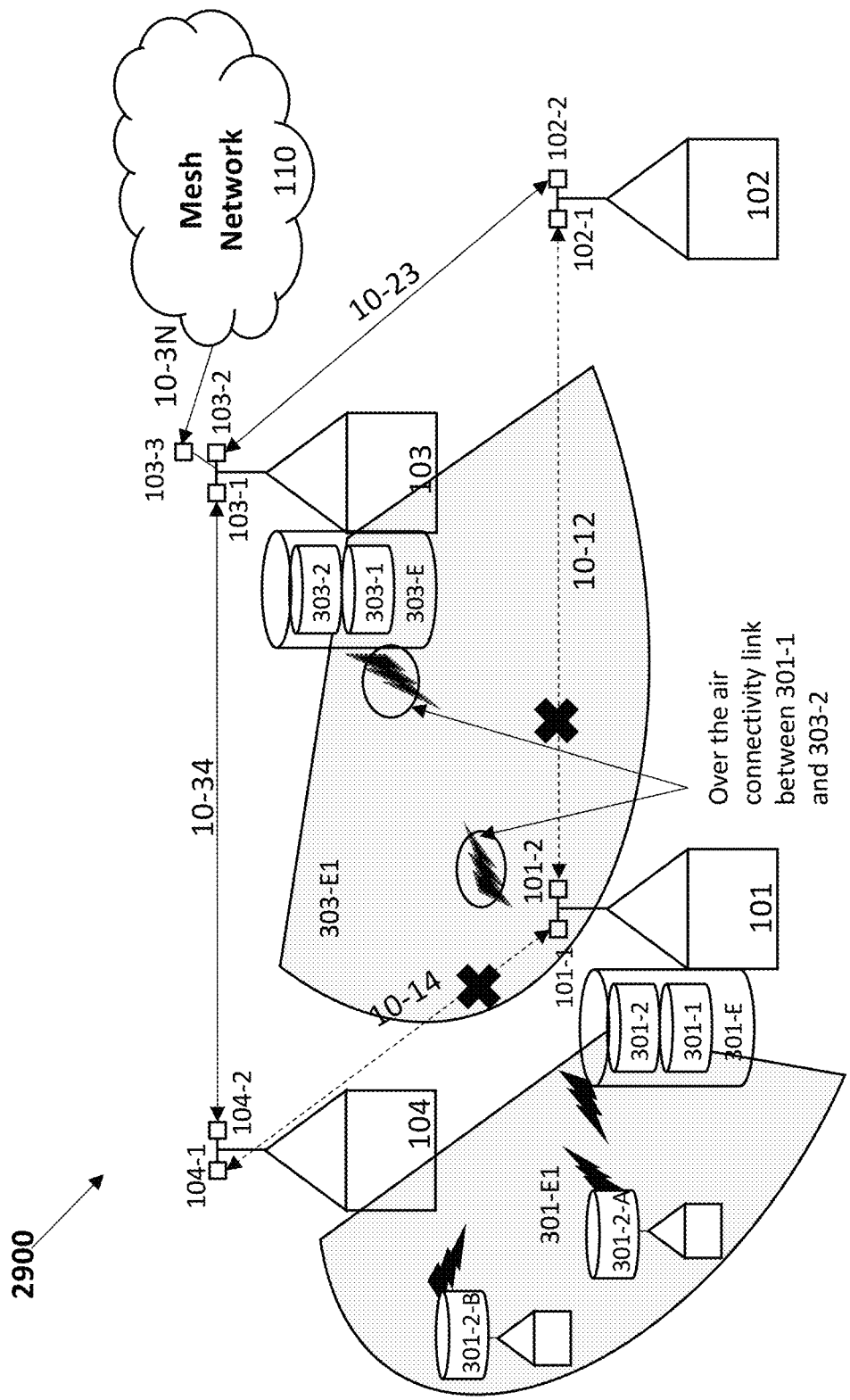
FIG. 29. depicts still another example communication network, in accordance with various aspects of this disclosure.

For instance, consider FIG. 29 which shows the communication network 2900 that has been discussed in the context of FIGS. 24-28. FIG. 29 additionally shows 2 CPEs (i.e., 301-2-A and 301-2-B) that are in the coverage area 301-E1 served by small cell 301-2 and are connected to the network via bi-directional communication links between the CPEs (i.e., 301-2-A and 301-2-B) and the small cell 301-2 that belongs to the wide-beam-width communication node 301-E. As discussed earlier in the context of FIG. 28, if small cell 301-2 shuts down the operation at a certain time instance (or interval) due to receiving and transmission operations of its collocated CPE 301-1, then connectivity services of the CPEs 301-2-A and 301-2-B may be impacted during that time instance (or interval).

As further described herein, certain mechanisms are presented that enable simultaneous operation of one or more small cells and one or more CPEs that are collocated and associated with the same wide-beam-width communication node.

Figure 30:
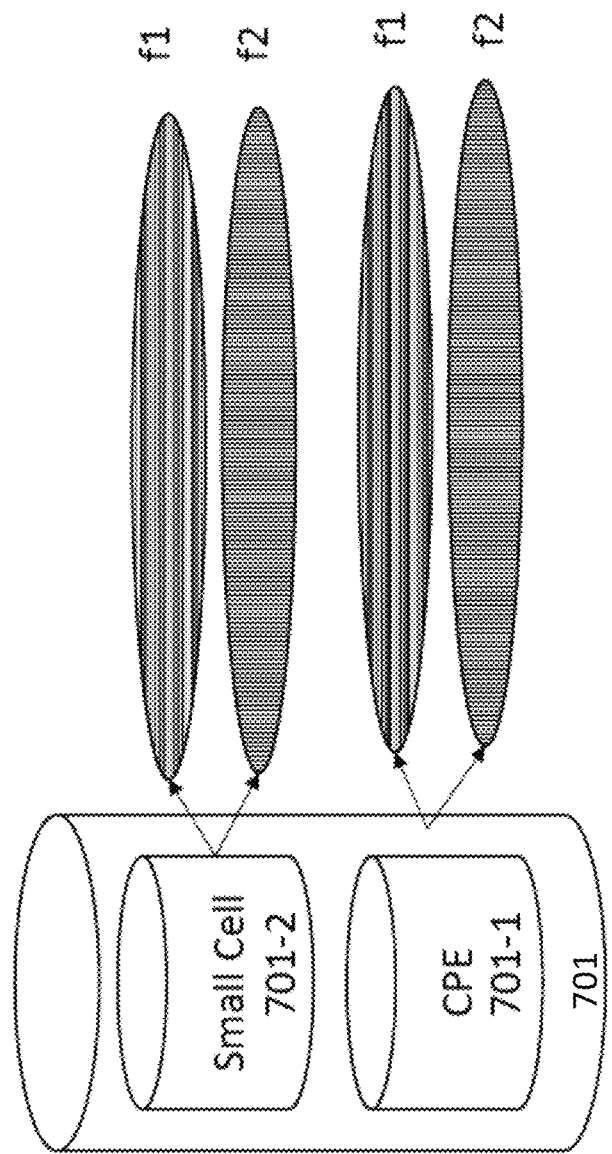
FIG. 30 depicts an example communication node operating on a wide-beam-width communication link, in accordance with various aspects of this disclosure.

As one example to illustrate, FIG. 30 depicts an example wide-beam-width communication node 701 that is similar to wide-beam-width communication node 301 discussed with respect to FIG. 26. Wide beam communication node 701 may share the previously-discussed features of wide beam communication node 301 of FIG. 26.

Additionally, as shown in FIG. 30, wide-beam-width communication node 701 may have multi-carrier support (e.g., CPE 701-1 and small cell 701-2 included in wide-beam-width communication node 701 may each support multiple carriers at different frequencies). For instance, small cell 701-2 may be capable of supporting operations on two carriers (e.g., logical cells, such as LTE cells) with a first carrier capable of operating at frequency f1 (depicted in horizontal stripes) and a second carrier capable of operating at frequency f2 (depicted in vertical stripes). Similarly, the CPE 701-1 may be capable of supporting operations on two carriers (e.g., logical cells, such as LTE cells) with a first carrier capable of operating at frequency f1 and a second carrier capable of operating at frequency f2.

While FIG. 30 depicts a single small cell 701-2 and a single CPE 701-1, it should be understood that wide-beam-width communication node 701 may have more than one small cell and/or more than one CPE. Further, while small cell 701-2 and CPE 701-1 are each shown to support two carriers operating at respective frequencies f1 and f2, it should be understood that small cell 701-2 and/or CPE 701-1 may support more or less carriers that each operate at a respective frequency. Further yet, it should be understood that each respective carrier can operate in the same frequency band or two or more frequency bands. For example, with respect to wide-beam-width communication node 701, the carrier operating at frequency f1 may operate in a first frequency band and the carrier operating at frequency f2 may operate in a second frequency band that is different than the first frequency band. As another example, f1 and f2 may operate in the same frequency band.

In some embodiments, f1 and f2 may be licensed frequencies, and in other embodiments, f1 and f2 may be unlicensed frequencies or a combination of both licensed and unlicensed frequencies. Further, in some embodiments, wide-beam-width communication node 701 may support multiple carrier operations at different frequencies simultaneously, while in some other embodiments, wide-beam-width communication node may support multiple carriers at different frequencies but only a single carrier may operate at a particular frequency during a given time.

Another aspect of the present disclosure may take the form of a mechanism for providing an alternative communication path in the event of one or multiple ptp/ptmp node failures, which will now be discussed with respect to FIGS. 31A-B.

Figure 31A:
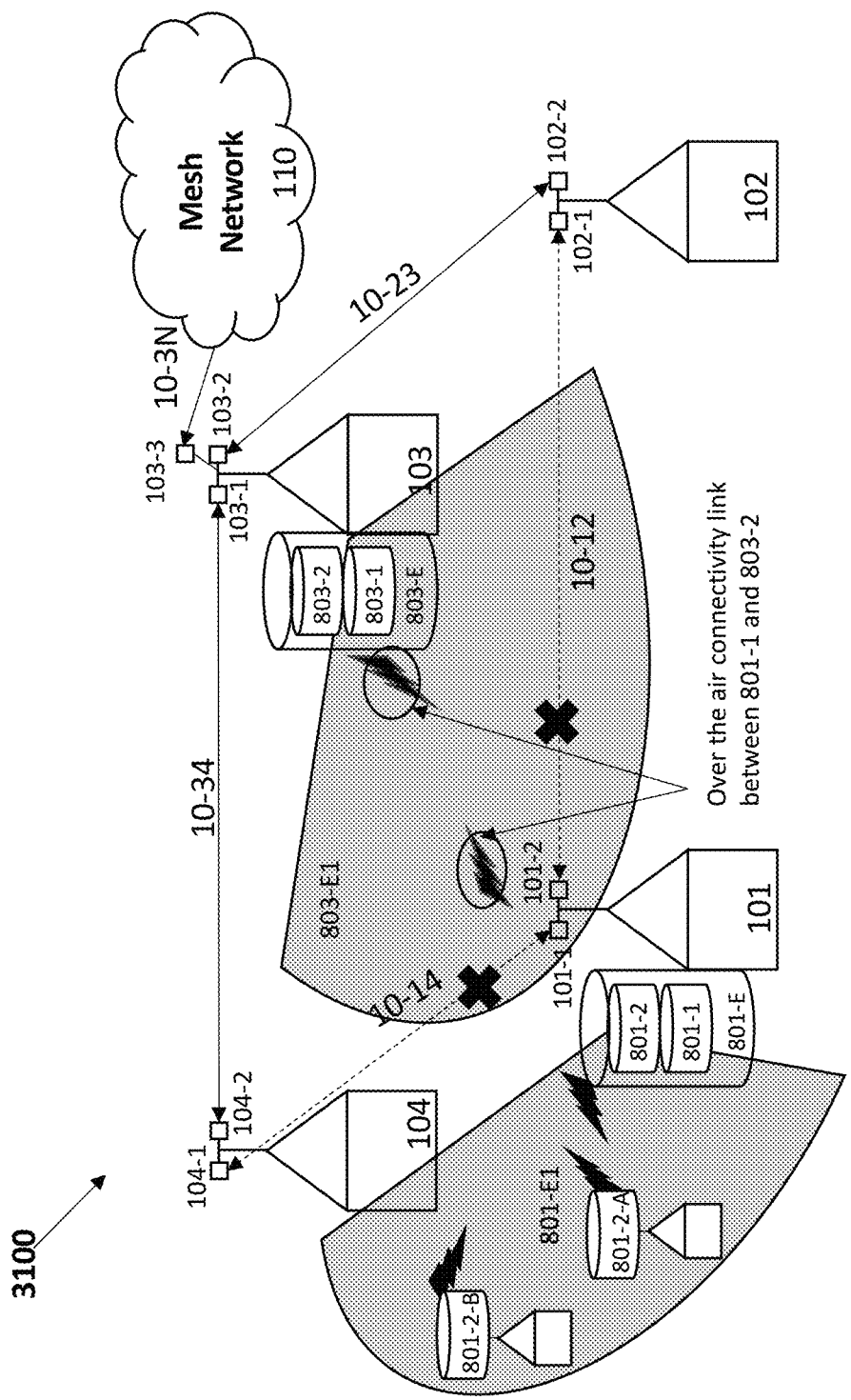
FIG. 31A depicts another example communication network, in accordance with various aspects of this disclosure.

In particular, FIG. 31A shows communication network 3100 that may be of the type described above in the context of FIGS. 24-29, and wide-beam-width communication nodes 801-E and 803-E that reside at respective mesh network nodes 101 and 103 may each have characteristics similar to those described above with respect to FIG. 30. Specifically, small cell 801-2 and CPE 801-1 of wide-beam-width communication node 801-E may be capable of supporting multiple carriers similar to wide-beam-width communication node 701 of FIG. 30. Similarly, small cell 803-2 and CPE 803-1 of wide-beam-width communication node 803-E may be capable of supporting multiple carriers similar to wide-beam-width communication node 701 of FIG. 30. During normal mesh network operations where all ptp/ptmp nodes are functional, small cells 801-2 and 803-2 as well as CPEs 801-1 and 803-1 may operate at frequency f1 in respective coverage areas 801-E1 and 803-E1. Further, during normal network operations, small cell 801-2 of wide-beam-width communication node 801-E may be connected to CPEs 801-2-A and 801-2-B at frequency f1, and small cell 803-2 of wide-beam-width communication node 803-E may be connected to CPE 801-1 residing in 801-E using frequency f1.

As further shown in FIG. 31A, in the event of a mesh network failure as discussed above, ptp/ptmp links 10-12 and 10-14 may disconnect and mesh node 101 may lose connectivity with its neighboring nodes (e.g., node 102 and node 104). As a result, a router of mesh node 101 and small cell 801-2 of wide-beam-width communication node 801-E that are backhauled through ptp/ptmp links 10-12 and 10-14 may lose connectivity. CPEs 801-2-A and 801-2-B that are covered by small cell 801-E may be impacted as well. In such instances, the disclosed operations may involve the following.

First, small cell 801-2 of wide-beam-width communication node 801-E at mesh network node 101 (the impacted node) may instruct the connected CPEs (e.g., 801-2-A and 801-2-B of FIG. 31A) to switch from frequency f1 to f2 and stop broadcasting on f1.

Second, CPE 801-1 residing in wide-beam-width communication node 801-E may scan the network for the best small cell operating at f1 and connects to that small cell (e.g., small cell 803-2 of wide-beam-width communication node 803-E located at mesh node 103).

Third, at the impacted mesh node location (e.g., node 101), small cell 801-2, CPE 801-1 of wide-beam-width communication node 801-E, and mmW ptp/ptmp link nodes 101-1 and 101-2 may coordinate with each other, CPE 801-1 operating at frequency f1 may start acting as a gateway for communications between the network and users (e.g., customers), including a router linked with ptp/ptmp nodes (e.g., nodes 101-1, 101-2), and CPEs 801-2-A and 801-2-B that are associated with small cell 801-2, and CPE 801-1 operating at frequency f1 may also coordinate with the controlling small cell 803-2 of wide-beam-width communication node 803-E at mesh node location 103 and establish different bearers and negotiate scheduling resources with small cell 803-2.

Specifically, for an mmW router, CPE 801-1 may use a high priority bearer and (1) receive downlink data for the mmW user on a downlink channel of small cell 803-2 operating at frequency f1 and located at mesh node 103 and forward decoded (Layer 2) information via a wired interface to the mmW router located at mesh node 101, and (2) receive uplink (Layer 2) information via the wired interface from the mmW router located at mesh node 101 and use an uplink channel of small cell 803-2 operating at frequency f1 and located at mesh node 103 to transmit this information to the network.

Further, for a wide beam width users (e.g., CPEs 801-2-A and 801-2-B linked with small cell 801-2 at mesh node 101), CPE 801-1 may use a lower priority bearer and (1) receive downlink data for CPEs 801-2-A and 801-2-B and wide-beam-width communication node 801-E on a downlink channel of small cell 803-2 operating at frequency f1 and located at mesh node 103 and forward decoded (Layer 2) information via a wired interface to small cell 801-2, which may then transmit this information to CPEs 801-2-A and 801-2-B over frequency f2 using its downlink channel, and (2) receive uplink (Layer 2) information associated with CPEs 801-2-A and 801-2-B via the wired interface from small cell 801-2 of wide-beam-width communication node 801-E and use an uplink channel of small cell 803-2 operating at frequency f1 to transmit this information to the network.

Figure 31B:
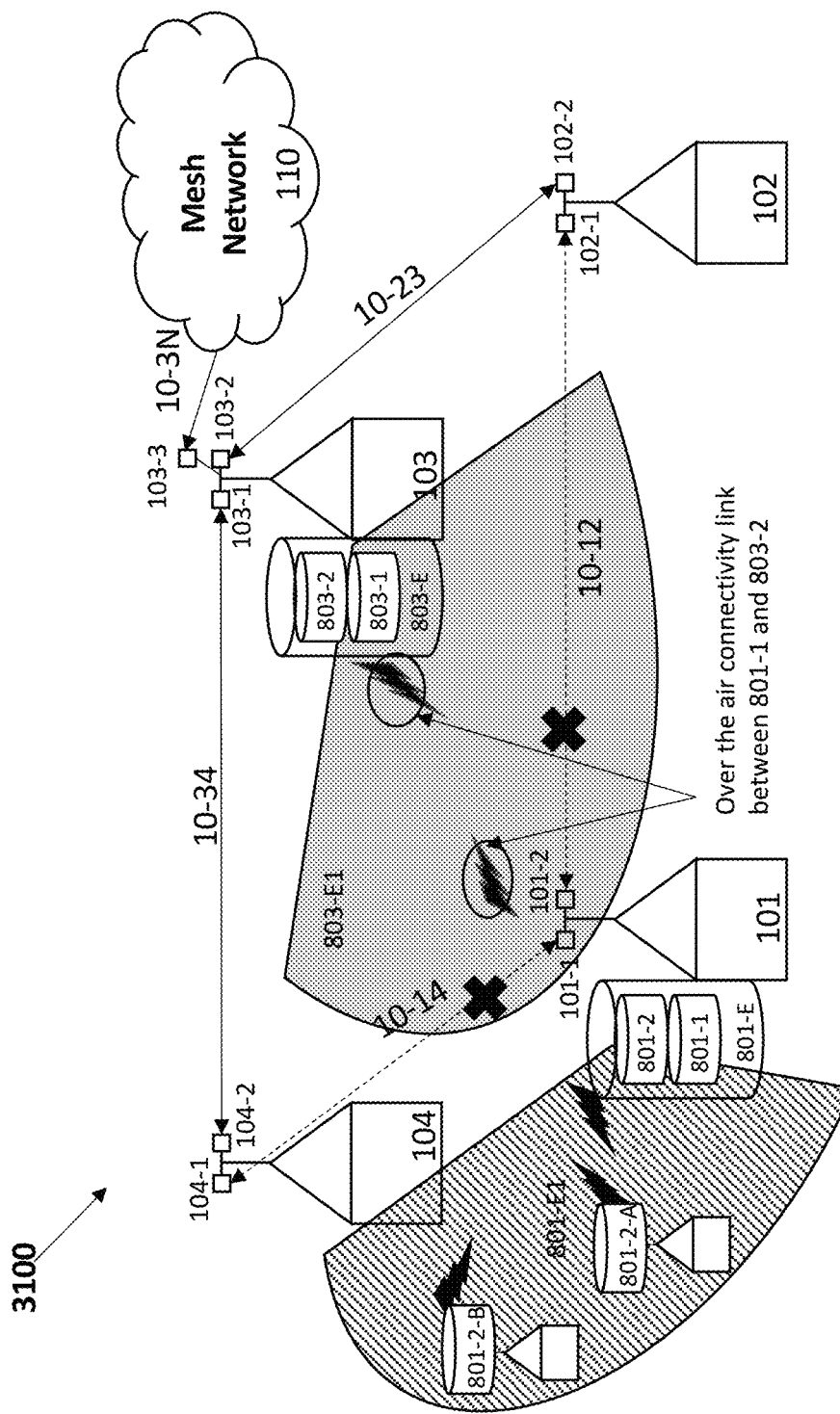
FIG. 31B depicts another example communication network, in accordance with various aspects of this disclosure.

The end state of the network after completion of the disclosed operations above is shown in FIG. 31B. For instance, as shown, coverage area 801-E1 operates at frequency f2 (as indicated by the patterned shading), while coverage area 803-E1 remains unchanged and operates at frequency f1 (as indicated by the solid shading).

Figure 32:
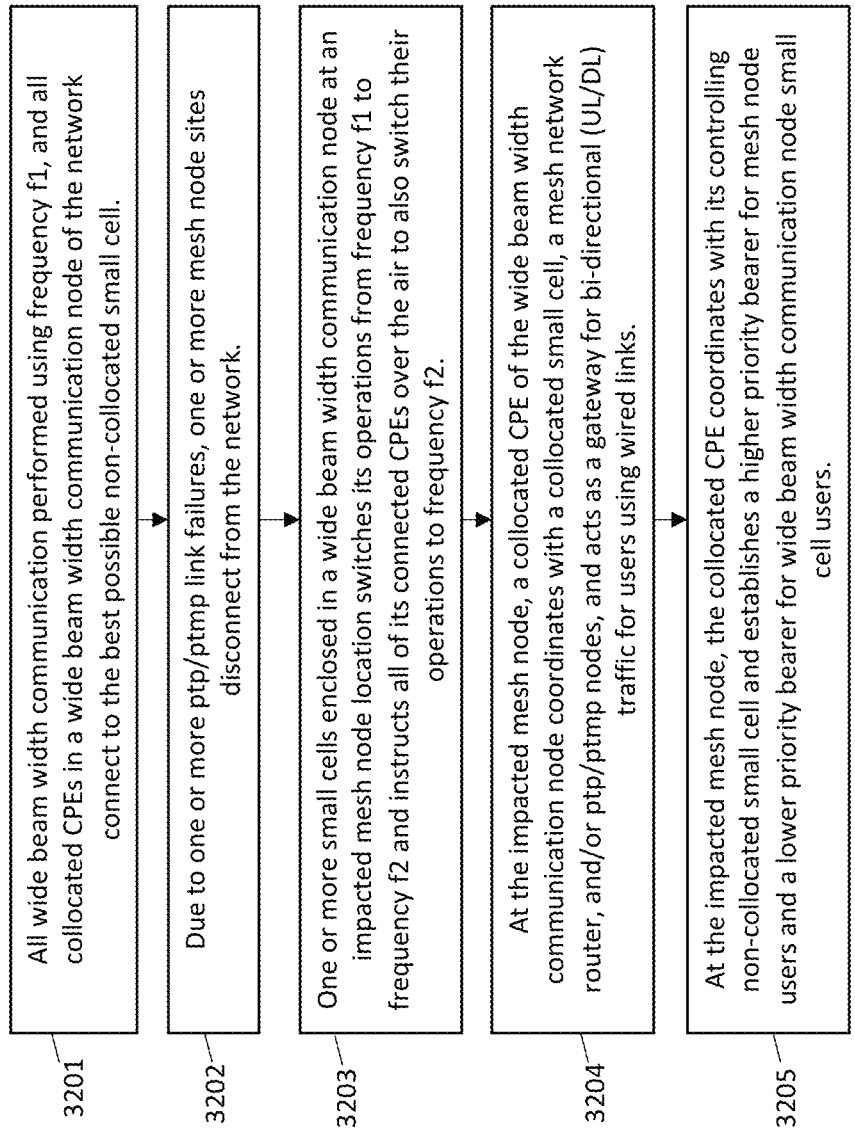
FIG. 32 depicts an example flow chart for providing alternate data paths in the event of one or more ptp/ptmp link failures.

While a mechanism for providing an alternative communication path in the event of one or multiple ptp/ptmp node failures has been described above with reference to the example scenario of FIGS. 31A-B, it should be understood that such a mechanism is not limited to this example scenario. To explain more broadly, FIG. 32 shows an example method for providing an alternate communication path in the event that one or more ptp/ptmp links fail.

At block 3201, all wide-beam-width communication may be performed using frequency f1, and all collocated CPEs in a wide-beam-width communication node of the network may connect to the best possible non-collocated small cell.

At block 3202, due to one or more ptp/ptmp link failures, one or more mesh node sites may disconnect from the network.

At block 3203, as a result of the one or more ptp/ptmp link failures, one or more small cells enclosed in a wide-beam-width communication node at an impacted mesh node location may switch its operations from frequency f1 to frequency f2 and instruct all of its connected CPEs over the air to also switch their operations to frequency f2.

Next, at block 3204, at the impacted mesh node, a collocated CPE of the wide-beam-width communication node may coordinate with a collocated small cell, a mesh network router, and/or ptp/ptmp nodes, and act as a gateway for bi-directional (UL/DL) traffic for users (e.g., ptp/ptmp customers and wide-beam-width communication node's small cell customers) using wired links between collocated CPEs, small cells, mesh node customers and/or ptp/ptmp nodes.

At block 3205, at the impacted mesh node, the collocated CPE of the wide-beam-width communication node may coordinate with its controlling non-collocated small cell and establish a higher priority bearer for mesh node users and a lower priority bearer for wide-beam-width communication node small cell users.

Once all of the impacted ptp/ptmp links that failed are fixed, network communication operations may go back to block 3201.

It should be understood that blocks 3201-3205 are merely described in such manner for the sake of clarity and explanation and that some operations may be carried out in various other manners as well, including the possibility that example operations may be added, removed, rearranged into different orders, grouped together, and/or not grouped together at all. Further, it should also be understood that the CPE at block 3205 can establish both high, low or equal priority data bearers for both mesh node users and wide-beam-width communication node users.

Yet another aspect of the present disclosure may take the form of a mechanism that enables simultaneous operations of one or more small cells and one or more CPEs that are collocated and associated with the same wide-beam-width communication node, which will now be discussed with respect to FIGS. 33A-B.

Figure 33A:
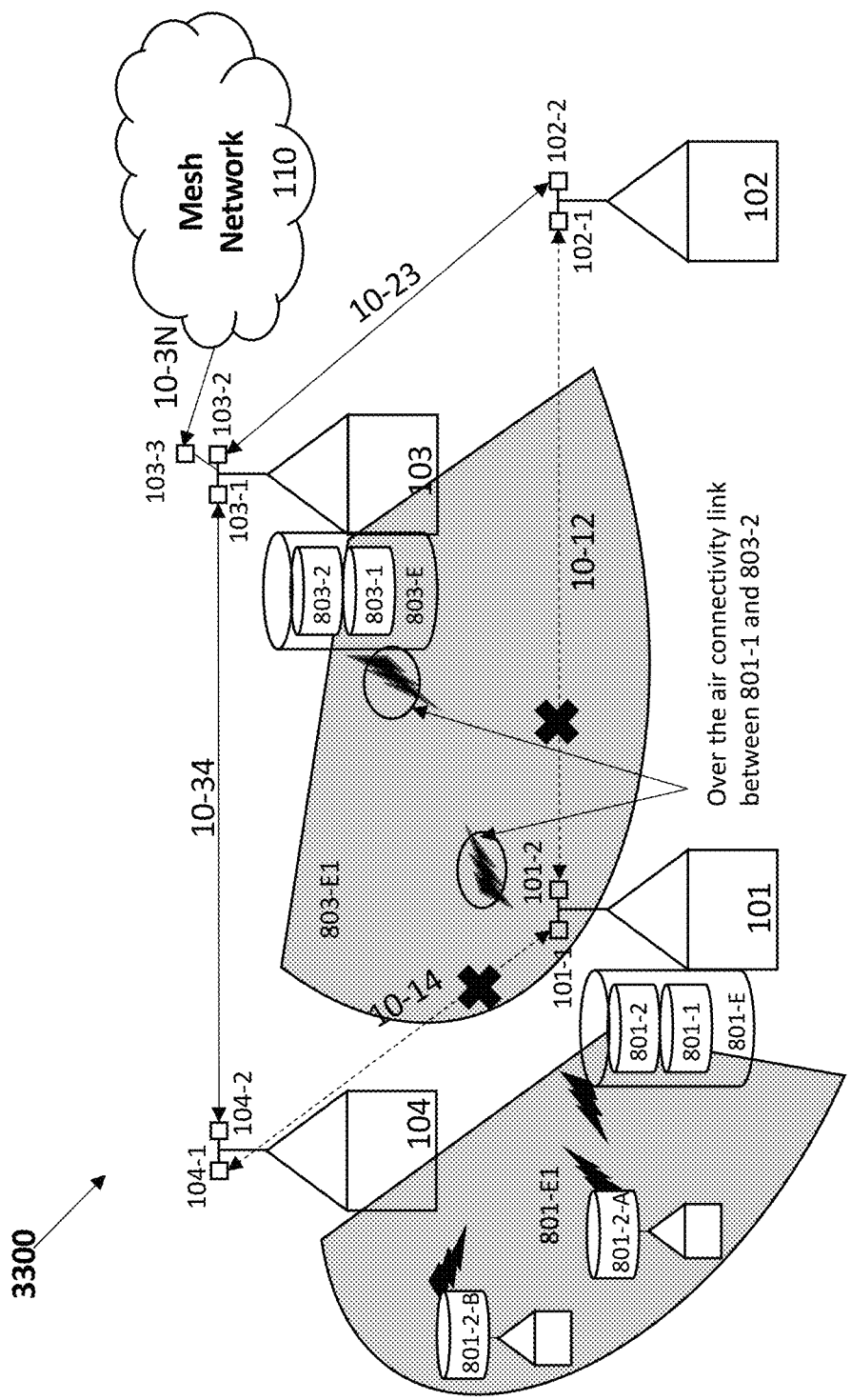
FIG. 33A depicts another example communication network, in accordance with various aspects of this disclosure.

In particular, FIG. 33A depicts an example communication network 3300 that may be of the type described above with respect to FIGS. 24-29, and wide-beam-width communication nodes 801-E and 803-E that reside at respective mesh network nodes 101 and 103 may each have characteristics similar to those described above with respect to wide-beam-width communication node 301 of FIG. 26. As shown, during normal mesh network operations where all ptp/ptmp nodes are functional, small cells 801-2 and 803-2 as well as CPEs 801-1 and 803-1 may operate at frequency f1 in respective coverage areas 801-E1 and 803-E1. Further, during normal network operations, small cell 801-2 of wide-beam-width communication node 801-E may be connected to CPEs 801-2-A and 801-2-B at frequency f1, and small cell 803-2 of the wide-beam-width communication node 803-E may be connected to CPE 801-1 residing in 801-E at frequency f1.

As further shown in FIG. 33A, in the event of a mesh network failure as discussed above, ptp/ptmp links 10-12 and 10-14 may disconnect and mesh node 101 may lose connectivity with its neighboring nodes (e.g., node 102 and node 104). As a result, a router of mesh node 101 and small cell 801-2 of wide-beam-width communication node 801-E that are backhauled through ptp/ptmp links 10-12 and 10-14 may lose connectivity. CPEs 801-2-A and 801-2-B that are covered by small cell 801-E may be impacted as well. In such instances, the disclosed operations may involve the following.

First, small cell 801-2 of wide-beam-width communication node 801-E at mesh network node 101 (the impacted node) instructs the connected CPEs (e.g., 801-2-A and 801-2-B of FIG. 33A) to pause their uplink transmission for a given duration of time (or until instructed by small cell 801-2 to resume uplink transmissions).

Second, CPE 801-1 residing in wide-beam-width communication node 801-E scans the network for the best small cell operating at f1 and connects to that small cell (e.g., small cell 803-2 of wide-beam-width communication node 803-E located at mesh node 103).

Third, at the impacted mesh node location (e.g., node 101), small cell 801-2, CPE 801-1 of wide-beam-width communication node 801-E, and mmW ptp/ptmp link nodes 101-1 and 101-2 may coordinate with each other, and CPE 801-1 operating at frequency f1 may start acting as a gateway for communications between the network and users (e.g., customers), including a router linked with ptp/ptmp nodes (e.g., nodes 101-1, 101-2), and CPEs 801-2-A and 801-2-B that are associated with small cell 801-2. CPE 801-1 operating at frequency f1 may coordinate with the controlling small cell 803-2 of wide-beam-width communication node 803-E at mesh node location 103 and establish different bearers and negotiate scheduling resources with small cell 803-2. In addition, CPE 801-1 located at impacted mesh node 101 may pre-negotiate uplink transmission time slots with its controlling small cell 803-2, where CPE 801-1 may send uplink data to the network from all the impacted nodes and users.

Fourth, once this is established, CPE 801-1 may inform its collocated small cell 801-2 via a wired interface that CPE 801-1 has successfully pre-negotiated uplink transmission time slots with its controlling small cell 803-2. After collocated small cell 801-2 receives that information, small cell 801-2 located at impacted mesh node 101 may instruct its connected CPEs (e.g., CPEs 801-2-A and 801-2-B) to resume their uplink transmission, but only in time slots that do not overlap with a time slot when CPE 801-1 of wide-beam-width communication node 801-E performs its own transmission. CPE 801-1 that acts as a gateway for impacted nodes and users may transfer bi-directional data via small cell 803-2 residing in wide-beam-width communication node 803-E of the unimpacted mesh node 103.

Specifically, for an mmW router and ptp/ptmp nodes 101-1 and 101-2, CPE 801-1 may use a high-priority bearer and (1) receive downlink data for the mmW router on a downlink channel of small cell 803-2 operating at frequency f1 and located at mesh node 103 and forward decoded (Layer 2) information via a wired interface to the mmW router located at mesh node 101, and (2) receive uplink (Layer 2) information via the wired interface from the mmW router located at mesh node 101 and use an uplink channel of small cell 803-2 operating at frequency f1 and located at mesh node 103 to transmit this information to the network.

Further, for wide beam width users (e.g., CPEs 801-2-A and 801-2-B linked with small cell 801-2 at mesh node 101), CPE 801-1 may use a lower priority bearer and (1) receive downlink data for CPEs 801-2-A and 801-2-B on a downlink channel of small cell 803-2 operating at frequency f1 and located at mesh node 103 and forward the decoded (Layer 2) information via a wired interface to small cell 801-2, which may then transmit this information to its associated CPEs 801-2-A and 801-2-B over frequency f1 using its downlink channel, and (2) receive uplink (Layer 2) information associated with CPEs 801-2-A and 801-2-B via the wired interface from small cell 801-2 of wide-beam-width communication node 801-E and use an uplink channel of small cell 803-2 operating at frequency f1 to transmit this information to the network.

Figure 33B:
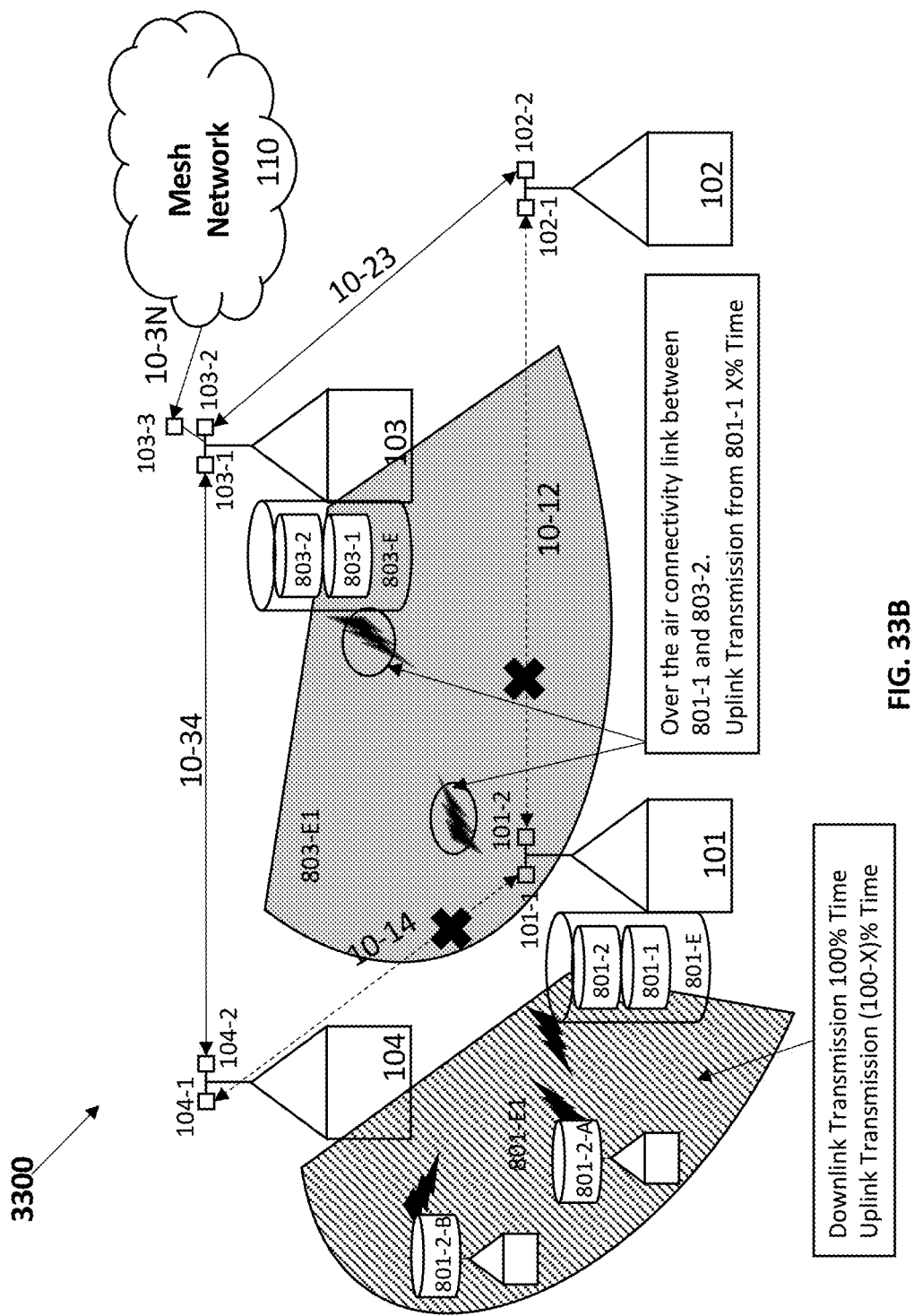
FIG. 33B depicts another example communication network, in accordance with various aspects of this disclosure.

The end state of the network after completion of the disclosed operations above is shown in FIG. 33B. As shown, coverage area 801-E1 operates at frequency f1, where uplink transmission happens only (100−X) % of the time, where X is a percentage of times in which CPE 801-1 pre-negotiated with small cell 803-2 for its own uplink transmission. With respect to coverage area 803-E1, uplink transmission from 801-1 may occur during certain pre-configured time slots X % of times.

Figure 34:
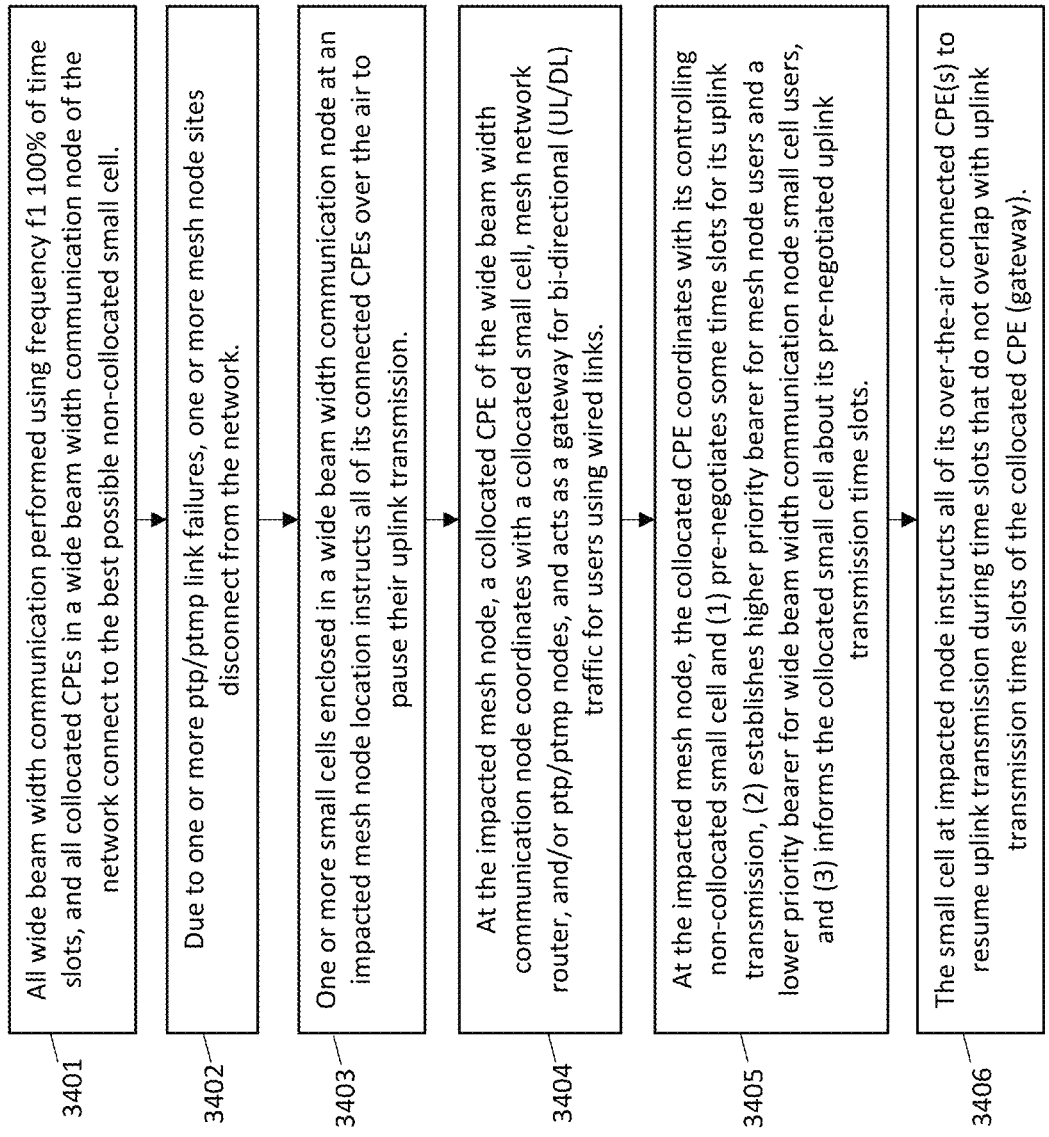
FIG. 34 depicts another example flow chart for providing alternate data paths in the event of one or more ptp/ptmp link failures.

The disclosed operations concerning an event where one or more ptp/ptmp links fail have been described with reference to FIGS. 33A-B. However, it should be understood that the disclosed operations described above are not limited to the above examples. To explain more broadly, FIG. 34 shows an example method for providing alternate communication paths in such an event where one or more ptp/ptmp links fail.

At block 3401, all wide-beam-width communication may be performed using frequency f1 100% of time slots, and all collocated CPEs in a wide-beam-width communication node of the network may connect to the best possible non-collocated small cell. At block 3402, due to one or more ptp/ptmp link failures, one or more mesh node sites may disconnect from the network.

At block 3403, as a result of the one or more ptp/ptmp link failures, one or more small cells enclosed in a wide-beam-width communication node at an impacted mesh node location may instruct all of its connected CPEs over the air to pause their uplink transmission.

Next, at block 3404, at the impacted mesh node, a collocated CPE of the wide-beam-width communication node may coordinate with a collocated small cell, mesh network customer router, and/or ptp/ptmp nodes, and act as a gateway for bi-directional (UL/DL) traffic for users (e.g., ptp/ptmp customers and wide-beam-width communication node's small cell customers) using wired links between collocated CPEs, small cells, mesh node customers and/or ptp/ptmp nodes.

At block 3405, at the impacted mesh node, the collocated CPE of the wide-beam-width communication node may coordinate with its controlling non-collocated small cell and (1) pre-negotiate some time slots for its uplink transmission, (2) establish a higher priority bearer for mesh node users and a lower priority bearer for wide-beam-width communication node small cell users, and (3) inform the collocated small cell about its pre-negotiated uplink transmission time slots.

In turn, at block 3406, the small cell at the impacted node instructs all of its over-the-air connected CPE(s) to resume uplink transmission during time slots that do not overlap with uplink transmission time slots of the collocated CPE (gateway). Once all of the impacted ptp/ptmp links that failed are fixed, network communication operations may go back to block 3201.

It should be understood that blocks 3401-3406 are merely described in such manner for the sake of clarity and explanation and that some operations may be carried out in various other manners as well, including the possibility that example operations may be added, removed, rearranged into different orders, grouped together, and/or not grouped together at all. Further, it should also be understood that the CPE at block 3405 can establish both high, low or equal priority data bearers for both mesh node users and wide-beam-width communication node users.

So far in the above discussion, it was assumed that collocated CPEs and small cells included in a wide-beam-width communication node can mitigate uplink interference by coordinating uplink transmission of a collocated CPE and CPEs that are connected over the air with a collocated small cell in non-overlapping time slots. Similar operations may be adopted for downlink transmissions. However, in certain scenarios, continuous downlink transmission may be required and collocated small cells included in a wide-beam-width communication node may be unable to shut down its downlink transmission during time slots when a collocated CPE is receiving downlink information from a non-collocated small cell. In such scenarios, other mechanisms can be introduced that can help mitigate downlink interference between a collocated CPE and a small cell included in a wide-beam-width communication node.

Figure 35:
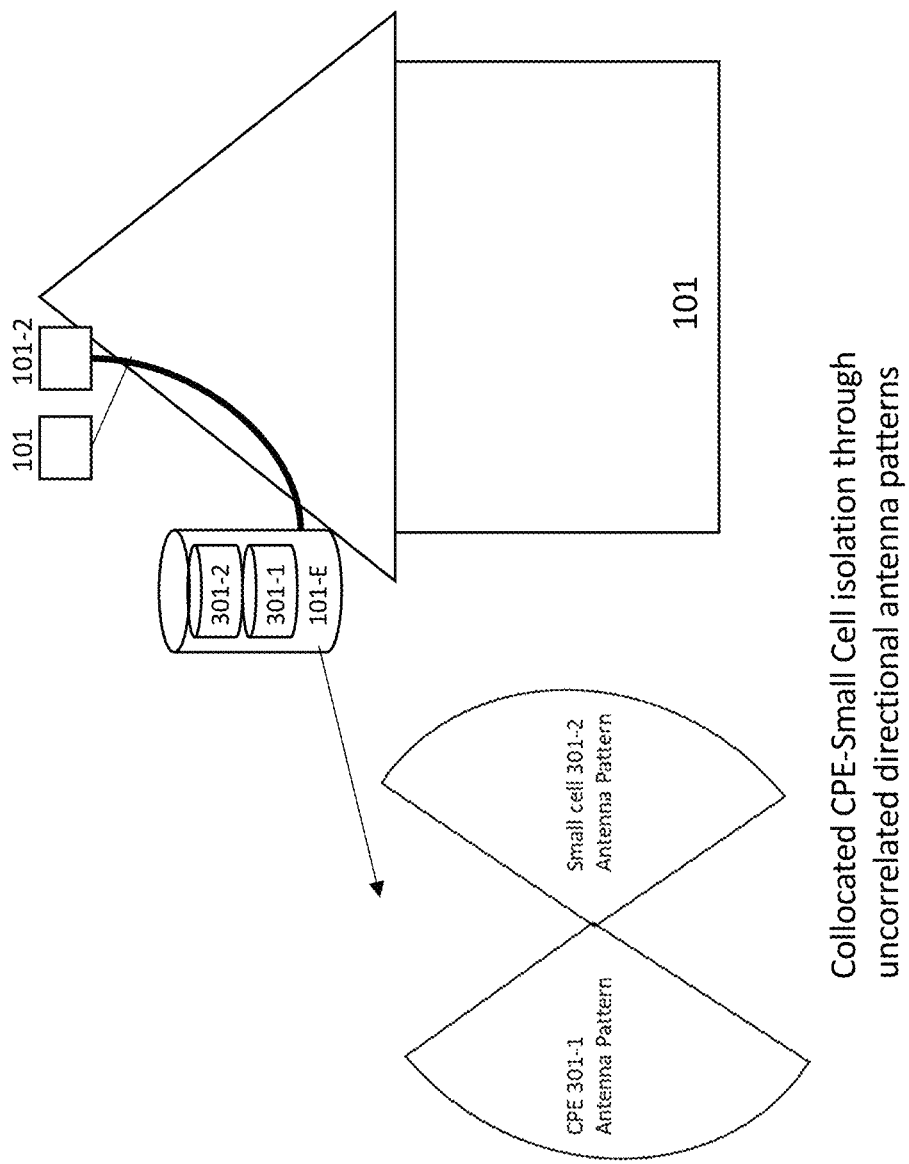
FIG. 35 depicts an example mesh network node that hosts a plurality of communication nodes, in accordance with various aspects of this disclosure.

As one example to illustrate, FIG. 35 depicts an example mesh network node 101. As shown, mesh node 101 hosts two ptp/ptmp communication nodes 101-1 and 101-2, and a wide-beam-width communication node 101-E that contains small cell 301-2 and collocated CPE 301-1. In instances in which mesh node 101 is impacted due to an event (e.g., an event described above), both nodes 301-1 and 301-2 may be required to operate at the same frequency.

FIG. 35 also shows respective antenna patterns of collocated CPE 301-1 and small cell 301-2 that depicts that the respective antenna patterns have uncorrelated gains in one direction. For instance, at the bore sight of the CPE 301-1 antenna, the gain of collocated small cell 301-2 antenna is negligible and similarly, at the bore sight of the small cell 301-2 antenna, the gain of the collocated CPE 301-1 antenna is negligible. As a result, transmission signals of small cell 301-2 are directed in a different (e.g., opposite) direction than CPE 301-1 that collects the received signal energy from the transmission signals of a non-collocated small cell in a different (e.g., opposite) direction. In this respect, both small cells (collocated and non-collocated) can have continuous downlink transmissions without impacting the downlink reception of the collocated CPE at the impacted mesh node (e.g., CPE 301-1).

It should be understood that antenna patterns for collocated CPE 301-1 and small cell 301-2 represent one example embodiment and there may be a variety of different antenna patterns that can mitigate downlink interference as long as the collocated CPE and small cell have uncorrelated directional antenna patterns.

Figure 36:
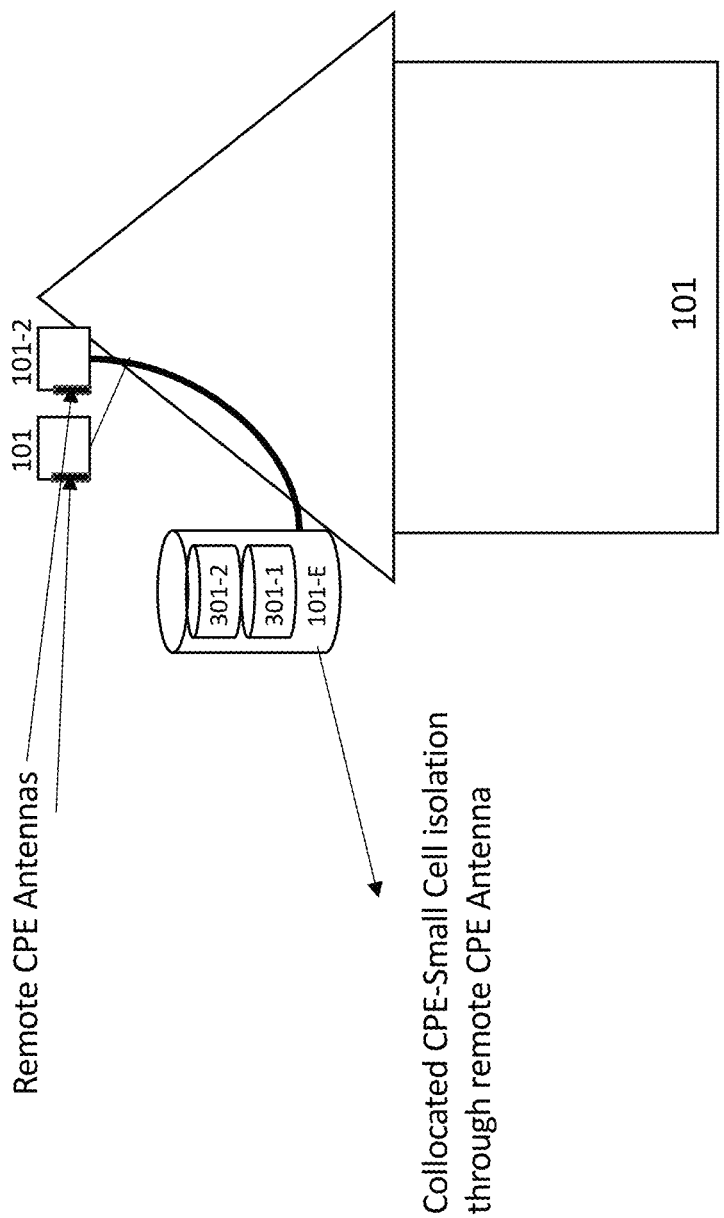
FIG. 36 depicts another example mesh network node that hosts a plurality of communication nodes, in accordance with various aspects of this disclosure.

In some instances, downlink signal isolation between a collocated CPE's reception and a collocated small cell's transmission can be achieved through physical separation between antennas as shown in FIG. 36. For instance, ptp/ptmp nodes 101-1 and 101-2, in addition to mmW communication modules, may each host antennas for the collocated CPE 301-1 (or small cell 301-2) of wide-beam-width communication node 101-E that is connected via an antenna cable to wide-beam-width communication node 101-E, while small cell 301-2's (or CPE 301-1's) antenna is placed within an enclosure of wide-beam-width communication node 101-E. If more isolation is needed, then wide-beam-width communication node 101-E can be moved further away from ptp/ptmp nodes (e.g., moved to a different side of the roof, moved to a different height, or combination of both) to get the desired signal level separation.

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

What is claimed is:

1. A wireless communication node that is configured to operate within a wireless mesh network, the wireless communication node comprising:
a wireless mesh sub-node that is configured to communicate in a millimeter-wave frequency band;
at least one small cell sub-node that is configured to communicate in a sub-6 GHz frequency band; and
at least one Customer Premises Equipment (CPE) sub-node that is configured to communicate in the sub-6 GHz frequency band,
wherein the wireless communication node is capable of:
operating in a first mode in which the wireless communication node is connected to the wireless mesh network via one or more wireless communication links in the millimeter-wave frequency band that are established between the wireless mesh sub-node of the wireless communication node and one or more wireless mesh sub-nodes of one or more other wireless communication nodes within the wireless mesh network;
detecting that the wireless communication node is no longer connected to the wireless mesh network via any wireless communication link in the millimeter-wave frequency band; and
after detecting that the wireless communication node is no longer connected to the wireless mesh network via any wireless communication link in the millimeter-wave frequency band, transitioning from operating in the first mode to operating in a second mode in which the wireless communication node is connected to the wireless mesh network via a wireless communication link in the sub-6 GHz frequency band that is established between the at least one CPE sub-node of the wireless communication node and a small cell sub-node of a given other wireless communication node that is operating within the wireless mesh network.

2. The wireless communication node of claim 1, wherein:
the wireless mesh sub-node is configured to generate one or more beams for communicating in the millimeter-wave frequency band that each have a respective 3 dB beam-width of 10 degrees or less;
the at least one small cell sub-node is configured to generate one or more beams for communicating in the sub-6 GHz frequency band that collectively have a 3 dB beam-width of 60 degrees or more; and
the at least one CPE sub-node is configured to generate a beam for communicating in the sub-6 GHz frequency band that has a 3 dB beam-width of 15 degrees or more.

3. The wireless communication node of claim 1, wherein:
the at least one small cell sub-node comprises a 2G, 3G, 4G, 5G, or 6G small cell; and
the at least one CPE sub-node comprises a 2G, 3G, 4G, 5G, or 6G CPE.

4. The wireless communication node of claim 1, wherein:
the at least one small cell sub-node comprises multiple small cell sub-nodes; and
the at least one CPE sub-node comprises multiple CPE sub-nodes.

5. The wireless communication node of claim 1, wherein the wireless mesh sub-node, the at least one small cell sub-node, and the at least one CPE sub-node of the wireless communication node are connected to one another via a wired connection.

6. The wireless communication node of claim 1, wherein:
the at least one small cell sub-node supports multiple carriers operating at different frequencies within the sub-6 GHz frequency band; and
the at least one CPE sub-node supports multiple carriers operating at different frequencies within the sub-6 GHz frequency band.

7. A communication system comprising:
a first wireless communication node at a first site node that is configured to operate within a wireless mesh network, wherein the first wireless communication node comprises (i) a first wireless mesh sub-node that is configured to communicate in a millimeter-wave frequency band, (ii) a first small cell sub-node that is configured to communicate in a sub-6 GHz frequency band, and (iii) a first Customer Premises Equipment (CPE) sub-node that is configured to communicate in the sub-6 GHz frequency band; and
a second wireless communication node at a second site that is configured to operate within the wireless mesh network, wherein the second wireless communication node comprises (i) a second wireless mesh sub-node that is configured to communicate in the millimeter-wave frequency band, (ii) a second small cell sub-node that is configured to communicate in the sub-6 GHz frequency band, and (iii) a second CPE sub-node that is configured to communicate in the sub-6 GHz frequency band,
wherein the first wireless communication node is capable of (i) operating in a first mode in which the first wireless communication node is connected to the wireless mesh network via one or more wireless communication links in the millimeter-wave frequency band that are established between the first wireless mesh sub-node of the first wireless communication node and one or more other wireless mesh sub-nodes of one or more other wireless communication nodes within the wireless mesh network, (ii) detecting that the first wireless communication node is no longer connected to the wireless mesh network via any wireless communication link in the millimeter-wave frequency band, and (iii) after detecting that the first wireless communication node is no longer connected to the wireless mesh network via any wireless communication link in the millimeter-wave frequency band, transitioning from operating in the first mode to operating in a second mode in which the first wireless communication node is connected to the wireless mesh network via a wireless communication link in the sub-6 GHz frequency band that is established between the first CPE sub-node of the first wireless communication node and the second small cell sub-node of the second wireless communication node, and wherein the second wireless communication node is connected to the wireless mesh network via one or more wireless communication links in the millimeter-wave frequency band that are established between the second wireless mesh sub-node of the second wireless communication node and one or more other wireless mesh sub-nodes of one or more other wireless communication nodes within the wireless mesh network.

8. The communication system of claim 7, wherein:
the first small cell sub-node and the second small cell sub-node each comprise a 2G, 3G, 4G, 5G, or 6G small cell; and
the first CPE sub-node and the second CPE sub-node each comprise a 2G, 3G, 4G, 5G, or 6G CPE.

9. The communication system of claim 7, wherein:
the first small cell sub-node, the first CPE sub-node, the second small cell sub-node, and the second CPE sub-node each supports multiple carriers operating at different frequencies within the sub-6 GHz frequency band.

10. A method carried out by a first wireless communication node operating within a wireless mesh network, wherein the first wireless communication node includes (a) a first wireless mesh sub-node that is configured to communicate in a millimeter-wave frequency band, (b) a first small cell sub-node node that is configured to communicate in a sub-6 GHz frequency band, and (c) a first Customer Premises Equipment (CPE) sub-node that is configured to communicate in the sub-6 GHz frequency band, the method comprising:
operating in a first mode in which (i) the first wireless communication node is connected to the wireless mesh network via one or more wireless communication links in the millimeter-wave frequency band that are established between the first wireless mesh sub-node of the first wireless communication node and one or more other wireless mesh sub-nodes of one or more other wireless communication nodes in the wireless mesh network and (ii) the first small cell sub-node of the first wireless communication node is configured to communicate with CPE outside of the first wireless communication node via one or more wireless communication links that operate on a first carrier frequency in the sub-6 GHz frequency band;
detecting a link failure that results in the first wireless communication node no longer being connected to the wireless mesh network via any wireless communication link in the millimeter-wave frequency band; and
after detecting the link failure, transitioning from operating in the first mode to operating in a second mode in which (i) the first small cell sub-node of the first wireless communication node is configured to to communicate with the CPE outside of the first wireless communication node via one or more wireless communication links that operate on a second carrier frequency in the sub-6 GHz frequency band that differs from the first carrier frequency and (ii) the first wireless communication node is connected to the wireless mesh network via a wireless communication link that operates on the first carrier frequency in the sub-6 GHz frequency band and is established between the first CPE sub-node of the first wireless communication node and a small cell sub-node of a second wireless communication node that is operating within the wireless mesh network.

11. The method of claim 10, wherein transitioning from operating in the first mode to operating in the second mode comprises:
causing the first small cell sub-node to instruct the CPE outside of the first wireless communication node to use the second carrier frequency;
causing the first CPE sub-node to establish the wireless communication link that operates on the first carrier frequency in the sub-6 GHz frequency band with the small cell sub-node of the second wireless communication node; and
causing the first CPE sub-node to begin acting as a gateway for (i) mesh traffic that is exchanged with a router linked to the first wireless mesh sub-node and (ii) CPE traffic that is exchanged with the first small cell sub-node.

12. The wireless communication node of claim 1, wherein the at least one small cell sub-node and the at least one CPE sub-node are housed within a single enclosure.

13. The wireless communication node of claim 1, wherein the wireless mesh sub-node comprises multiple wireless mesh communication modules that are each configured to establish a separate point-to-point (ptp) or point-to-multipoint link (ptmp) link in the millimeter-wave frequency band for communicating with one or more other wireless communication nodes within the wireless mesh network.

14. The wireless communication node of claim 1, wherein the wireless communication node is further capable of:
communicating with CPE outside of the wireless communication node via one or more wireless communication links in the sub-6 GHz frequency band that are established between the at least one small cell sub-node of the wireless communication node and the CPE.

15. The wireless communication node of claim 14, wherein the CPE comprises a CPE sub-node of another wireless communication node that was previously connected to the wireless mesh network.

16. The wireless communication node of claim 14, wherein:
while operating in the first mode, (i) the at least one small cell sub-node of the wireless communication node is configured to communicate with the CPE outside of the wireless communication node on a first carrier frequency in the sub-6 GHz frequency band and (ii) the wireless communication node is configured to route traffic to and from the CPE outside of the wireless communication node via the one or more wireless communication links in the millimeter-wave frequency band that are established between the wireless mesh sub-node of the wireless communication node and the one or more wireless mesh sub-nodes of the one or more other wireless communication nodes within the wireless mesh network; and
while operating in the second mode, (i) the at least one small cell sub-node of the wireless communication node is configured to communicate with the CPE outside of the wireless communication node on a second carrier frequency in the sub-6 GHz frequency band that differs from the first carrier frequency, (ii) the at least one CPE sub-node of the wireless communication node is configured to communicate with the small cell sub-node of the given other wireless communication node on the first carrier frequency in the sub-6 GHz frequency band, and (iii) the wireless communication node is configured to route traffic to and from the CPE outside of the wireless communication node via the wireless communication link on the first carrier frequency in the sub-6 GHz frequency band that is established between the at least one CPE sub-node of the wireless communication node and the small cell sub-node of the given other wireless communication node that is operating within the wireless mesh network.

17. The communication system of claim 7, wherein:
the first small cell sub-node and the first CPE sub-node are housed within a single enclosure; and
the second small cell sub-node and the second CPE sub-node are housed within a single enclosure.

18. The communication system of claim 7, wherein:
each of the first wireless mesh sub-node and the second wireless mesh sub-node is configured to generate one or more beams for communicating in the millimeter-wave frequency band that each have a respective 3 dB beam-width of 10 degrees or less;
each of the first small cell sub-node and the second small cell sub-node is configured to generate one or more beams for communicating in the sub-6 GHz frequency band that collectively have a 3 dB beam-width of 60 degrees or more; and
each of the first CPE sub-node and the second CPE sub-node is configured to generate a beam for communicating in the sub-6 GHz frequency band that has a 3 dB beam-width of 15 degrees or more.

19. The communication system of claim 7, wherein the first wireless communication node is further configured to:
communicate with CPE outside of the first wireless communication node via one or more wireless communication links in the sub-6 GHz frequency band that are established between the first small cell sub-node of the first wireless communication node and the CPE.

20. The method of claim 11, wherein transitioning from operating in the first mode to operating in the second mode further comprises:
causing the first CPE sub-node to coordinate with the small cell sub-node of the second wireless communication node to (i) establish a higher-priority bearer for the mesh traffic and (ii) establish a lower-priority bearer for the CPE traffic.

* * * * *